(12) United States Patent
Takatsuka et al.

(10) Patent No.: US 8,233,083 B2
(45) Date of Patent: Jul. 31, 2012

(54) CAMERA MODULE

(75) Inventors: Kazuhiko Takatsuka, Kanagawa (JP); Hiroaki Tojo, Chiba (JP); Masashi Nishimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 348 days.

(21) Appl. No.: 12/480,155

(22) Filed: Jun. 8, 2009

(65) Prior Publication Data

US 2009/0316040 A1 Dec. 24, 2009

(30) Foreign Application Priority Data

Jun. 20, 2008 (JP) ................................. 2008-161780

(51) Int. Cl.
*H04N 5/225* (2006.01)
(52) U.S. Cl. ......... 348/376; 348/373; 348/374; 348/375
(58) Field of Classification Search .................. None
See application file for complete search history.

(56) References Cited

U.S. PATENT DOCUMENTS

| | | | | |
|---|---|---|---|---|
| 7,450,834 | B2 * | 11/2008 | Makii et al. | 396/55 |
| 7,602,439 | B2 * | 10/2009 | Makii et al. | 348/374 |
| 7,675,566 | B2 * | 3/2010 | Tagome et al. | 348/357 |
| 2006/0181632 | A1 * | 8/2006 | Makii et al. | 348/335 |
| 2007/0097527 | A1 * | 5/2007 | Ichikawa et al. | 359/819 |
| 2008/0158412 | A1 * | 7/2008 | Tagome et al. | 348/374 |
| 2008/0259470 | A1 * | 10/2008 | Chung | 359/823 |
| 2009/0256956 | A1 * | 10/2009 | Furuhashi et al. | 348/376 |

FOREIGN PATENT DOCUMENTS

| | | |
|---|---|---|
| EP | 1 775 615 A1 | 4/2007 |
| JP | 2006-201525 | 8/2006 |
| JP | 2006-227100 | 8/2006 |
| JP | 2006-251461 | 9/2006 |
| JP | 2006-337927 | 12/2006 |
| JP | 2007-33873 | 2/2007 |
| JP | 2007-94235 | 4/2007 |
| JP | 2007-108596 | 4/2007 |
| JP | 2007-316395 | 12/2007 |

(Continued)

OTHER PUBLICATIONS

Search Report issued Nov. 5, 2010, in European Patent Application No. 09162924.6-2202/2136549.

*Primary Examiner* — Lin Ye
*Assistant Examiner* — John H Morehead, III
(74) *Attorney, Agent, or Firm* — Oblon, Spivak, McClelland, Maier & Neustadt, L.L.P.

(57) ABSTRACT

A camera module includes a lens barrel, a lens holder, an image pickup device, and a plurality of springs supporting the lens holder in such a manner that the lens holder is movable along an optical axis of an imaging optical system. Each of the springs includes first and second arm portions extending perpendicularly to each other in a plane perpendicular to the optical axis. Each of the first and second arm portions includes two parallel spring strips that are connected to each other by an arc portion. One of the spring strips of the first arm portion is connected to one of the spring strips of the second arm portion. The other one of the spring strips of the first arm portion is attached to the lens holder, and the other one of the spring strips of the second arm portion is attached to the lens barrel.

7 Claims, 57 Drawing Sheets

FOREIGN PATENT DOCUMENTS

| | | |
|---|---|---|
| JP | 2007-322540 | 12/2007 |
| JP | 2008-32768 | 2/2008 |
| JP | 2008-33252 | 2/2008 |
| JP | 2008-58733 | 3/2008 |
| JP | 2008-111873 | 5/2008 |
| JP | 2008-116622 | 5/2008 |
| JP | 2008-139811 | 6/2008 |
| JP | 2008-261937 | 10/2008 |

* cited by examiner

CAMERA MODULE

BACKGROUND OF THE INVENTION

1. Field of the Invention

The present invention relates to a camera module built, for example, in a portable electronic apparatus.

2. Description of the Related Art

In recent years, electronic apparatuses, such as mobile phones or PDAs (Personal Digital Assistants), having built-in camera modules have been provided.

A camera module of this type includes a lens barrel, a lens holder for holding an imaging optical system, an image pickup device for picking up an object image that has been guided by the imaging optical system, and springs for supporting the lens holder in such a manner that the lens holder is movable along an optical axis of the imaging optical system (Japanese Unexamined Patent Application Publication No. 2006-227100).

Because portable electronic apparatuses have been becoming smaller and thinner in recent years, further miniaturization of the camera modules is desired, which has made miniaturization of the springs a significant issue.

SUMMARY OF THE INVENTION

A miniaturized spring, however, may be disadvantageous in securing durability of the spring when a shock or a vibration is applied to the camera module in a direction perpendicular to the optical axis of the imaging optical system.

The present invention, which has been achieved against such a background, provides a camera module that is miniaturized and also advantageous in improving durability.

A camera module according to an embodiment of the present invention includes a lens barrel providing an accommodation space, a lens holder accommodated in the accommodation space, the lens holder holding an imaging optical system, an image pickup device supported by the lens barrel, the image pickup device picking up an object image that has been guided by the imaging optical system, and a plurality of springs supporting the lens holder in such a manner that the lens holder is movable along an optical axis of the imaging optical system, wherein each of the plurality of springs includes a first arm portion and a second arm portion extending perpendicularly to each other in a plane perpendicular to the optical axis of the imaging optical system, wherein each of the first and second arm portions includes two spring strips extending parallel to each other, thickness directions of the spring strips being parallel to the optical axis, wherein, in each of the first and second arm portions, the two spring strips are connected to each other by an arc portion at longitudinal ends of the two spring strips remote from a region in which the first and second arm portions perpendicularly intersect, the arc portion having a diameter larger than a distance between the two spring strips, wherein, in the region in which the first and second arm portions perpendicularly intersect, one of the two spring strips of the first arm portion is connected to one of the two spring strips of the second arm portion, wherein, in the region in which the first and second arm portions perpendicularly intersect, a longitudinal end of the other one of the two spring strips of the first arm portion is attached to the lens holder, and wherein, in the region in which the first and second arm portions perpendicularly intersect, a longitudinal end of the other one of the two spring strips of the second arm portion is attached to the lens barrel.

According to the embodiment of the present invention, when a force perpendicular to the optical axis is applied to the lens holder, the force is not focused on only one of the first and second arm portions, which is advantageous in improving the durability of the spring and miniaturizing the spring.

DESCRIPTION OF THE PREFERRED EMBODIMENTS

An embodiment of the present invention is described with reference to the drawings.

Figure 1A:
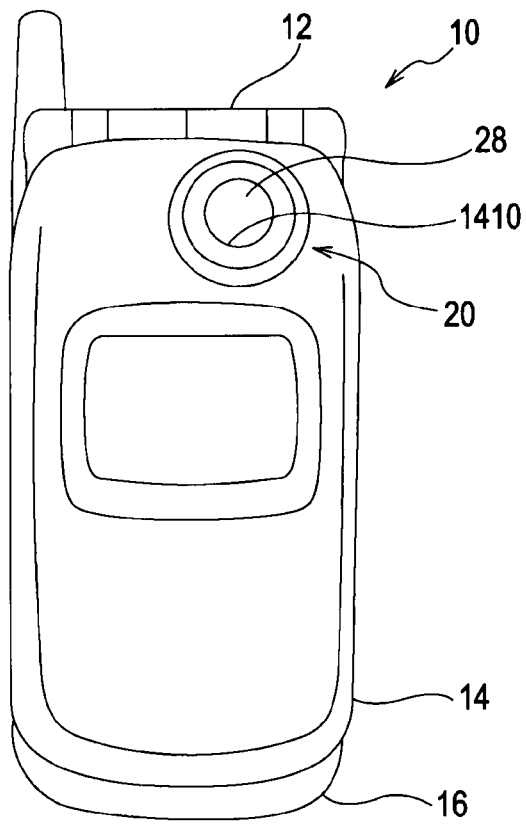
FIGS. 1A and 1B are external views showing an example of an electronic apparatus including a camera module according to an embodiment.
Figure 1B:
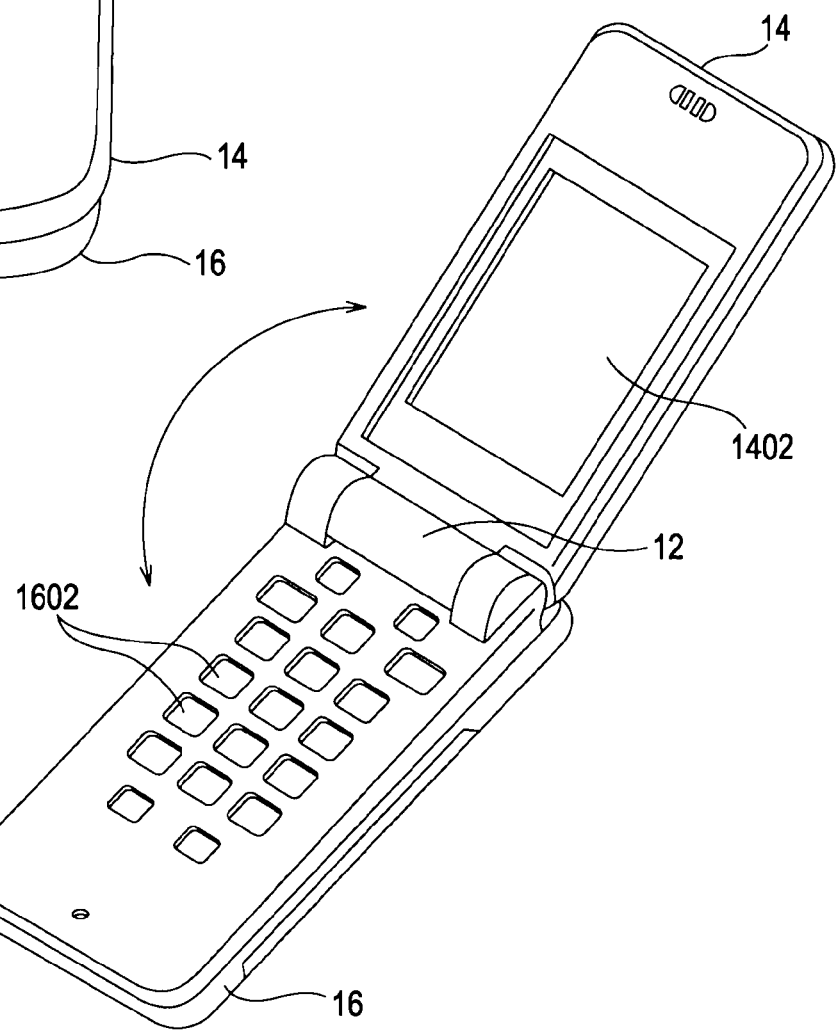

FIGS. 1A and 1B are external views showing an example of an electronic apparatus including a camera module 20 according to an embodiment of the present invention.

As shown in FIG. 1, an electronic apparatus 10 is a mobile phone having first and second housings 14 and 16 pivotally connected to each other with a hinge 12.

A liquid crystal display panel 1402 is disposed on an inner surface of the first housing 14. Operation switches 1602 including numeric keys and function keys are disposed on an inner surface of the second housing 16.

The camera module 20 is disposed in the first housing 14. An image picked up with the camera module 20 is displayed on the liquid crystal display panel 1402.

The camera module 20 includes an imaging optical system 28 for picking up an object image. The imaging optical system 28 faces an opening 1410 formed in the first housing 14.

The structure of the camera module 20 according to an embodiment of the present invention is described in detail.

Figure 2:
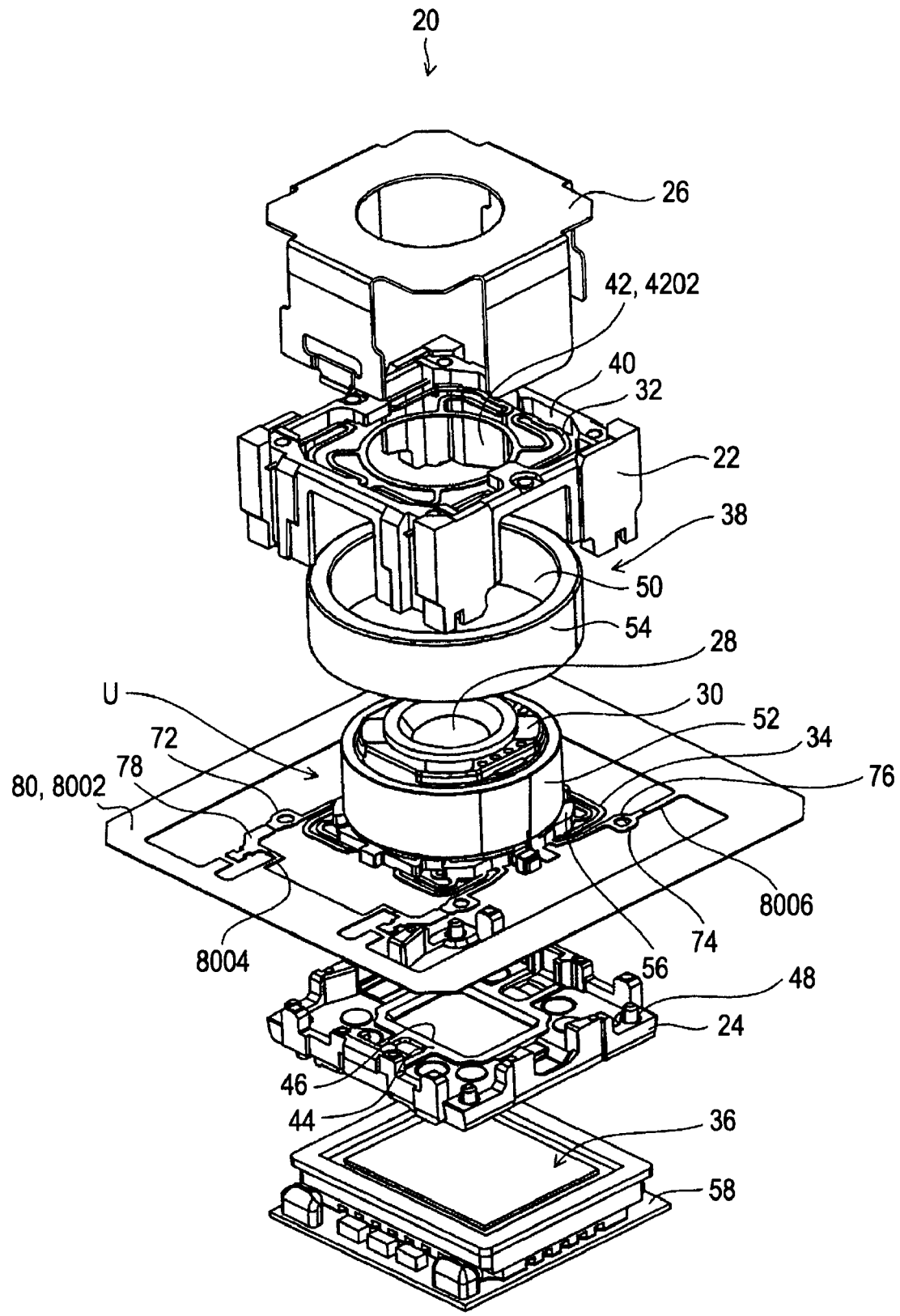
FIG. 2 is a view for explaining how the camera module is assembled.
Figure 3:
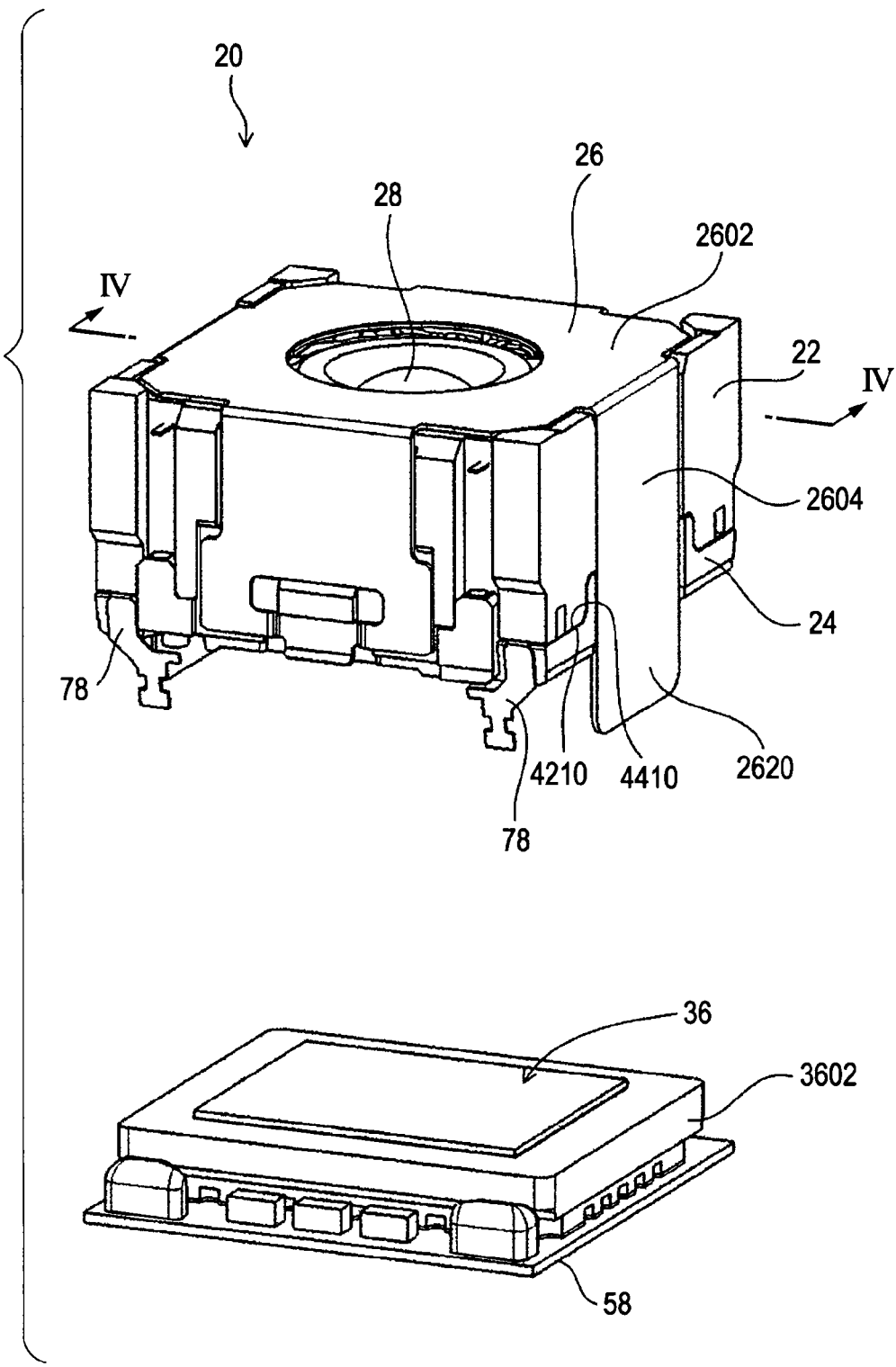
FIG. 3 is an exploded view of the camera module.
Figure 4:
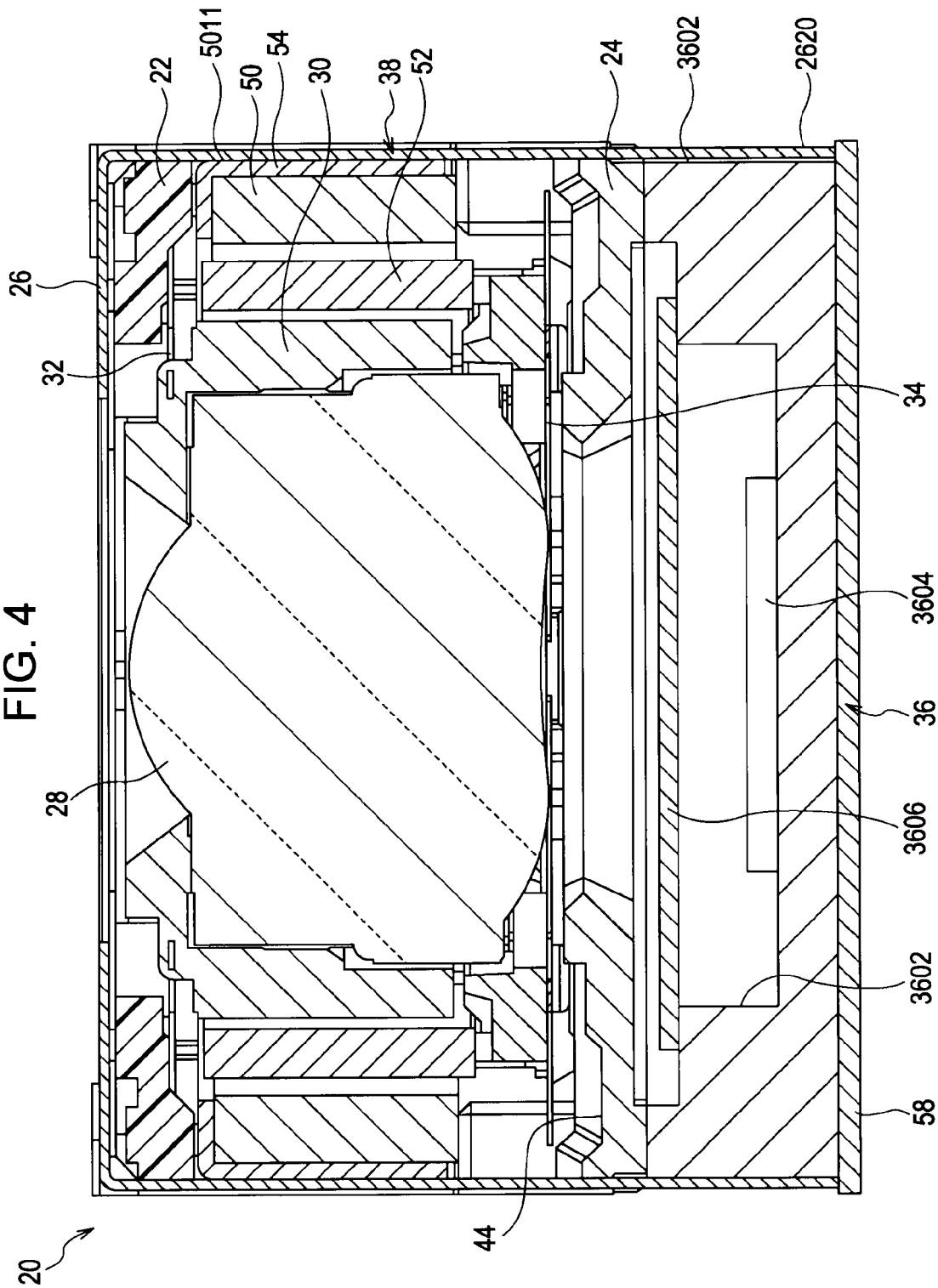
FIG. 4 is a sectional view of the camera module taken along line IV-IV of FIG. 3.

FIG. 2 is a view for explaining how the camera module 20 is assembled, FIG. 3 is an exploded view of the camera module 20, and FIG. 4 is a sectional view of the camera module 20 taken along line IV-IV of FIG. 3.

In the description of the present embodiment, the term "front" refers to a side facing an object, and the term "rear" refers to the opposite side.

As shown in FIG. 2, the camera module 20 includes the imaging optical system 28, a front lens barrel 22, a rear lens barrel 24, a cover 26, a lens holder 30, front springs 32, rear springs 34, an image pickup device 36, and a driving section 38.

Figure 5:
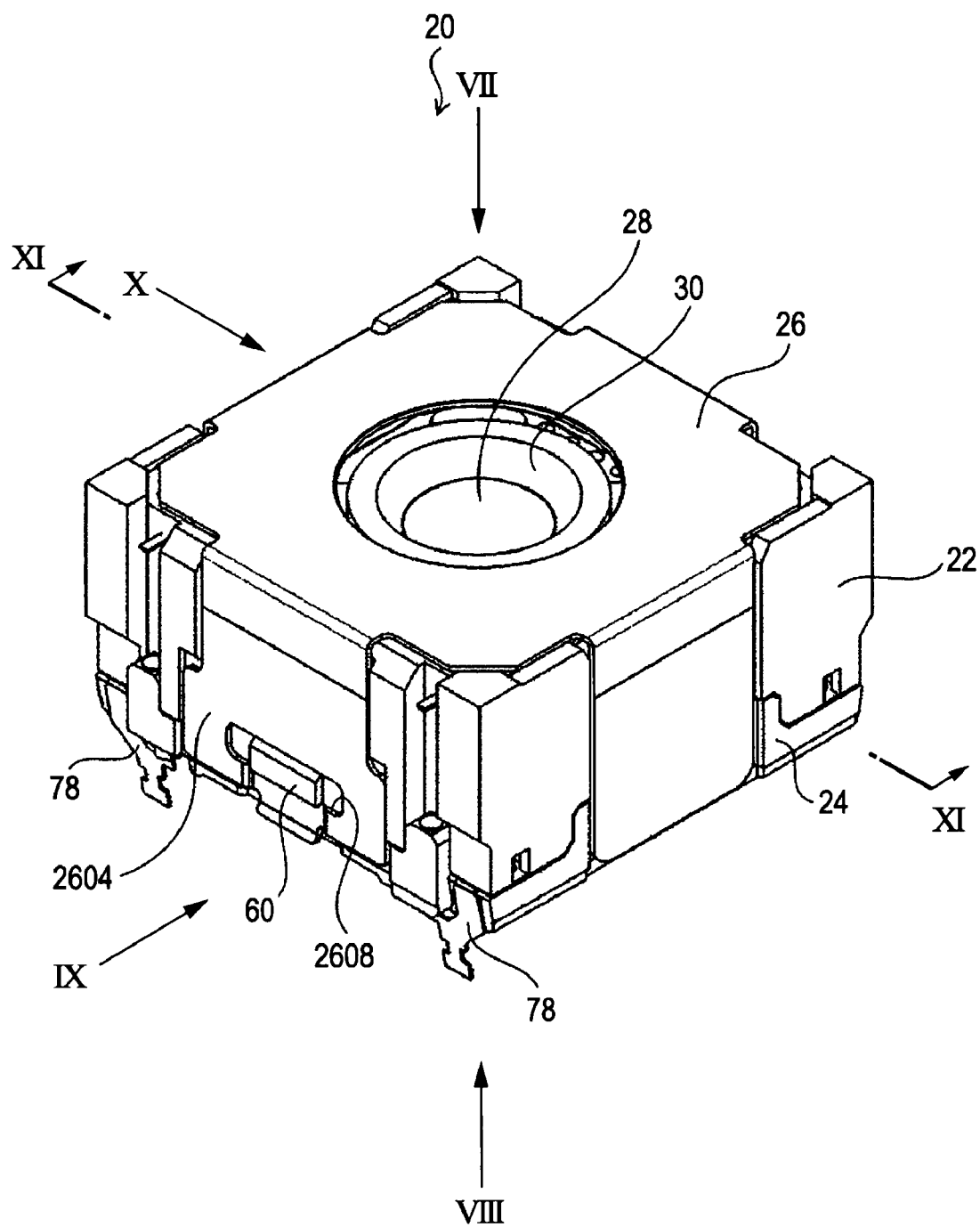
FIG. 5 is a front perspective view of the camera module.
Figure 6:
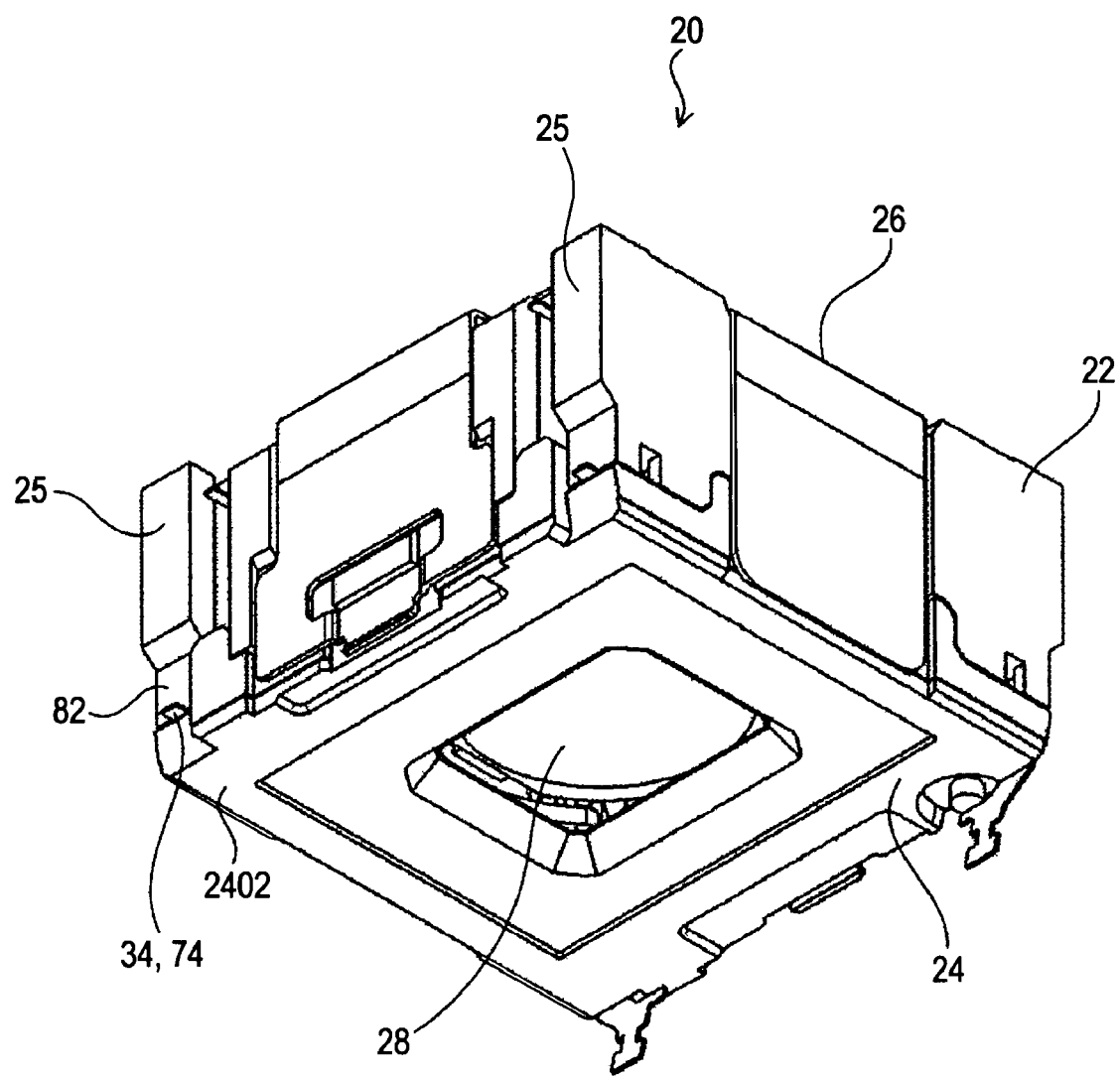
FIG. 6 is a rear perspective view of the camera module.
Figure 7:
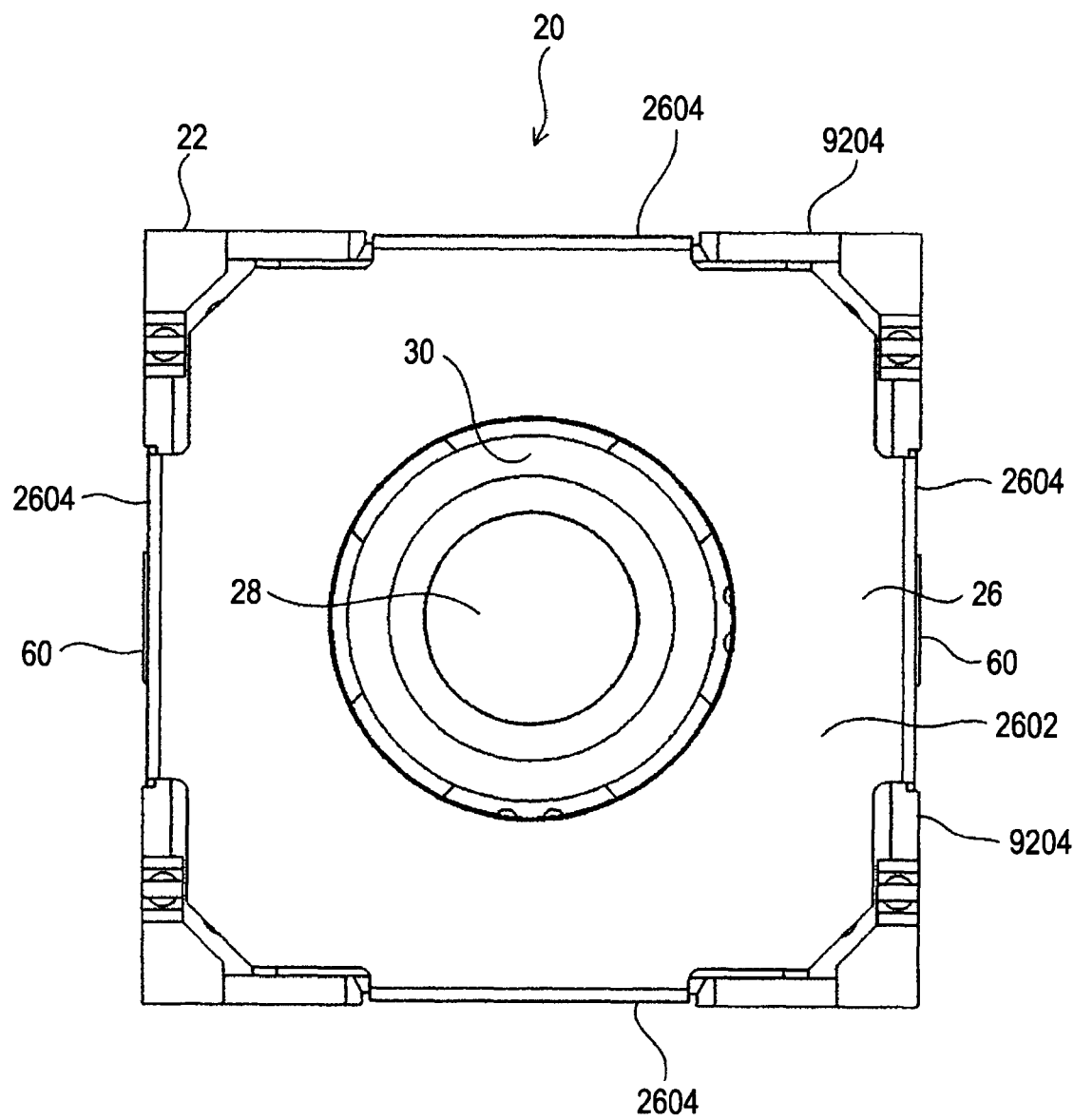
FIG. 7 shows the camera module when viewed in the direction of arrow VII of FIG. 5.
Figure 8:
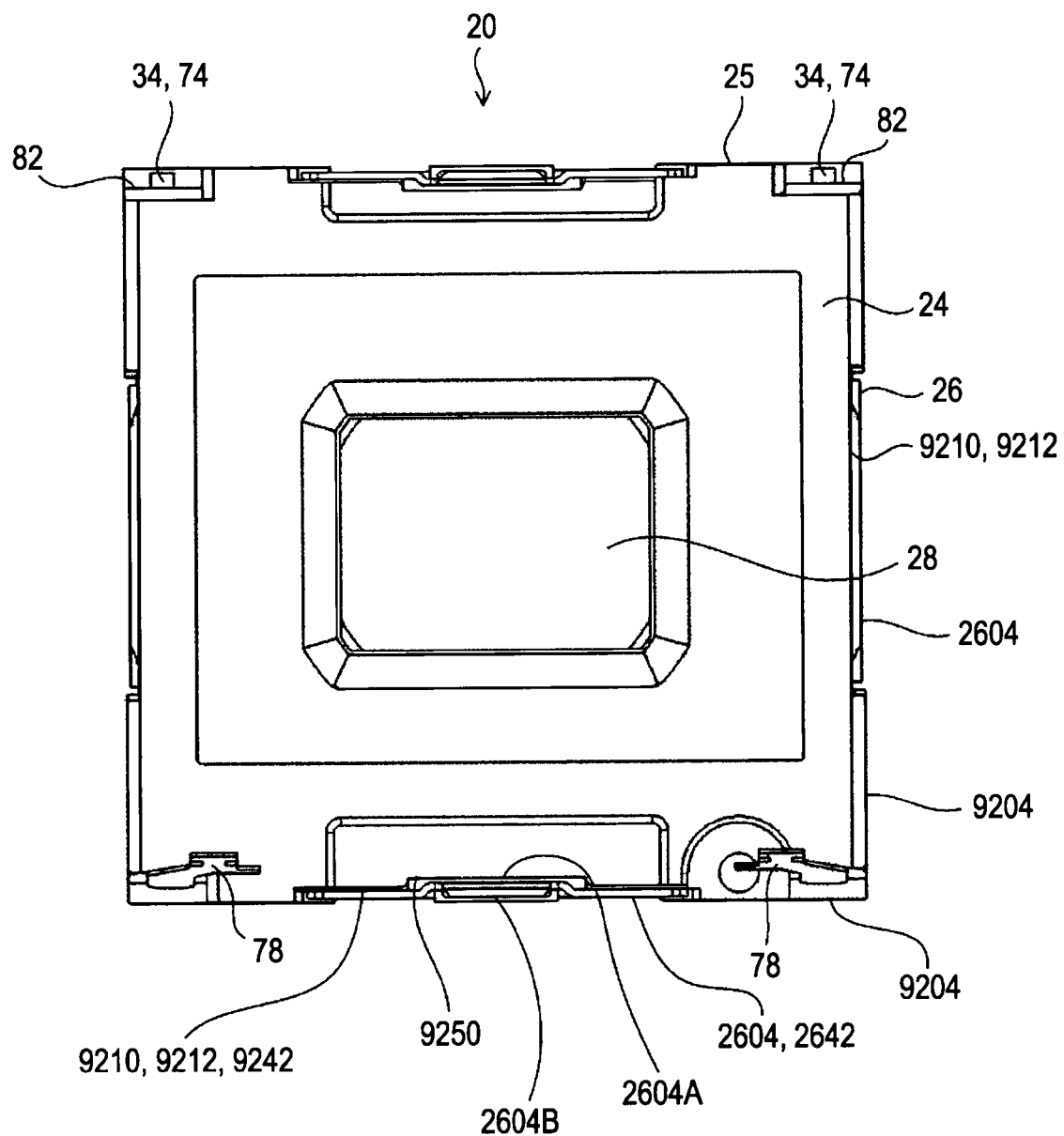
FIG. 8 shows the camera module when viewed in the direction of arrow VIII of FIG. 5.
Figure 9:
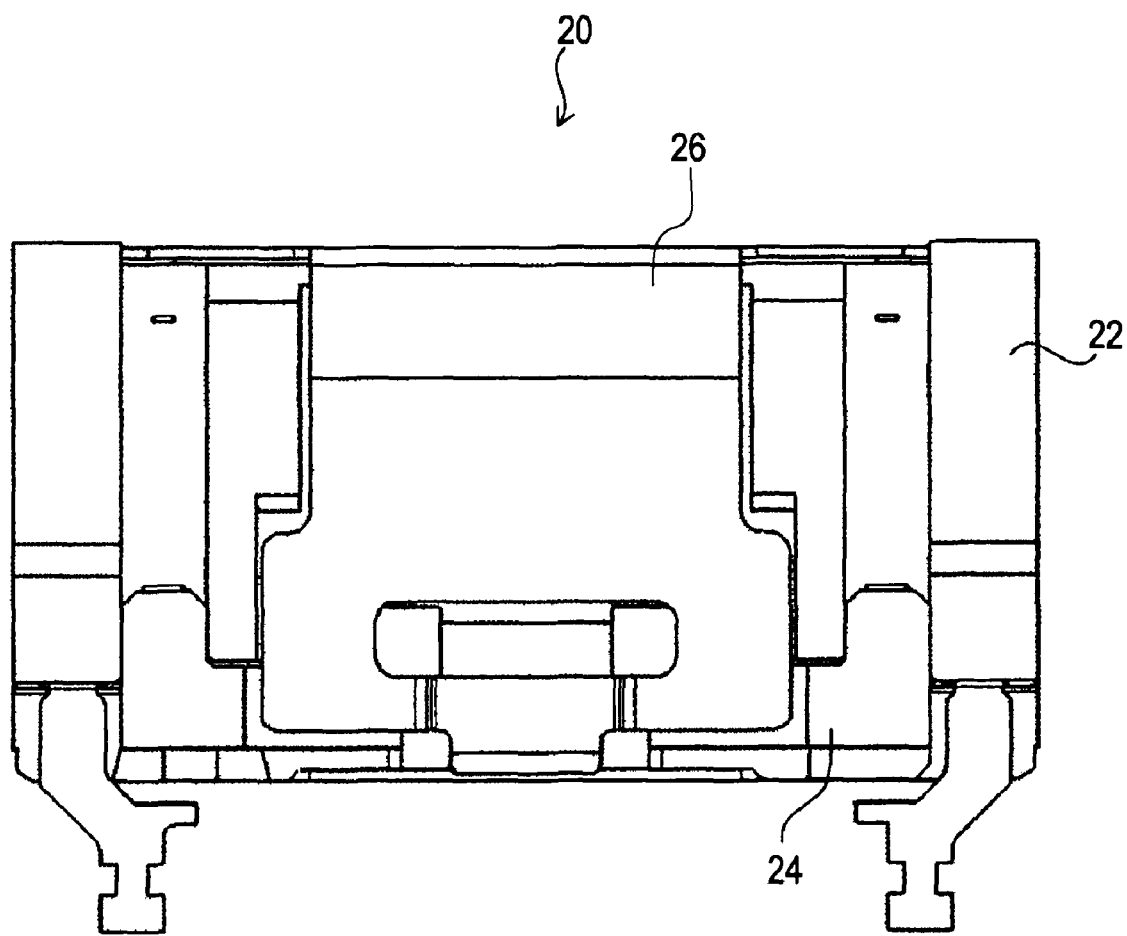
FIG. 9 shows the camera module when viewed in the direction of arrow IX of FIG. 5.
Figure 10:
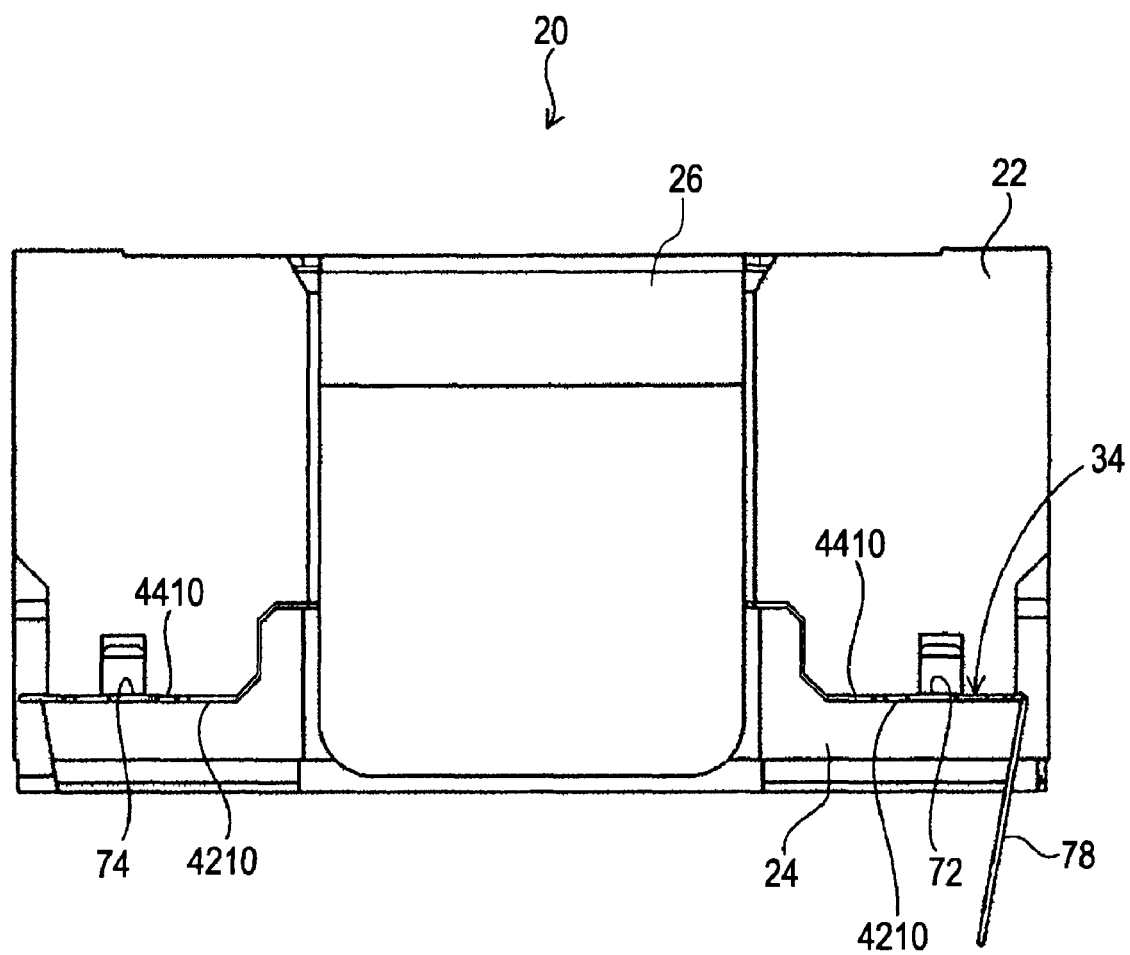
FIG. 10 shows the camera module when viewed in the direction of arrow X of FIG. 5.
Figure 11:
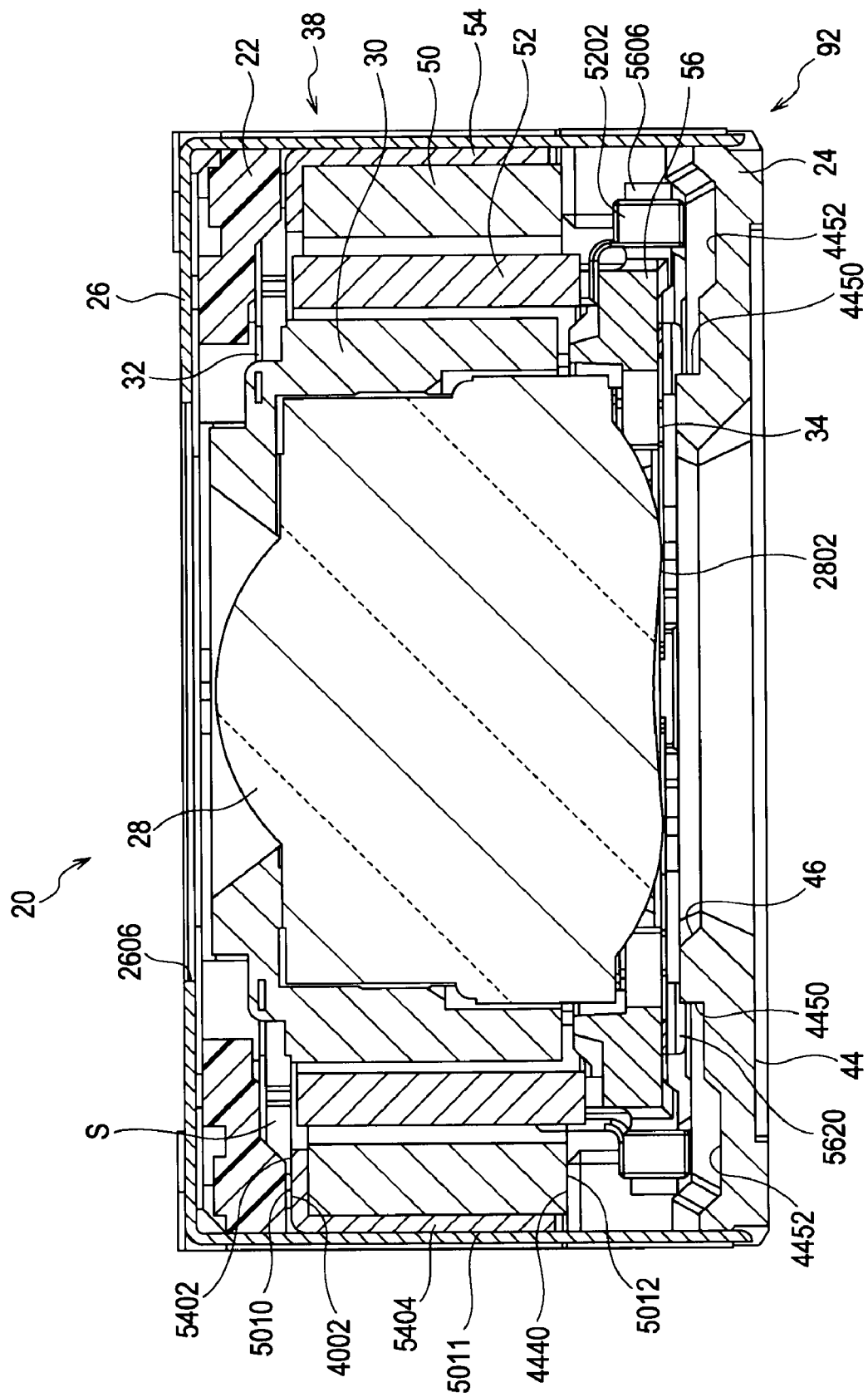
FIG. 11 is a sectional view of the camera module taken along line XI-XI of FIG. 5.

FIG. 5 is a front perspective view of the camera module 20, FIG. 6 is a rear perspective view of the camera module 20, FIG. 7 shows the camera module 20 when viewed in the direction of arrow VII of FIG. 5, FIG. 8 shows the camera module 20 when viewed in the direction of arrow VIII of FIG. 5, FIG. 9 shows the camera module 20 when viewed in the direction of arrow IX of FIG. 5, and FIG. 10 shows the camera module 20 when viewed in the direction of arrow X of FIG. 5, and FIG. 11 is a sectional view of the camera module 20 taken along line XI-XI of FIG. 5.

FIGS. 5 to 11 show the camera module 20 from which the image pickup device 36 is removed.

Figure 12:
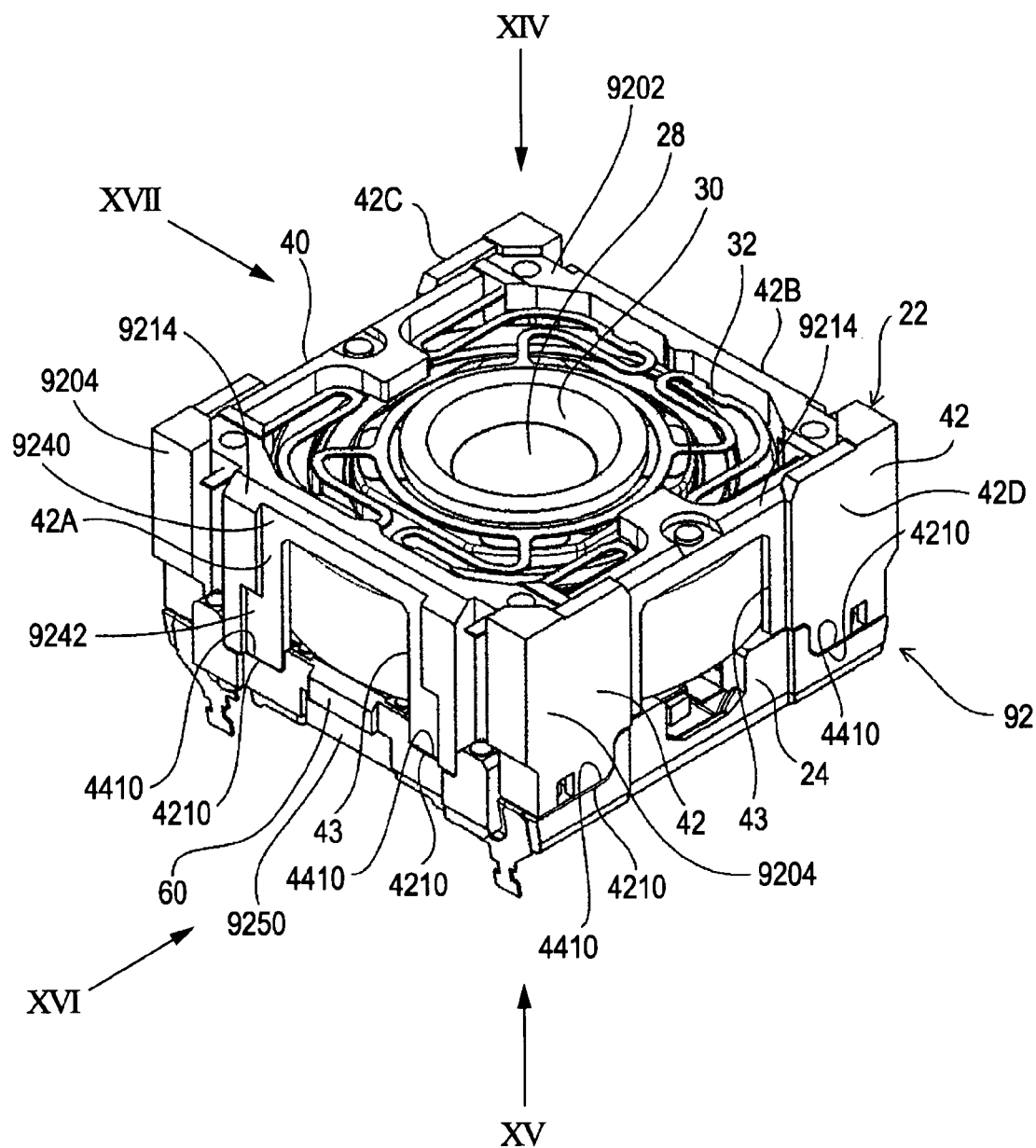
FIG. 12 is a front perspective view of a structure in which a cover is removed from the camera module shown in FIG. 5.
Figure 13:
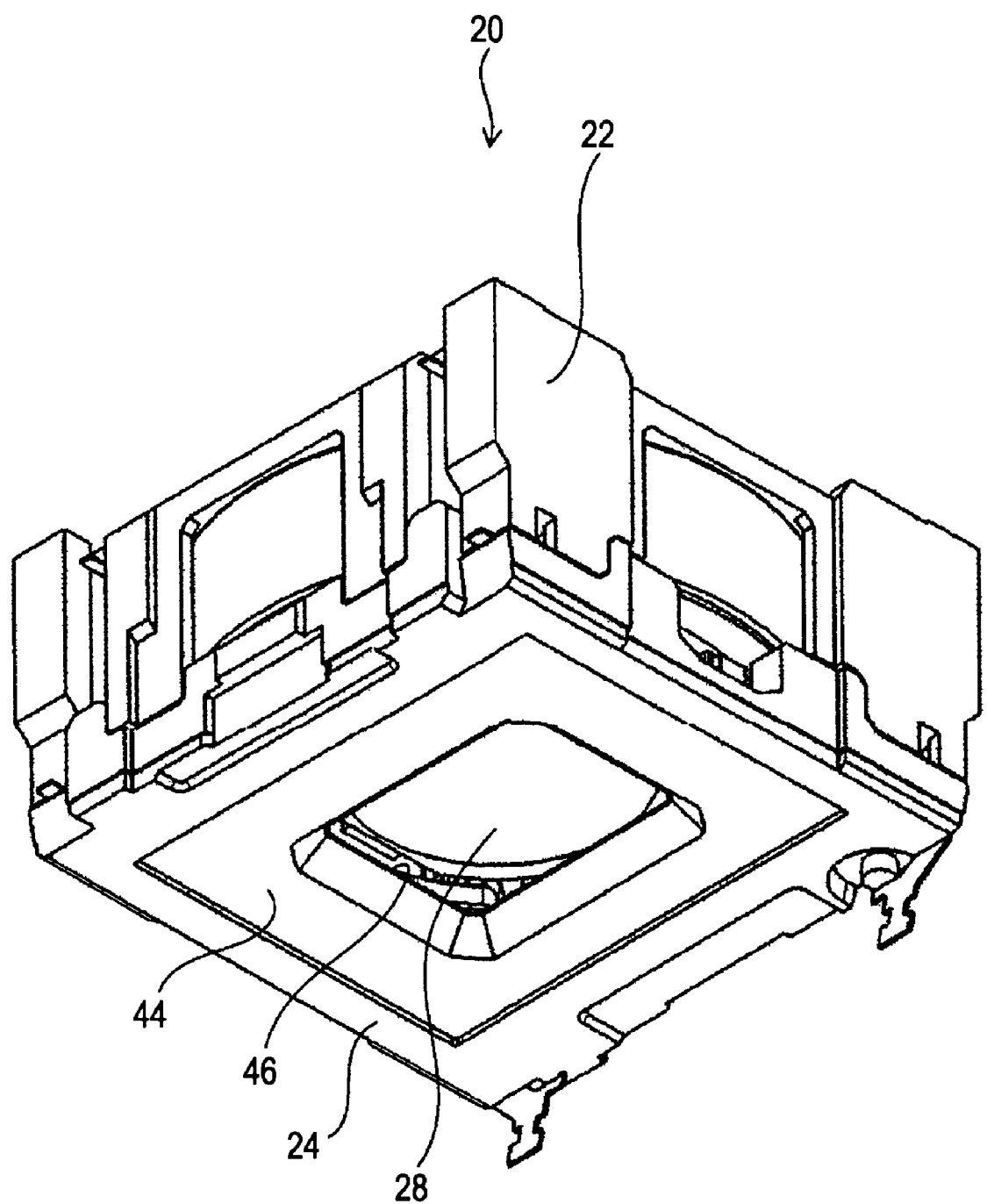
FIG. 13 is a rear perspective view of the structure shown in FIG. 12.
Figure 14:
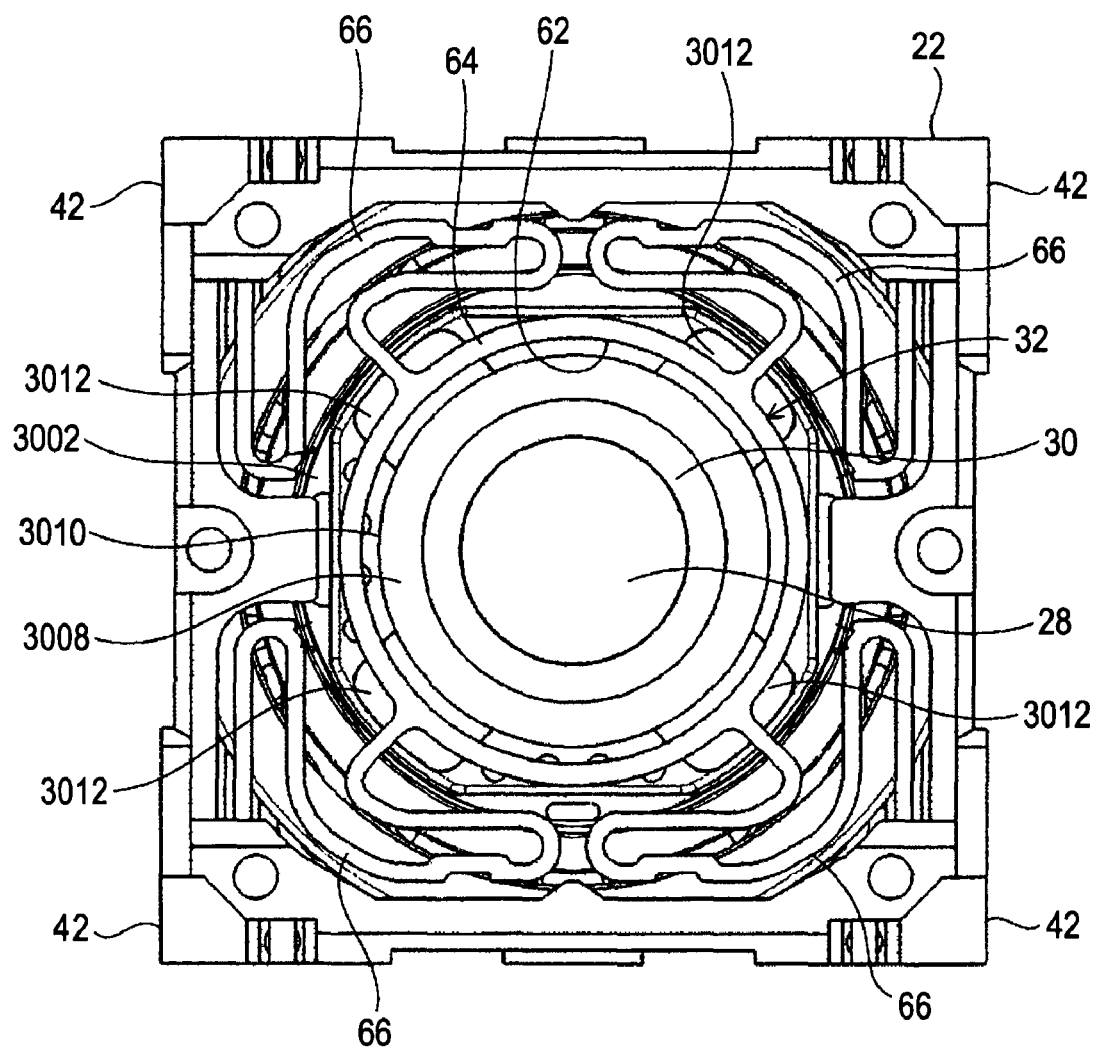
FIG. 14 shows the structure of FIG. 12 when viewed in the direction of arrow XIV.
Figure 15:
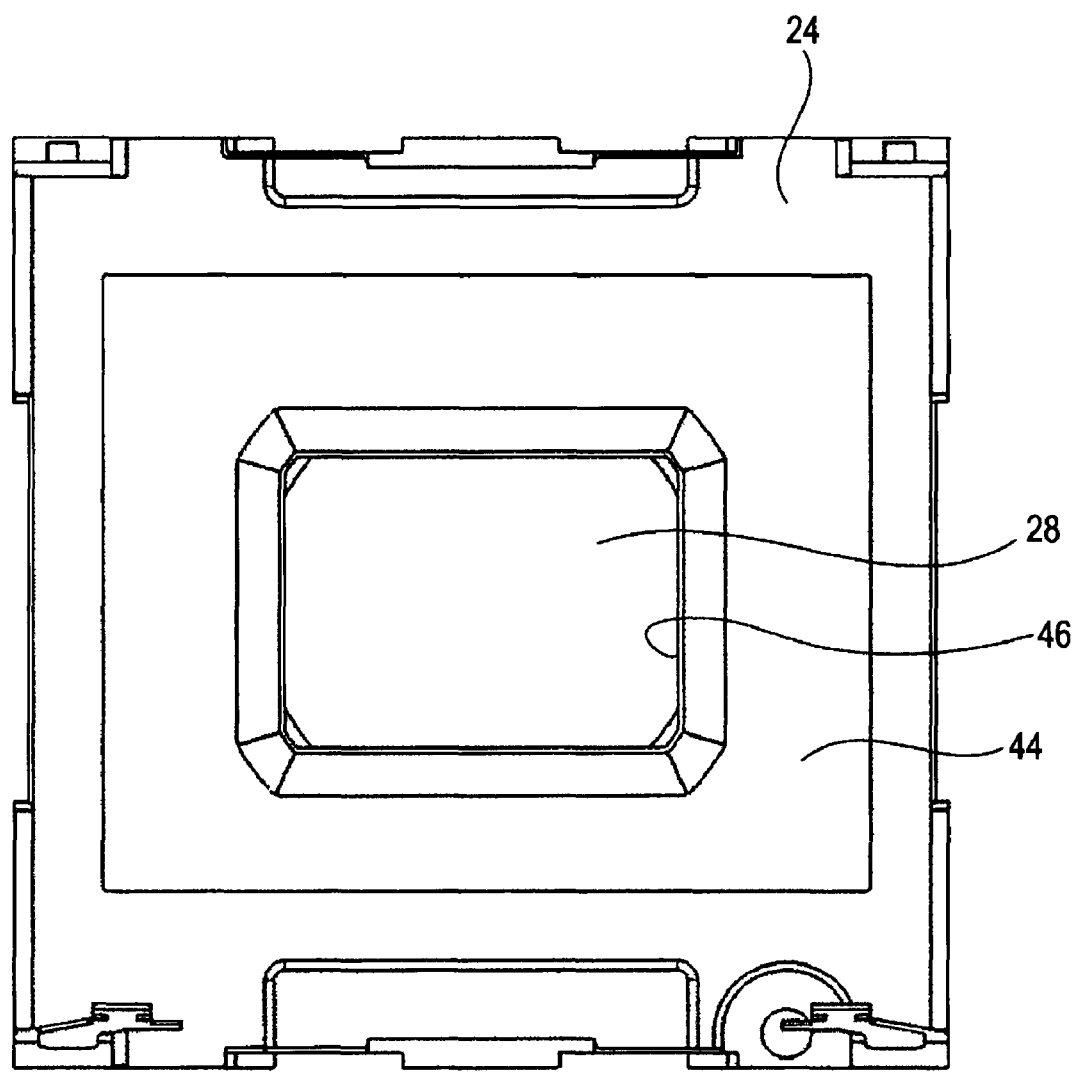
FIG. 15 shows the structure of FIG. 12 when viewed in the direction of arrow XV.
Figure 16:
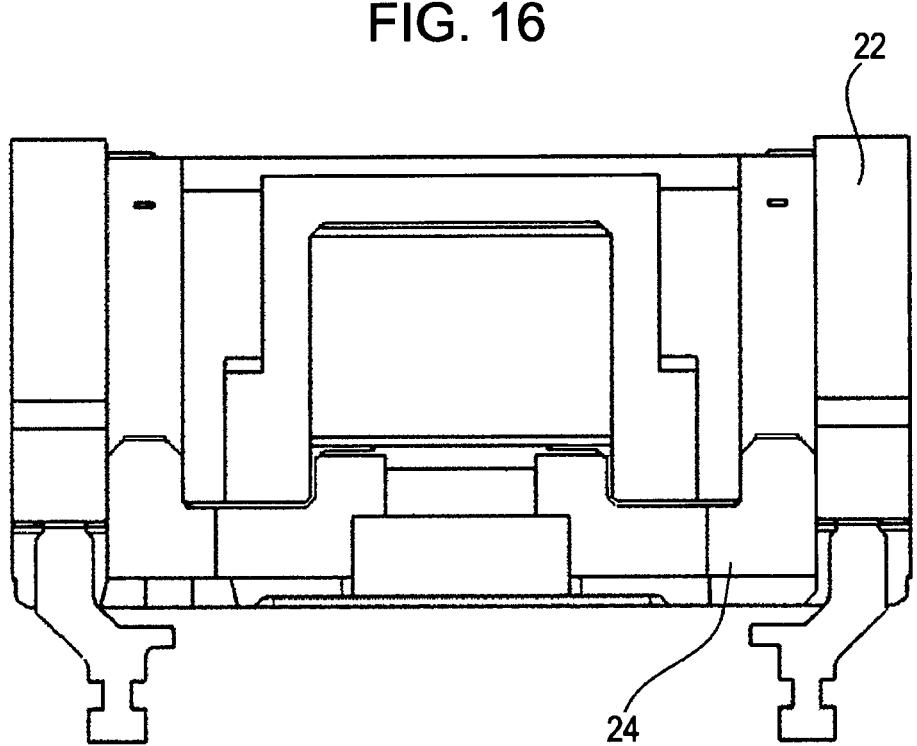
FIG. 16 shows the structure of FIG. 12 when viewed in the direction of arrow XVI.
Figure 17:
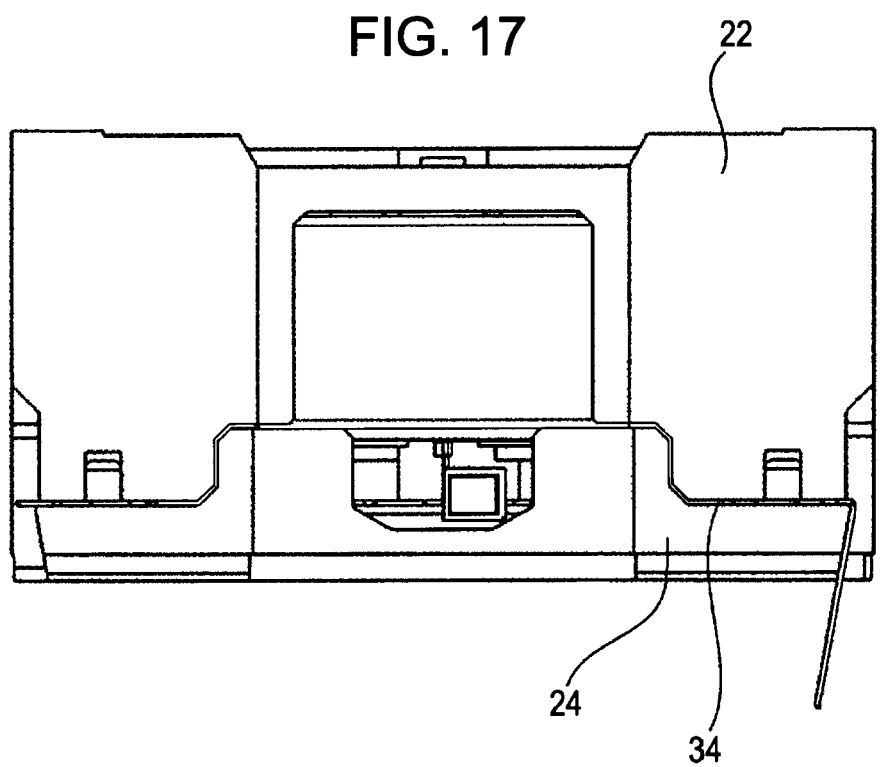
FIG. 17 shows the structure of FIG. 12 when viewed in the direction of arrow XVII.

FIG. 12 is a front perspective view of a structure in which the cover 26 is removed from the camera module 20 shown in FIG. 5, FIG. 13 is a rear perspective view of the structure shown in FIG. 12, FIG. 14 shows the structure of FIG. 12 when viewed in the direction of arrow XIV, FIG. 15 shows the structure of FIG. 12 when viewed in the direction of arrow XV, FIG. 16 shows the structure of FIG. 12 when viewed in the direction of arrow XVI, and FIG. 17 shows the structure when viewed in the direction of arrow XVII.

Figure 18:
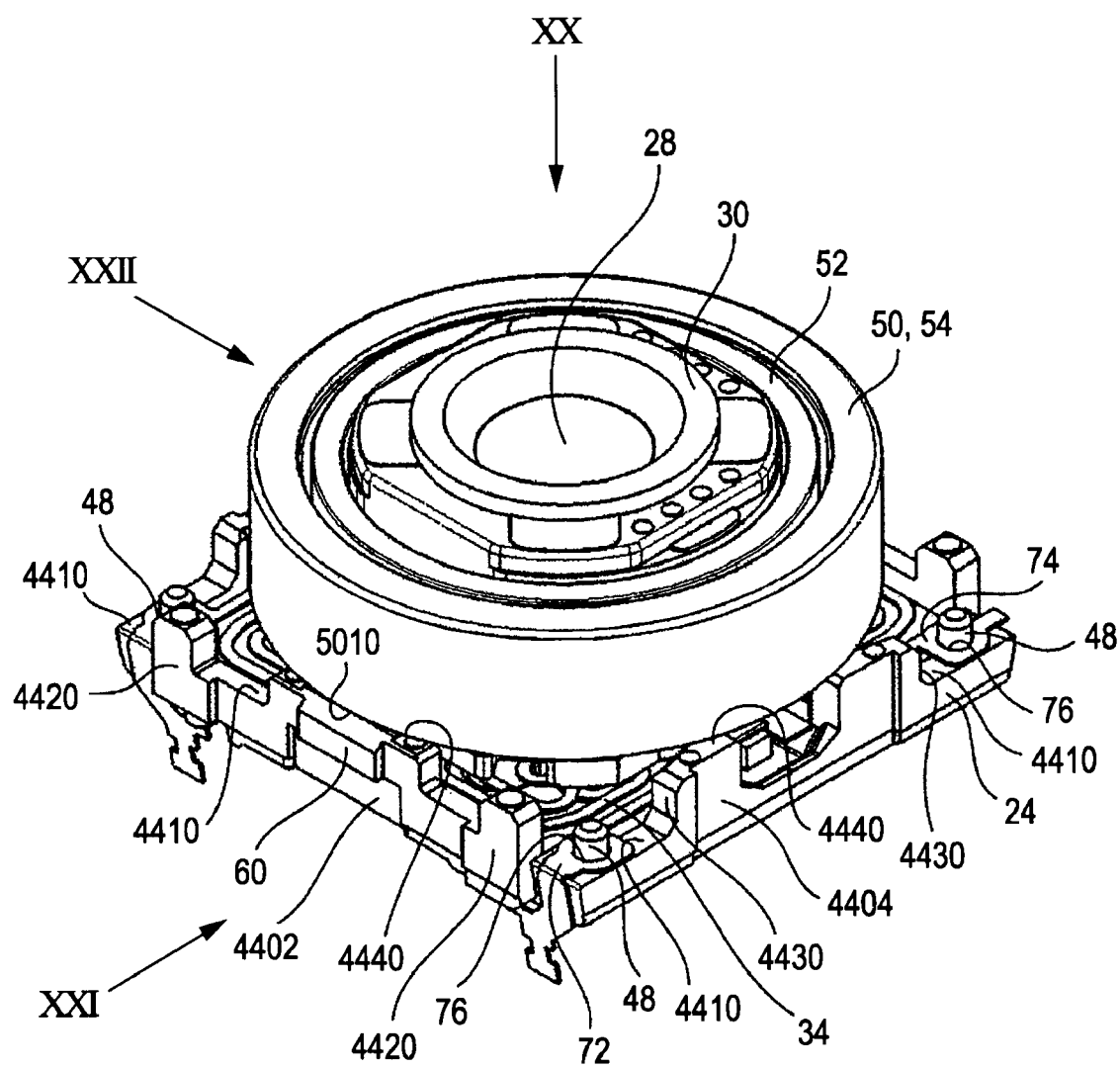
FIG. 18 is a front perspective view of a structure in which a front lens barrel is removed from the structure shown in FIG. 12.
Figure 19:
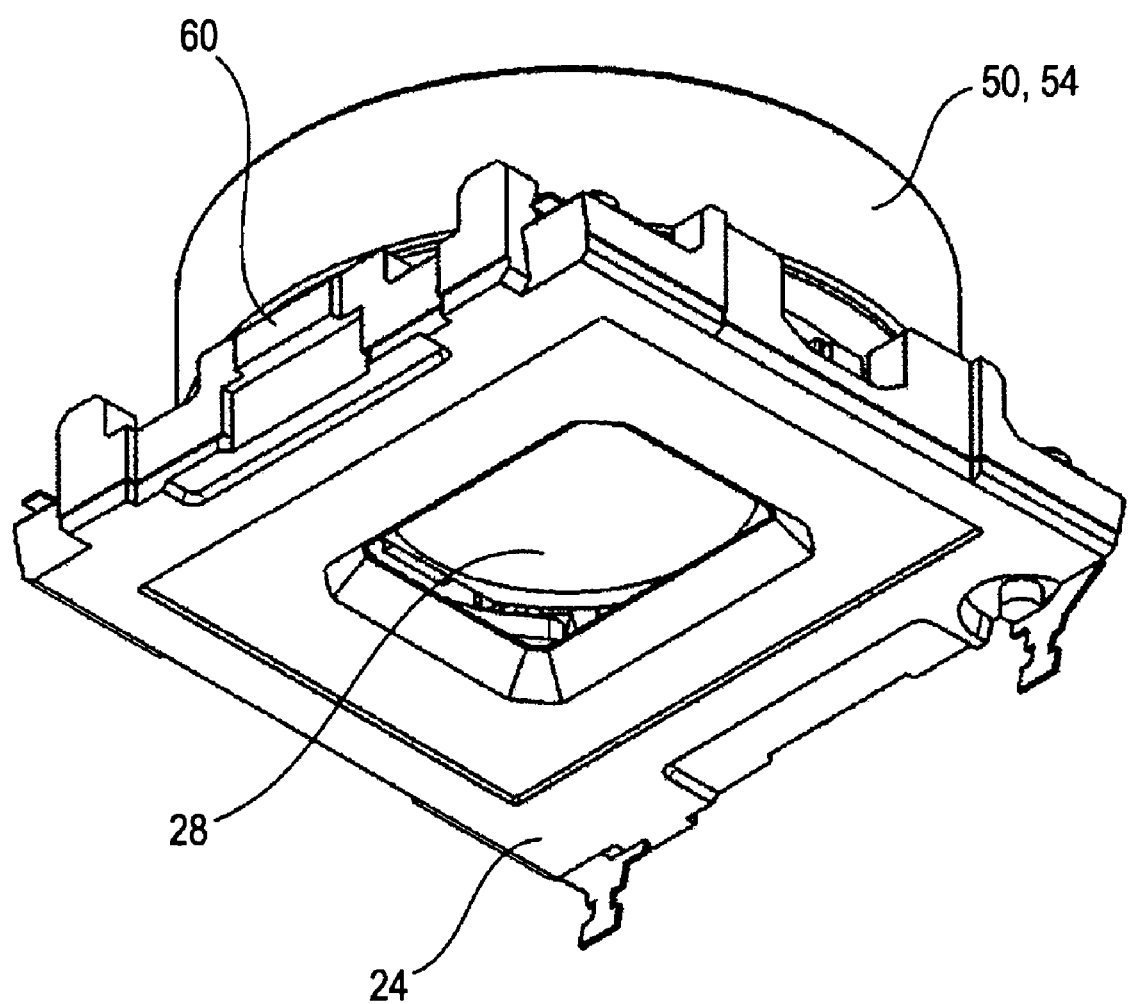
FIG. 19 is a rear perspective view of the structure shown in FIG. 18.
Figure 20:
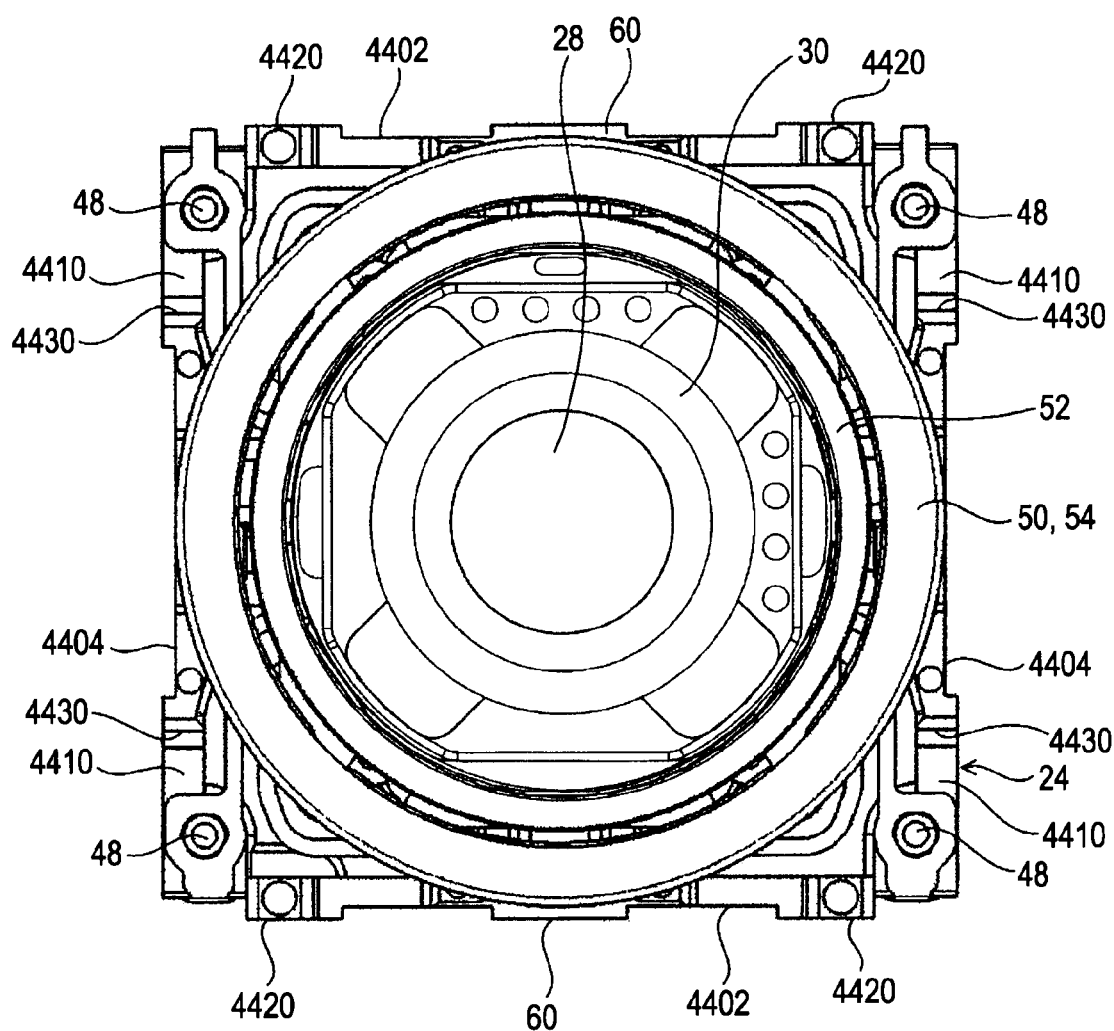
FIG. 20 shows the structure of FIG. 18 when viewed in the direction of arrow XX.
Figure 21:
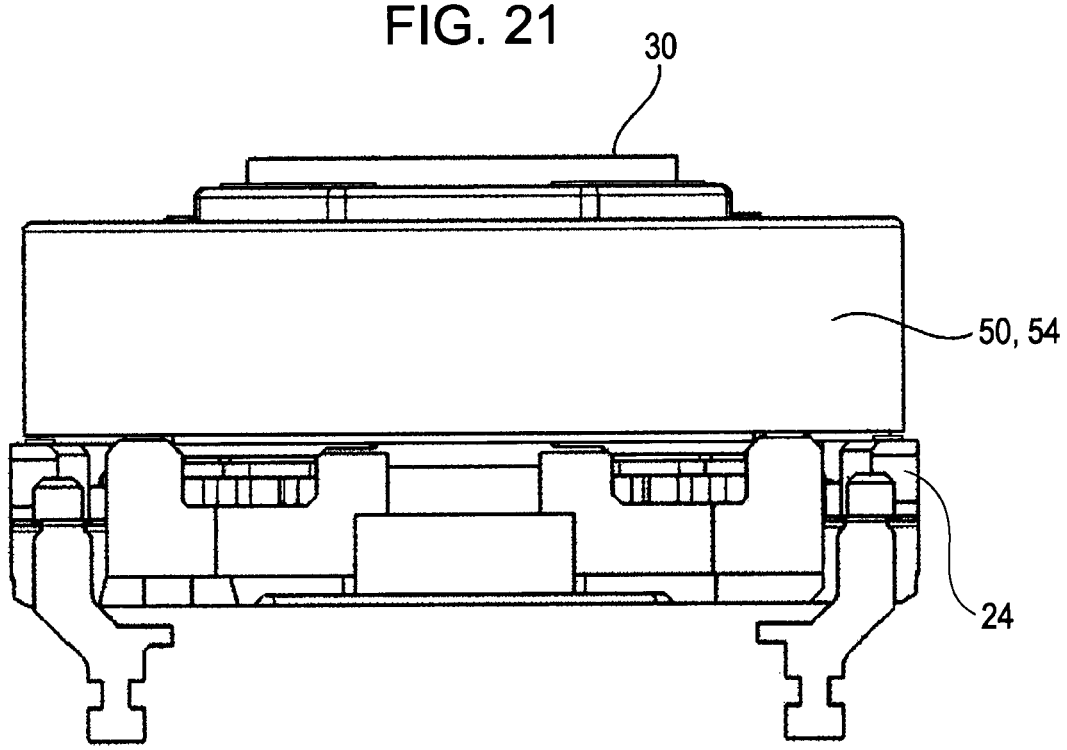
FIG. 21 shows the structure of FIG. 18 when viewed in the direction of arrow XXI.
Figure 22:
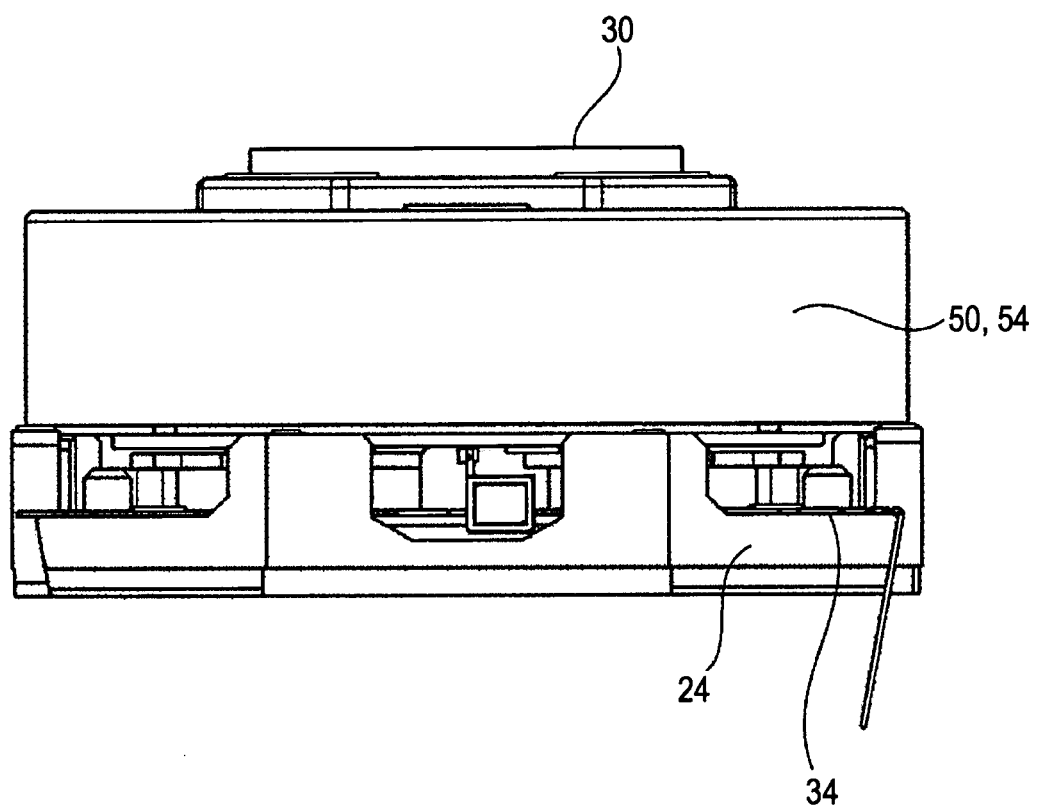
FIG. 22 shows the structure of FIG. 18 when viewed in the direction of arrow XXII.

FIG. 18 is a front perspective view of a structure in which the front lens barrel 22 is removed from the structure shown in FIG. 12, FIG. 19 is a rear perspective view of the structure shown in FIG. 18, FIG. 20 shows the structure of FIG. 18 when viewed in the direction of arrow XX, FIG. 21 shows the structure of FIG. 18 when viewed in the direction of arrow XXI, and FIG. 22 shows the structure of FIG. 18 when viewed in the direction of arrow XXII.

Figure 23:
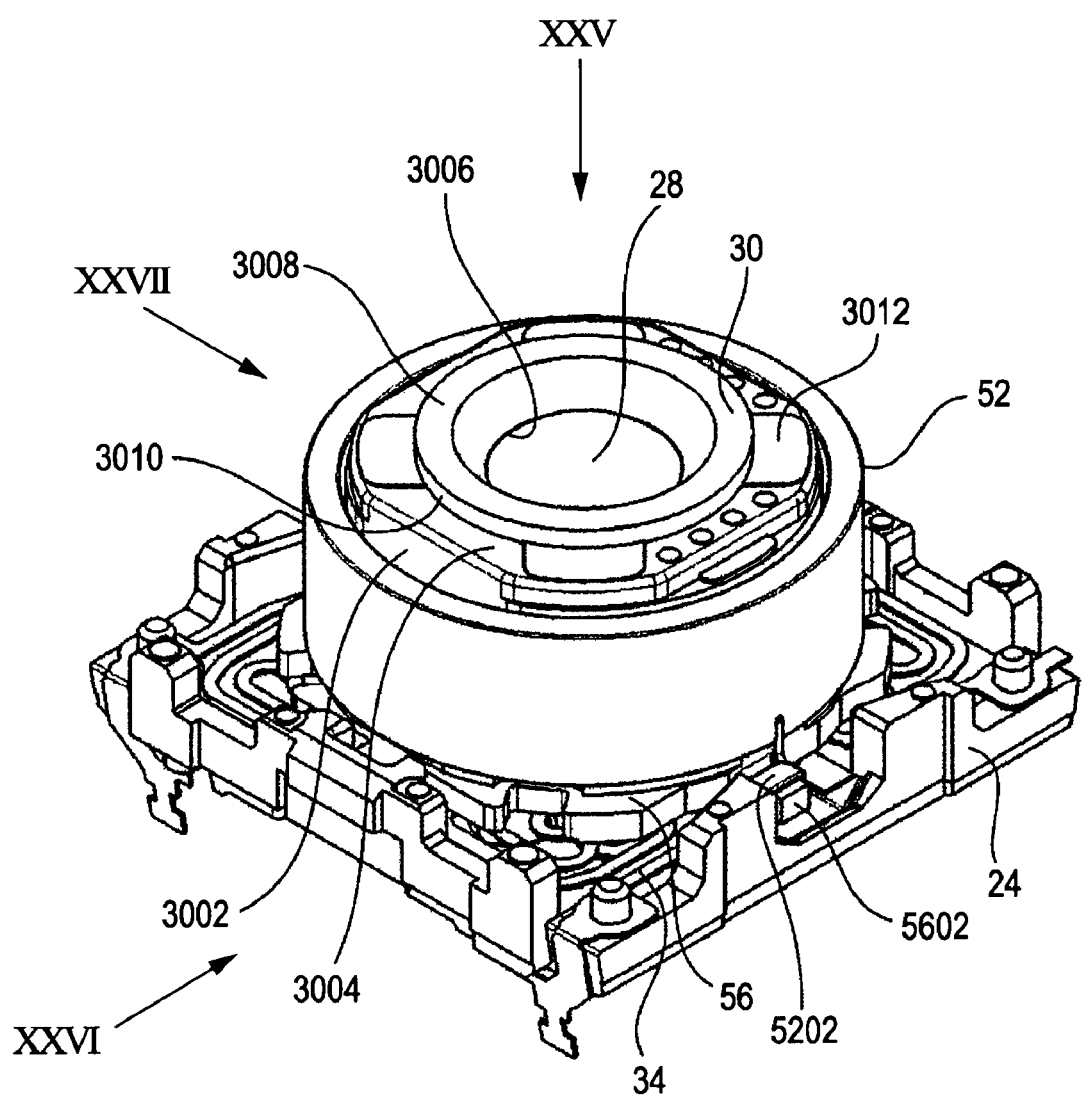
FIG. 23 is a front perspective view of a structure in which a magnet is removed from the structure shown in FIG. 18.
Figure 24:
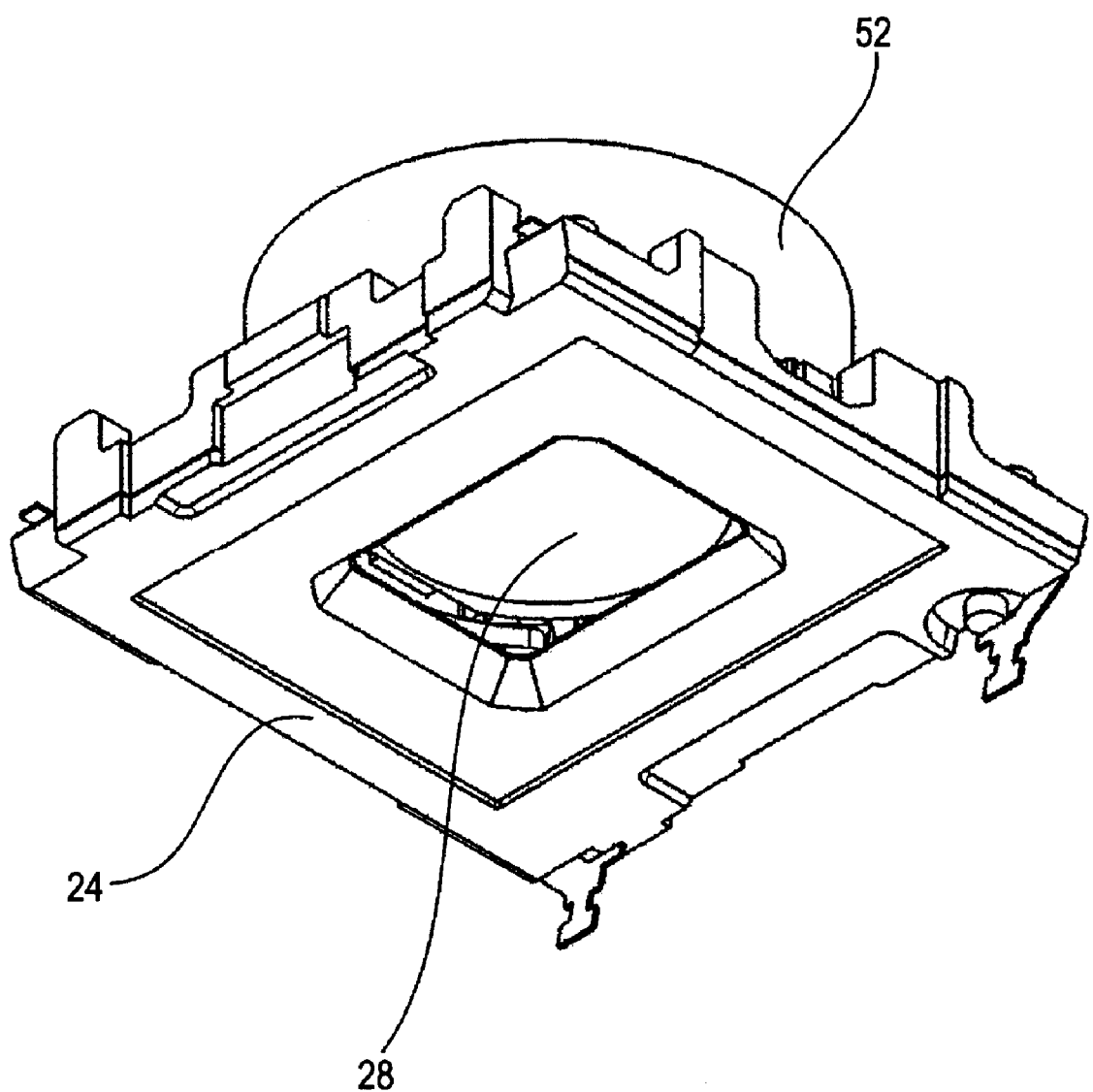
FIG. 24 is a rear perspective view of the structure shown in FIG. 23.
Figure 25:
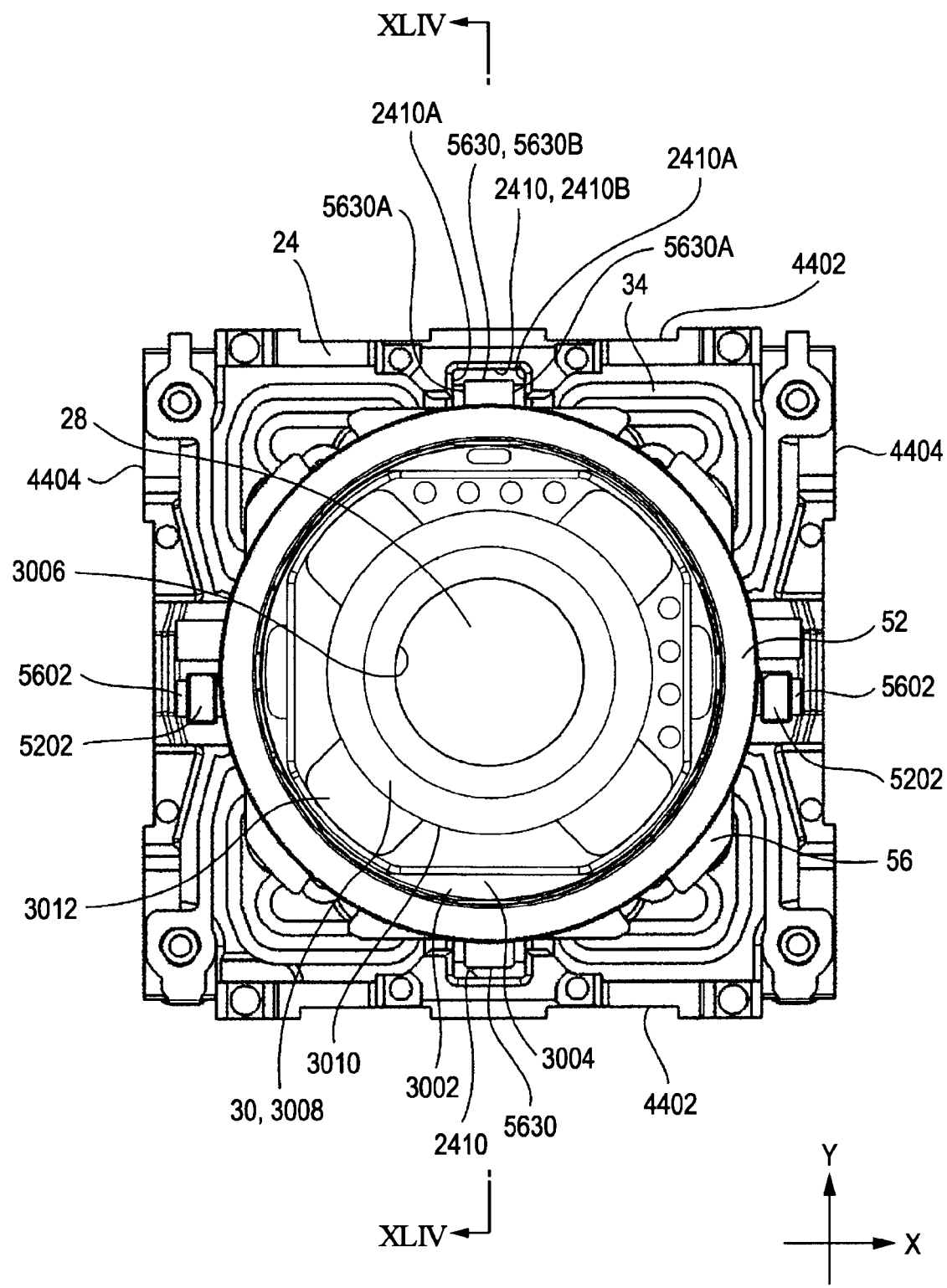
FIG. 25 shows the structure of FIG. 23 when viewed in the direction of arrow XXV.
Figure 26:
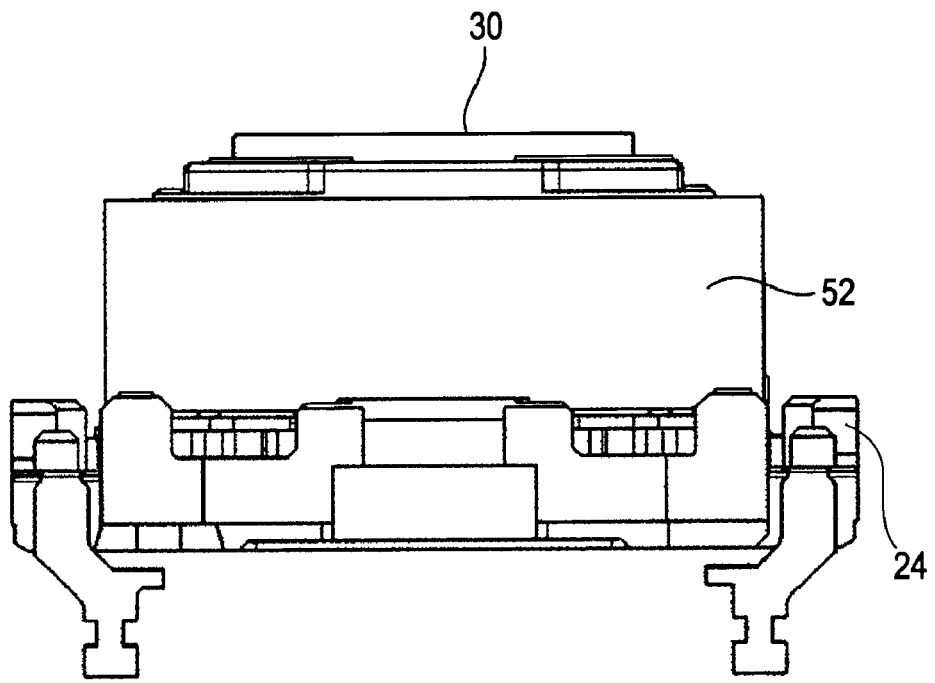
FIG. 26 shows the structure of FIG. 23 when viewed in the direction of arrow XXVI.
Figure 27:
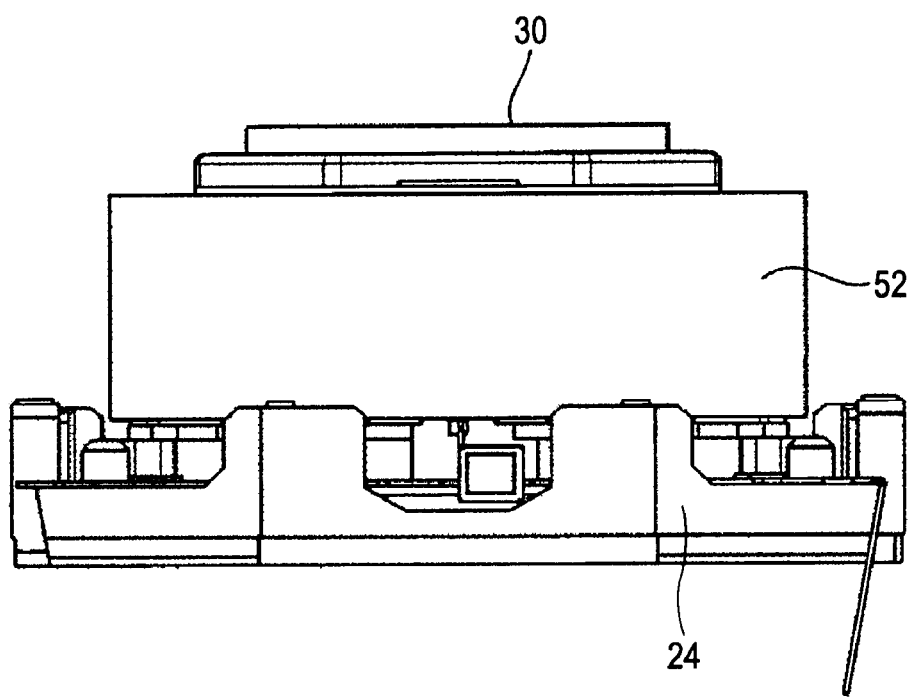
FIG. 27 shows the structure of FIG. 23 when viewed in the direction of arrow XXVII.

FIG. 23 is a front perspective view of a structure in which the magnet 50 is removed from the structure shown in FIG. 18, FIG. 24 is a rear perspective view of the structure shown in FIG. 23, FIG. 25 shows the structure of FIG. 23 when viewed in the direction of arrow XXV, FIG. 26 shows the structure of FIG. 23 when viewed in the direction of arrow XXVI, and FIG. 27 shows the structure of FIG. 23 when viewed in the direction of arrow XXVII.

Figure 28:
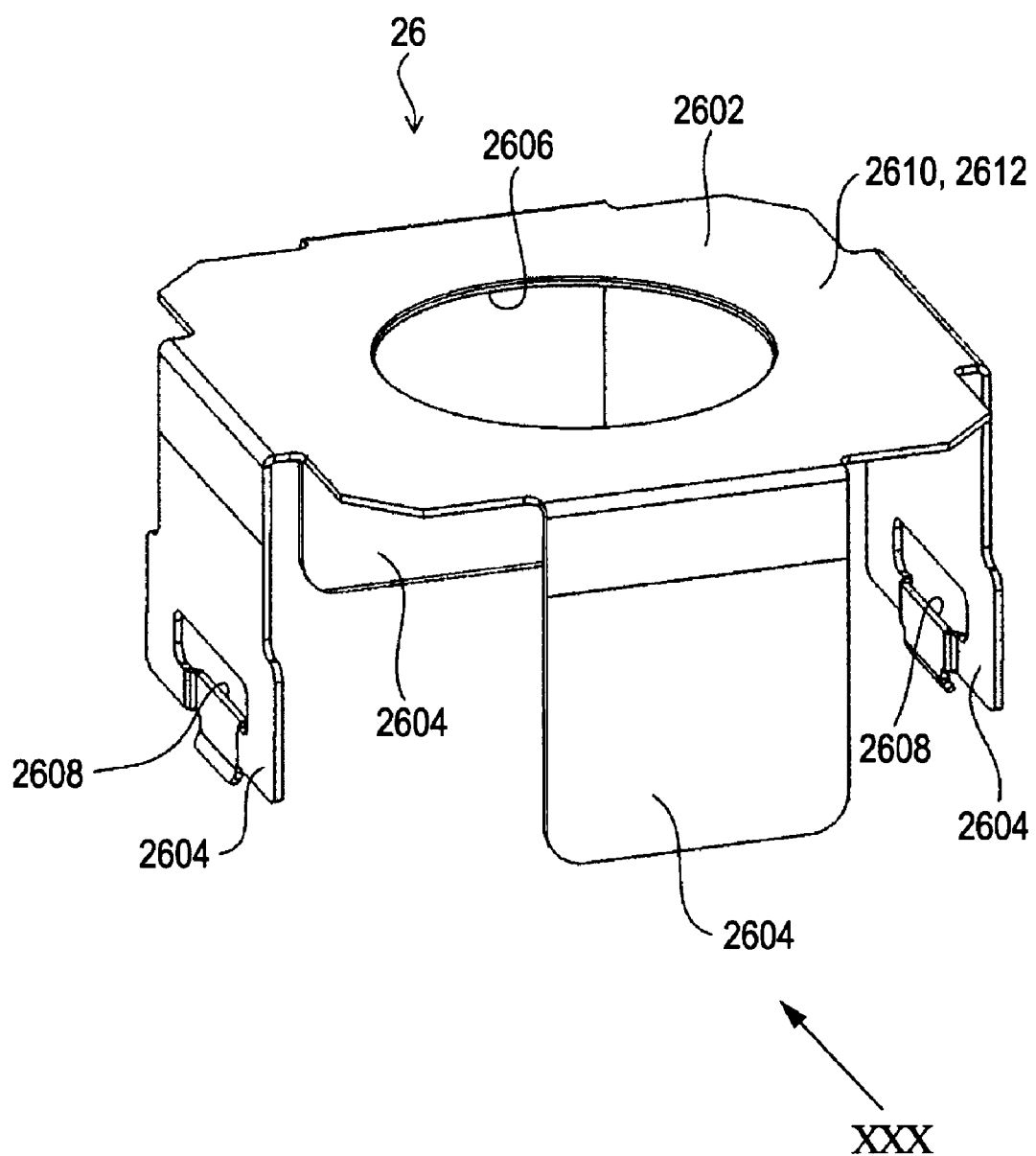
FIG. 28 is a front perspective view of a cover.
Figure 29:
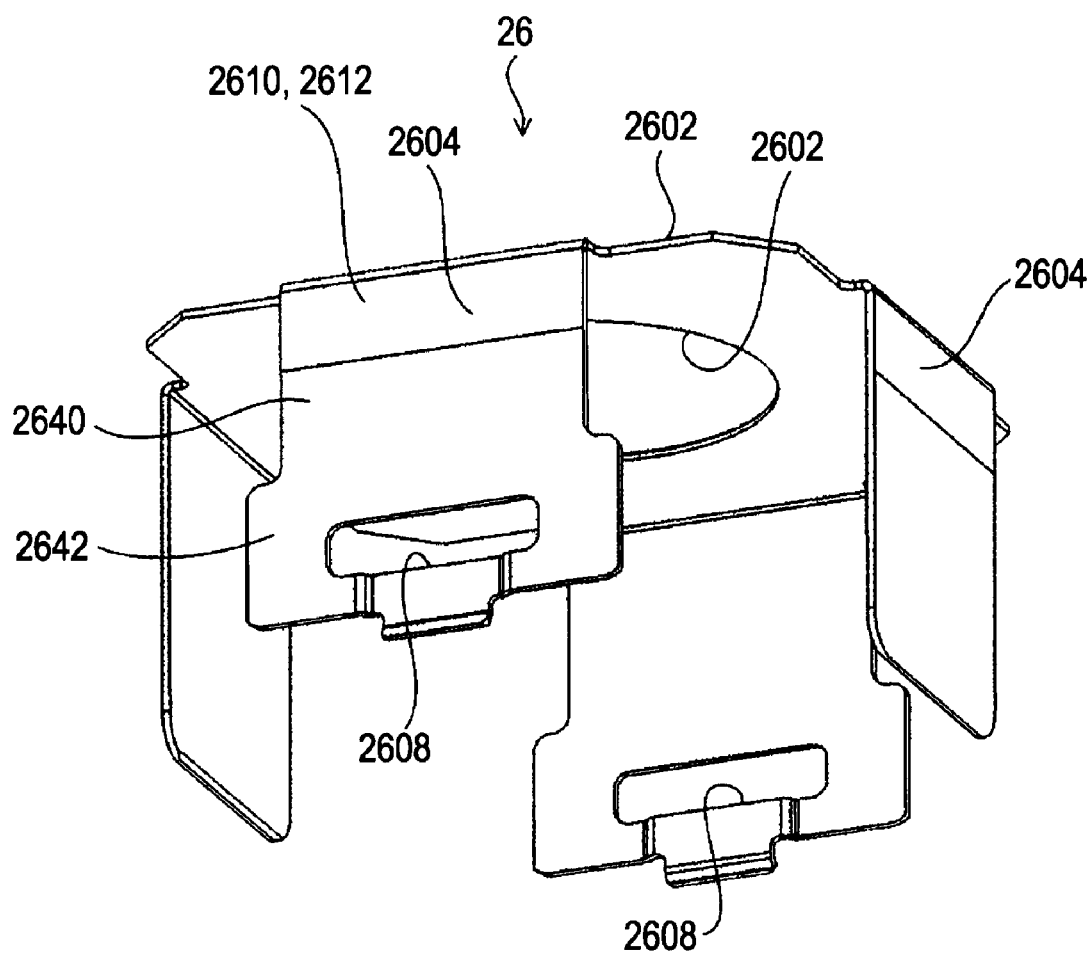
FIG. 29 is a rear perspective view of the cover.
Figure 30:
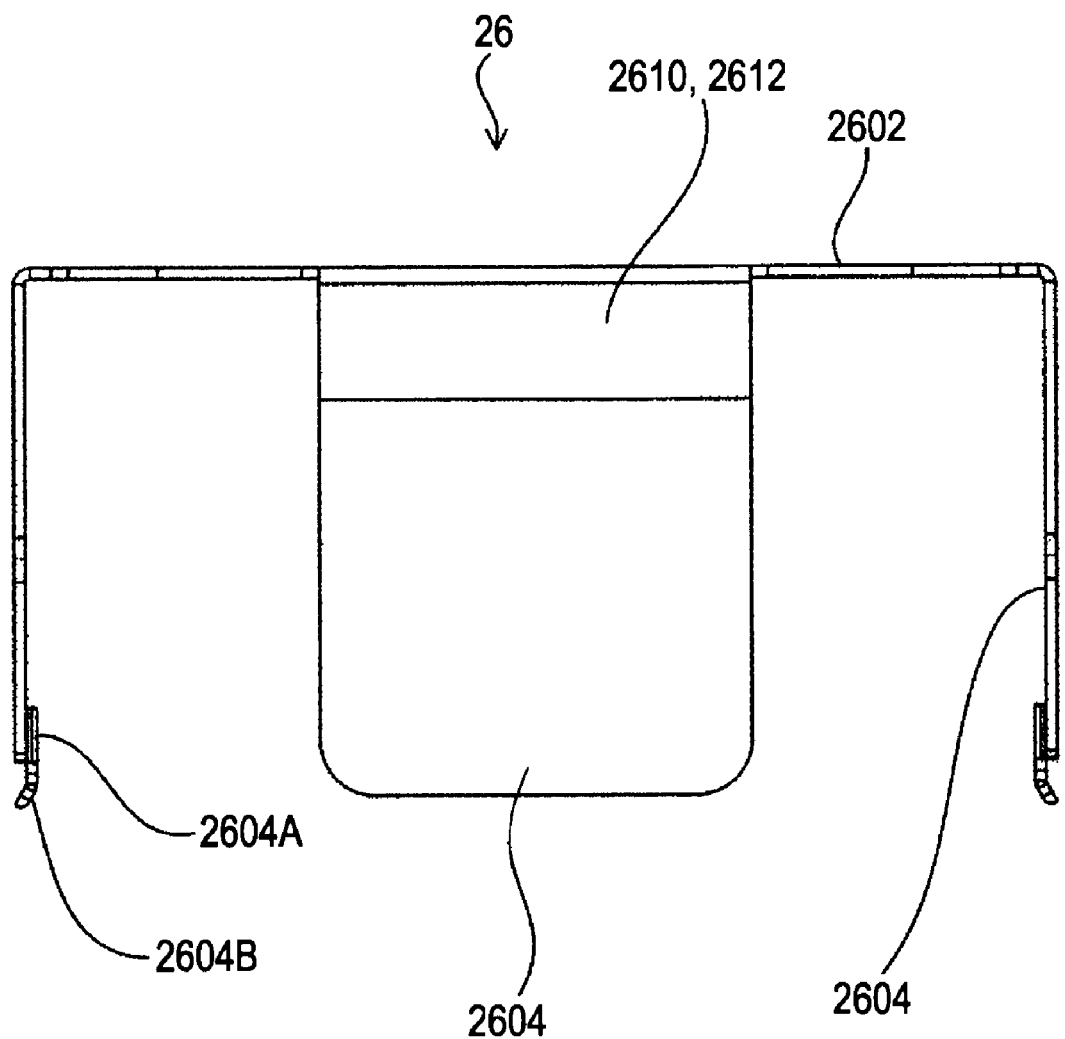
FIG. 30 shows the cover when viewed in the direction of arrow XXX of FIG. 28.

FIG. 28 is a front perspective view of the cover 26,

FIG. 29 is a rear perspective view of the cover 26, and FIG. 30 shows the cover 26 when viewed in the direction of arrow XXX of FIG. 28.

Front Lens Barrel 22

As shown in FIG. 11, the front lens barrel 22 is joined to the rear lens barrel 24 so as to provide an accommodation space S between the front lens barrel 22 and the rear lens barrel 24.

The front lens barrel 22 is made by molding a synthetic resin material with a die.

Figure 31:
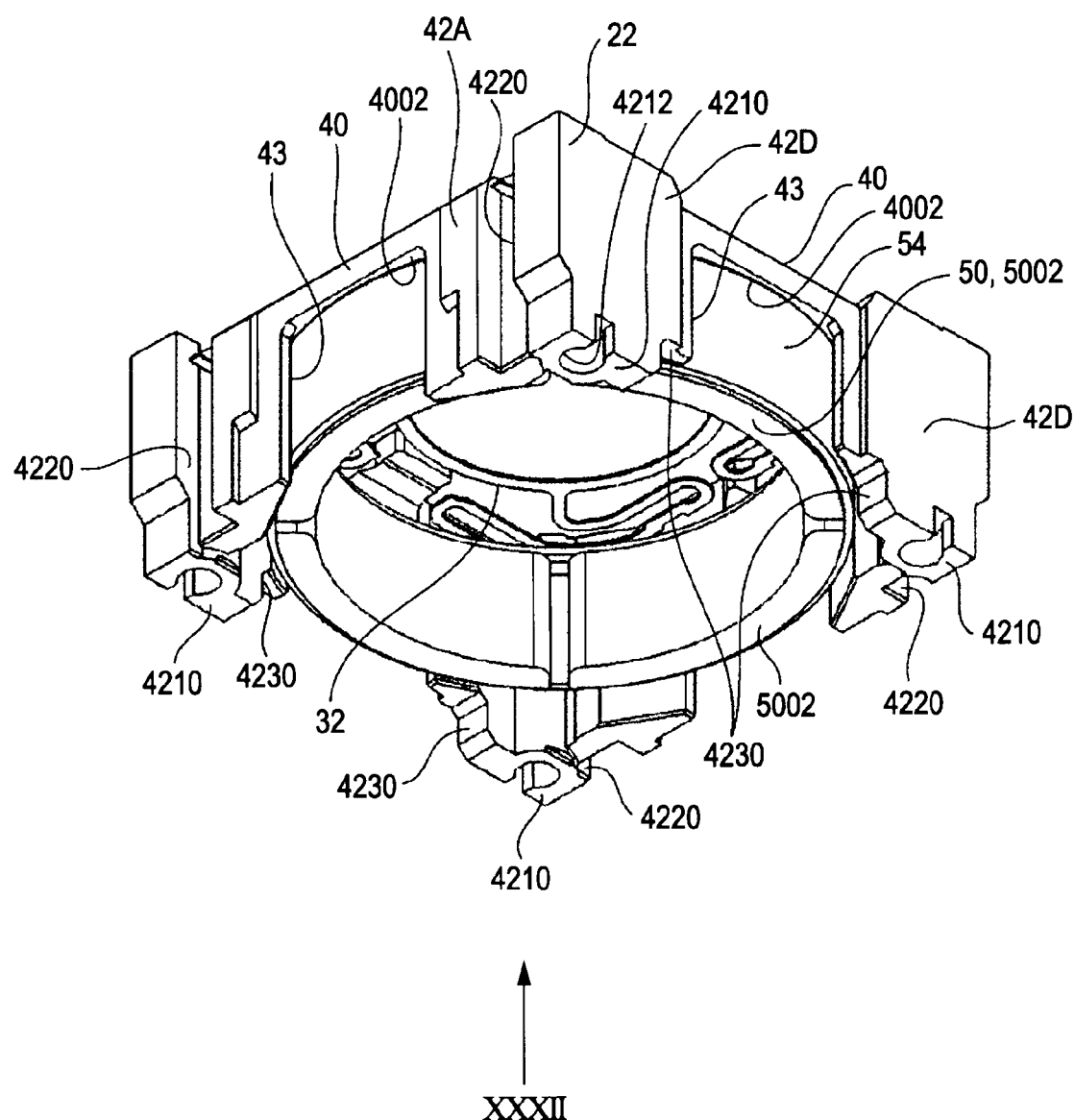
FIG. 31 is a perspective view of a structure in which the magnet is inserted into a front lens barrel.
Figure 32:
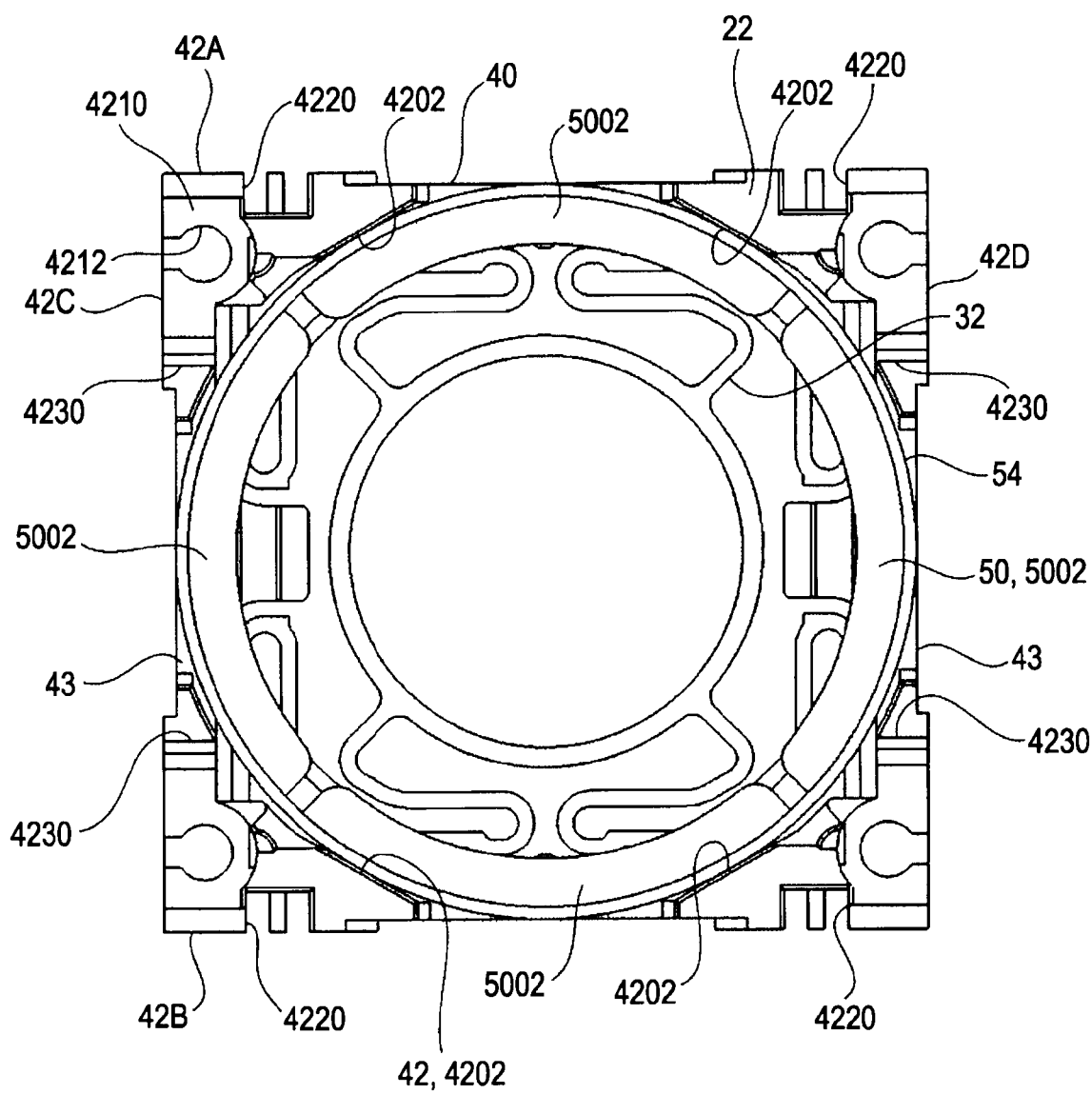
FIG. 32 shows the structure of FIG. 31 when viewed in the direction of arrow XXXII.

FIG. 31 is a perspective view of a structure in which the magnet 50 has been inserted into the front lens barrel 22, and FIG. 32 shows the structure of FIG. 31 when viewed in the direction of arrow XXXII.

As shown in FIGS. 12 and 31, the front lens barrel 22 includes a front frame 40 and first to fourth side walls 42A to 42D.

In plan view, the front frame 40 has a rectangular frame shape with two pairs of opposite sides.

The first and second side walls 42A and 42B protrude rearward from a pair of opposite sides of the front frame 40. The third and fourth side walls 42C and 42D protrude rearward from the other pair of opposite sides of the front frame 40.

The first to fourth side walls 42A to 42D have rectangular cutouts 43 that open rearward.

As shown in FIG. 31, contact surfaces 4002 in contact with the magnet 50 are provided at four positions at which the front frame 40 faces the cutouts 43. The contact surfaces 4002 extend in a plane perpendicular to an optical axis of the imaging optical system 28.

As shown in FIG. 32, a flat surface for positioning the magnet 50 is formed at each inner side of the first and second side walls 42A and 42B so as to provide four magnet positioning surfaces 4202.

As shown in FIGS. 12 and 31, rear end surfaces at which the first to fourth side walls 42A to 42D face rearward are formed as mating surfaces 4210 to which the rear lens barrel 24 is mated.

Because the present embodiment has the side walls 42A to 42D that are divided by the cutouts 43, the mating surfaces 4210 are formed at four positions corresponding to the four corners of the front frame 40.

As shown in FIG. 31, the four mating surfaces 4210 have clearance holes 4212 that open rearward. The clearance holes 4212 have a diameter and a length larger than those of pins 48 (see FIG. 18) of the rear lens barrel 24 so that the pins 48 can be inserted in the clearance hole 4212.

As shown in FIGS. 31 and 32, first positioning portions 4220 are provided in both side portions of each of the first and second side walls 42A and 42B. The first positioning portions 4220 are formed as grooves extending in the front-back direction in an open manner.

Second positioning portions 4230 are provided in rear portions of the third and fourth side walls 42C and 42D facing the cutouts 43. The second positioning portions 4230 are formed as flat surfaces extending parallel to each other and opposite each other in the front-back direction.

Rear Lens Barrel 24

As shown in FIGS. 2, 11, 13, and 15, the rear lens barrel 24 has a bottom wall 44 and an opening 46.

The bottom wall 44 is formed in a rectangular plate shape that closes a rear end of the accommodation space S in the optical axis direction, so that a front surface of the bottom wall 44 faces the accommodation space S as shown in FIG. 11.

As shown in FIGS. 18 and 20, the bottom wall 44 includes two pairs of opposing sides 4402 and 4404.

On the front surface of the bottom wall 44, mating surfaces 4410 are formed at positions corresponding to the mating surfaces 4210 of the front lens barrel 22. As shown in FIG. 12, the mating surfaces 4210 of the front lens barrel 22 and the mating surfaces 4410 of the rear lens barrel 24 mate with each other.

As shown in FIGS. 18 and 20, on a pair of the sides 4402 of the front surface of the bottom wall 44, third positioning portions 4420 are formed as protrusions that are engageable with the first positioning portions 4220 of the front lens barrel 22.

On the other pair of the front sides 4404 of the front surface of the bottom wall 44, fourth positioning portions 4430 are formed as surfaces that are engageable with the second positioning portions 4230 of the front lens barrel 22.

As shown in FIG. 18, mounting surfaces 4440 are formed in the middle of the sides 4402 and 4404 of the front surface of the bottom wall 44. The mounting surfaces 4440 extend in a plane perpendicular to the optical axis of the imaging optical system 28. A rear end surface 5012 (see FIG. 11) of the magnet 50 is mounted on the mounting surfaces 4440.

Two pins 48 for attaching the rear springs 34 thereto protrude from the pair of the sides 4404 on the front surface of the bottom wall 44.

As shown in FIGS. 11 and 15, the opening 46 is formed in a rectangular shape in the middle of the bottom wall 44.

In the present embodiment, the opening 46 serves as a fixed diaphragm for limiting a light beam that is guided to the image pickup device 36 through the imaging optical system 28.

As shown in FIGS. 18 and 20, engagement projections 60 protrude from the middle of the sides 4402 of the bottom wall 44 so that the cover 26 can be attached thereto.

In FIG. 11, a partition wall 4450 bulges frontward from the front surface of the bottom wall 44 of the rear lens barrel 24. In the present embodiment, the partition wall 4450 extends in an annular shape around the entire perimeter of the opening 46.

When the camera module 20 is viewed in the optical axis direction of the imaging optical system 28, the partition wall 4450 is disposed so as to separate solder portions from a lens surface 2802 that is disposed at the rearmost position of the imaging optical system 28. At the solder portions, connecting piece portions 7002 (see FIG. 33) of the rear springs 34, which are described below, and ends 5202 of a wire of a coil 52 are soldered to each other.

The partition wall 4450 blocks contaminants, such as flux that has come off the soldered portion, from being carried to the lens surface 2802 so that deposition of contaminants on the lens surface 2802 is effectively prevented, thereby securing high quality of an image picked up with the image pickup device 36.

Recesses 4452, which face rearward, are formed in the front surface of the bottom wall 44 at positions outside the partition wall 4450 and facing the soldered portion.

The recesses 4452 collect contaminants, such as flux that has come off the soldered portion, so that deposition of contaminants on the lens surface 2802 is more effectively prevented, thereby securing high quality of an image picked up with the image pickup device 36.

Magnet 50

As shown in FIG. 11, the driving section 38 includes the magnet 50 and the coil 52.

The magnet 50 extends along a circumference of a circle centered at the optical axis of the imaging optical system 28. As shown in FIGS. 31 and 32, in the present embodiment, the magnet 50 is constituted by four magnet segments 5002 having the same shape and arranged in a circumferential direction.

As shown in FIG. 11, the magnet 50 faces an outer periphery of the coil 52. In other words, the magnet 50 is disposed so as to face the coil 52.

As shown in FIGS. 11, 31, and 32, in the present embodiment, the magnet segments 5002 are attached via a yoke 54 to the front lens barrel 22. The yoke serves to effectively guide the magnetic flux from the magnet segments 5002 to the coil 52.

Thus, the magnet 50 is configured to include the yoke 54.

To be specific, as shown in FIG. 11, the yoke 54 includes a front wall portion 5402 having an annular plate shape and disposed at the front thereof and a peripheral wall portion 5404 having a cylindrical wall shape and disposed at the rear thereof. The peripheral wall portion 5404 extends rearward from the outer periphery of the front surface portion 5402.

The magnet segments 5002 are attached to an inner surface of the peripheral wall portion 5404, being arranged in the circumferential direction.

Thus, the front wall portion 5402 of the yoke 54 serves as the front end surface 5010 of the magnet 50, the outer peripheral surface of the peripheral wall portion 5404 of the yoke 54 serves as the outer peripheral surface 5011 of the magnet 50, and rear end surfaces of the magnet segments 5002 serve as the rear end surface 5012 of the magnet 50.

The front end surface 5010 and the rear end surface 5012 extend in a plane perpendicular to the optical axis of the imaging optical system 28.

Coil 52

As shown in FIGS. 18 and 20, the wire of the coil 52 is wound around a circle centered at the optical axis of the imaging optical system 28. The outside diameter of the coil 52 is smaller than the inside diameter of the magnet 50.

As shown in FIGS. 2 and 23, a coil holder 56 having an annular shape is attached to a rear end surface of the coil 52. In plan view, the outline of the coil holder 56 is substantially the same as that of the coil 52. The length of the coil holder 56 in the optical axis direction is shorter than that of the coil 52.

As shown in FIGS. 23 and 25, shaft portions 5602 protrude radially outward from two opposing positions of the coil holder 56 that are separated by 180°. Ends 5202 of the wire of the coil 52 are wound around the shaft portions 5602.

Figure 33:
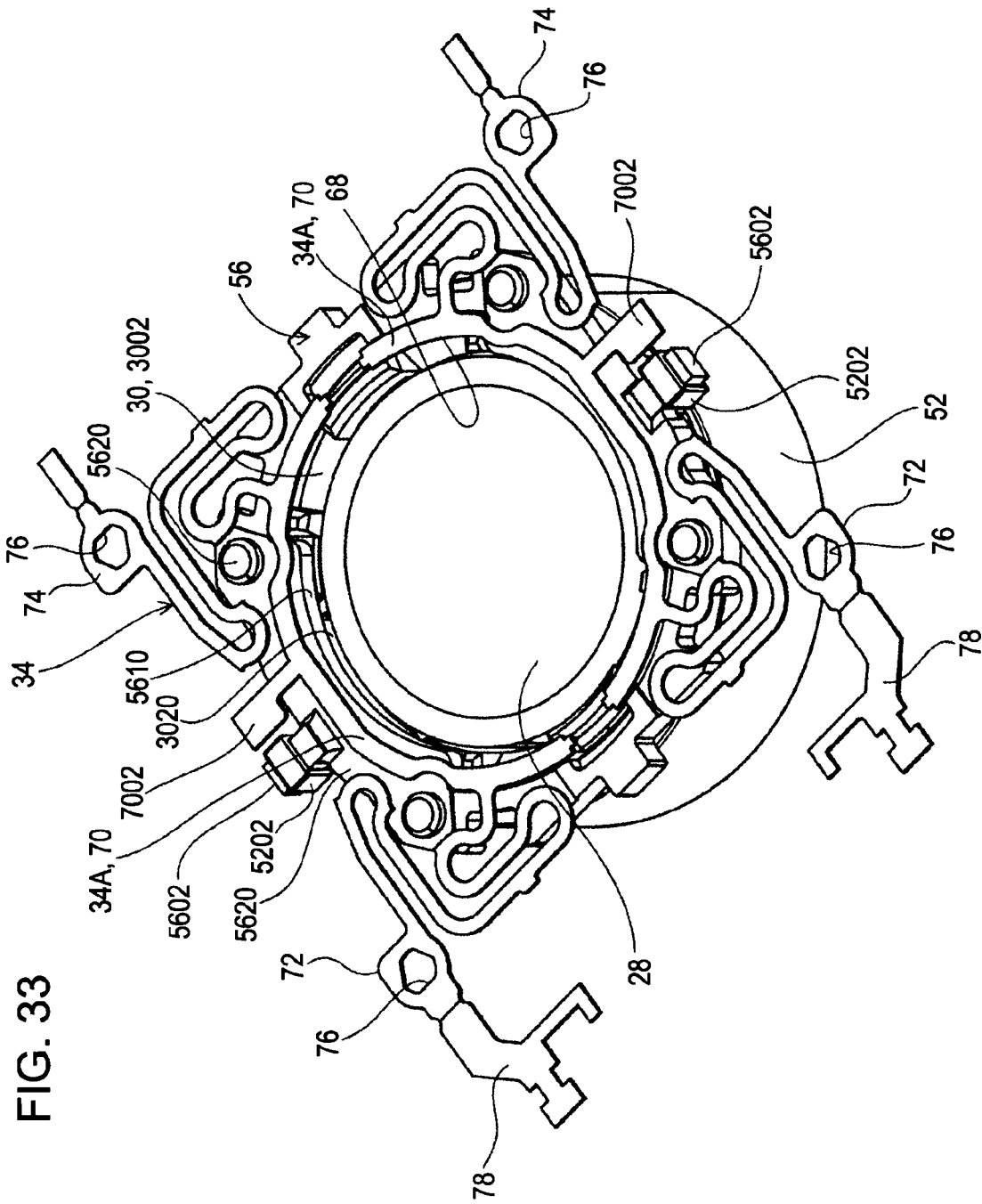
FIG. 33 is a perspective view of a lens holder, rear springs, a coil, and a coil holder.

FIG. 33 is a perspective view of the lens holder 30, the rear springs 34, the coil 52, and the coil holder 56.

As shown in FIG. 33, attachment portions 5610 protrude from the inner periphery of the coil holder 56 at positions separated by certain distances in the circumferential direction of the coil holder 56.

Moreover, stoppers 5620 protrude from the rear surface of the coil holder 56 from positions separated by certain distances in the circumferential direction of the coil holder 56.

As shown in FIG. 11, the stoppers 5620 are in contact with the front surface of the bottom wall 44 of the rear lens barrel 24 so as to determine a rear boundary (infinity position) of the lens holder 30 (imaging optical system 28) in the optical axis direction.

Image Pickup Device 36

As shown in FIG. 4, the image pickup device 36 includes a package 3602, an image pickup device chip 3604, and a cover glass 3606.

The package 3602 has a rectangular shape. In a front surface of the package 3602, a accommodation space having a rectangular shape is formed in an open manner.

The image pickup device chip 3604 is attached to a bottom wall of the accommodation space in such a manner that an imaging surface of the image pickup device chip 3604 faces frontward so as to pick up an object image that has been guided by the imaging optical system 28.

The cover glass 3606 is attached to a front surface of the package 3602 so as to seal the accommodation space.

As shown in FIGS. 3 and 4, a rear surface of the package 3602 of the image pickup device 36 is attached to a front surface of a substrate 58 having a rectangular shape.

A front surface of the package 3602 is attached to a rear surface of the bottom wall 44 of the rear lens barrel 24 in a state in which the imaging surface of the image pickup device chip 3604 faces the opening 46 of the rear lens barrel 24, so that the image pickup device 36 is disposed in the rear lens barrel 24.

Cover 26

The cover 26 is made of a metal plate. As shown in FIGS. 28, 29, and 30, the cover 26 has a front surface portion 2602 and side surface portions 2604.

The front surface portion 2602 has a rectangular plate shape and covers the front of the front lens barrel 22.

An opening 2606 is formed in the front surface portion 2602 at a position facing the imaging optical system 28.

The side surface portions 2604 are bent away from the four edges of the front surface portion 2602 so as to cover the four sides of the front lens barrel 22 and the rear lens barrel 24.

Engagement grooves 2608 are formed in a pair of opposing side surface portions 2604 so as to be engaged with the engagement projections 60 of the rear lens barrel 24 shown in FIG. 5.

The engagement grooves 2608 of the cover 26 are engaged with the engagement projections 60, so that the front lens barrel 22 is sandwiched between the front surface portion 2602 of the cover 26 and the bottom wall 44 of the rear lens barrel 24 as shown in FIG. 11, whereby the front lens barrel 22 and the rear lens barrel 24 are joined to each other.

A reflection preventing portion 2610 is provided on a front surface of the front surface portion 2602 and on outer surfaces of the side surface portions 2604 near to the front surface portion 2602 so as to prevent reflection of light.

The reflection preventing portion 2610 is formed by coating the surfaces with paint that prevents reflection of light, such as a black paint.

Lens Holder 30

As shown in FIG. 11, the lens holder 30, which holds the imaging optical system 28, is accommodated in the accommodation space S.

As shown in FIGS. 23 and 25, the lens holder 30 has a barrel portion 3002 and an annular front portion 3004 connecting the front of the barrel portion 3002. An opening 3006 is formed in the middle of the front portion 3004.

The imaging optical system 28, which includes a plurality of lenses, is accommodated in the barrel portion 3002 and faces frontward through the opening 3006.

On the front portion 3004, a bulged wall portion 3008 having an outside diameter smaller than that of the barrel portion 3002 is provided. A peripheral surface of the bulged wall portion 3008 serves as a cylindrical surface 3010 extending along a circumference of a circle centered at the optical axis of the imaging optical system 28.

Along the outer periphery of the cylindrical surface 3010, four front spring contact surfaces 3012 are provided at four positions separated by an equal distance in the circumferential direction. The front spring contact surfaces 3012 are disposed at the rear of the bulged wall portion 3008 and extend in a plane perpendicular to the optical axis.

As shown in FIG. 33, a rear end surface 3020 of the barrel portion 3002 is disposed in such a manner that the rear end surface 3020 is contactable with the attachment portion 5610 of the coil holder 56.

Front Springs 32

As shown in FIG. 11, the front springs 32 and the rear springs 34 constitute a guide mechanism disposed in the accommodation space S. The guide mechanism supports the lens holder 30 in such a manner that the lens holder 30 is movable along the optical axis of the imaging optical system 28.

The front springs 32 are disposed between the front lens barrel 22 and the lens holder 30. The rear springs 34 are disposed between the rear lens barrel 24 and the lens holder 30.

The rear springs 34 and the front springs 32 are formed by spring strips that are narrow, thin, and electrically conductive.

As shown in FIG. 14, the front springs 32 are disposed so as to provide an opening 62 in the middle thereof. The opening 62 serves as an optical path of the imaging optical system 28.

To be specific, the front springs 32 have an annular plate portion 64 in which the opening 62 is formed, and four supporting pieces 66 connected to an outer periphery of the annular plate portion 64. The front springs 32 are elastically deformable in the optical axis direction.

The front springs 32 are disposed between the front lens barrel 22 and the lens holder 30 in the following manner: longitudinal ends of the supporting pieces 66 are attached to the front of peripheral walls 42 of the front lens barrel 22; the cylindrical surface 3010 of the bulged wall portion 3008 of the barrel portion 3002 of the lens holder 30 is inserted into the opening 62; and the annular plate portion 64 is made to contact the four front spring contact surfaces 3012 of the lens holder 30.

In the present embodiment, longitudinal ends of the four supporting pieces 66 are attached to the front of the peripheral walls 42 by inserting the longitudinal ends into the front lens barrel 22 when the front lens barrel 22 is molded.

Rear Springs 34

As shown in FIG. 33, the rear springs 34 are disposed in an annular shape, and an opening 68 is formed in the middle of the rear springs 34 so as to provide an optical path for the imaging optical system 28.

The rear springs 34 constitute two spring segments 34A having the same shape and separated from each other.

Each of the spring segments 34A has an arc portion 70 extending along a semicircle.

The arc portions 70 of the spring segments 34A are bonded to a rear surface 5620 of the coil holder 56. Thus, an opening 68 is provided between the two arc portions 70.

Two supporting pieces 72 and 74 are connected to an outer periphery of each of the arc portions 70, and holes 76 are formed at positions near to longitudinal ends of the two supporting pieces 72 and 74.

As shown in FIG. 18, the pins 48 on the rear lens barrel 24 are inserted in the four holes 76 of the spring segments 34A. As shown in FIG. 10, portions of the supporting pieces 72 and 74 adjacent to the holes 76 are sandwiched between the mating surfaces 4210 of the front lens barrel 22 and the mating surfaces 4410 of the rear lens barrel 24. With such a structure, longitudinal ends of the rear springs 34 are sandwiched between the front lens barrel 22 and the rear lens barrel 24.

As shown in FIG. 33, connecting piece portions 7002 are formed in the middle of the arc portions 70 of the spring segments 34A. Ends 5202 of the wire of the coil 52 wound around the two shaft portions 5602 of the coil holder 56 are soldered to the connecting piece portions 7002.

End portions of the supporting pieces 72, which are among the supporting pieces 72 and 74 of the spring segments 34A, form external connection terminals 78 extending outside the coil 52.

Thus, the coil 52 is electrically connected to the external connection terminals 78 via the spring segments 34A.

As shown in FIG. 3, the external connection terminals 78 are bent rearward in a state in which the external connection terminals 78 are sandwiched between the mating surfaces 4210 of the front lens barrel 22 and the mating surfaces 4410 of the rear lens barrel 24 so as to be soldered to the substrate 58.

As shown in FIG. 11, when a driving signal is supplied to the wire of the coil 52 via the two external connection terminals 78 of the rear springs 34, the coil 52 generates a magnetic field.

The magnetic field generated by the coil 52 and the magnetic field generated by the magnet 50 interact so that a force (thrust) is applied to the coil 52 in the optical axis direction. The force moves the front springs 32, the lens holder 30 held by the rear springs 34, and the imaging optical system 28 in the optical axis direction so as to focus on an object image formed by the imaging optical system 28 on the image pickup device 36 (image pickup device chip 3604).

Thus, the magnet 50 and the coil 52 constitute the driving section 38 for moving the lens holder 30 in the optical axis direction of the imaging optical system 28.

Spring Member 80

As shown in FIG. 2, in the present embodiment, the rear springs 34 are formed by pressworking a thin spring plate so that the rectangular frame 8002 and the rear springs 34, which extend in strip shapes inside the rectangular frame 8002, are integrally formed.

To be specific, a spring member 80 including the rectangular frame 8002 and the rear springs 34 is formed by pressworking.

The spring member 80 includes the rectangular frame 8002 connected to longitudinal ends of the rear springs 34, first connecting portions 8004 connecting an inner peripheral edge of the rectangular frame 8002 to the external connection terminals 78, and second connecting portions 8006 connecting an inner peripheral edge of the rectangular frame 8002 to the supporting pieces 74.

In the present embodiment, the spring member 80 including the rear springs 34 is first formed, the camera module 20 is assembled using the spring member 80, and then the rear springs 34 are separated from the spring member 80 during assembly. Thus, an excessive force is prevented from being applied to the rear springs during assembly.

Recess 82

Figure 38:
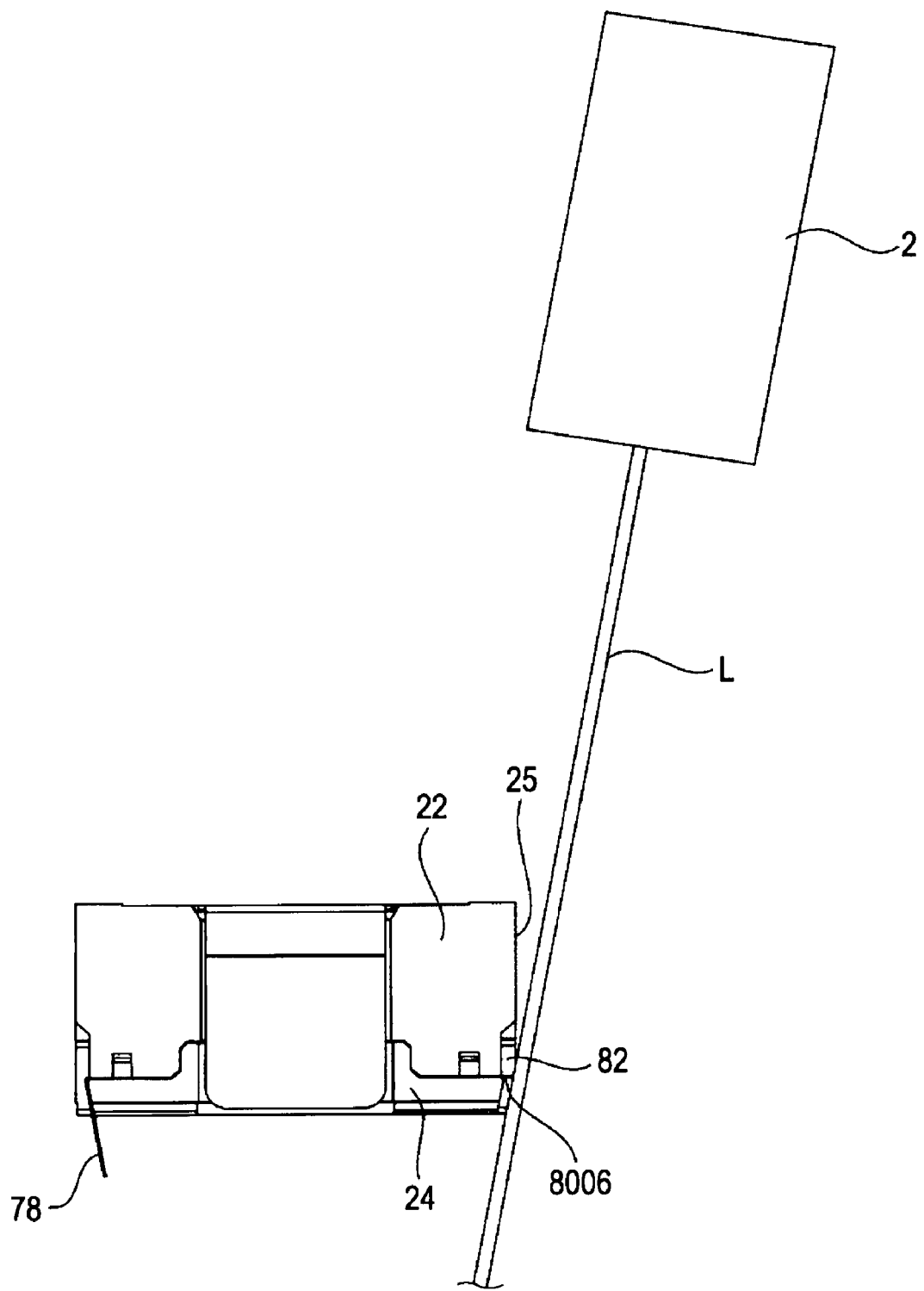
FIGS. 38 to 41 are views for explaining how a laser beam L cuts a second connecting portion of a spring member.

As shown in FIGS. 6, 8, and 38, outer surfaces of sandwiching portions of the rear lens barrel 24 and the front lens barrel 22 sandwiching the longitudinal ends of the rear springs 34 form recesses 82 in outer surfaces 25 of adjacent portions near to the sandwiching portions.

Figure 39:
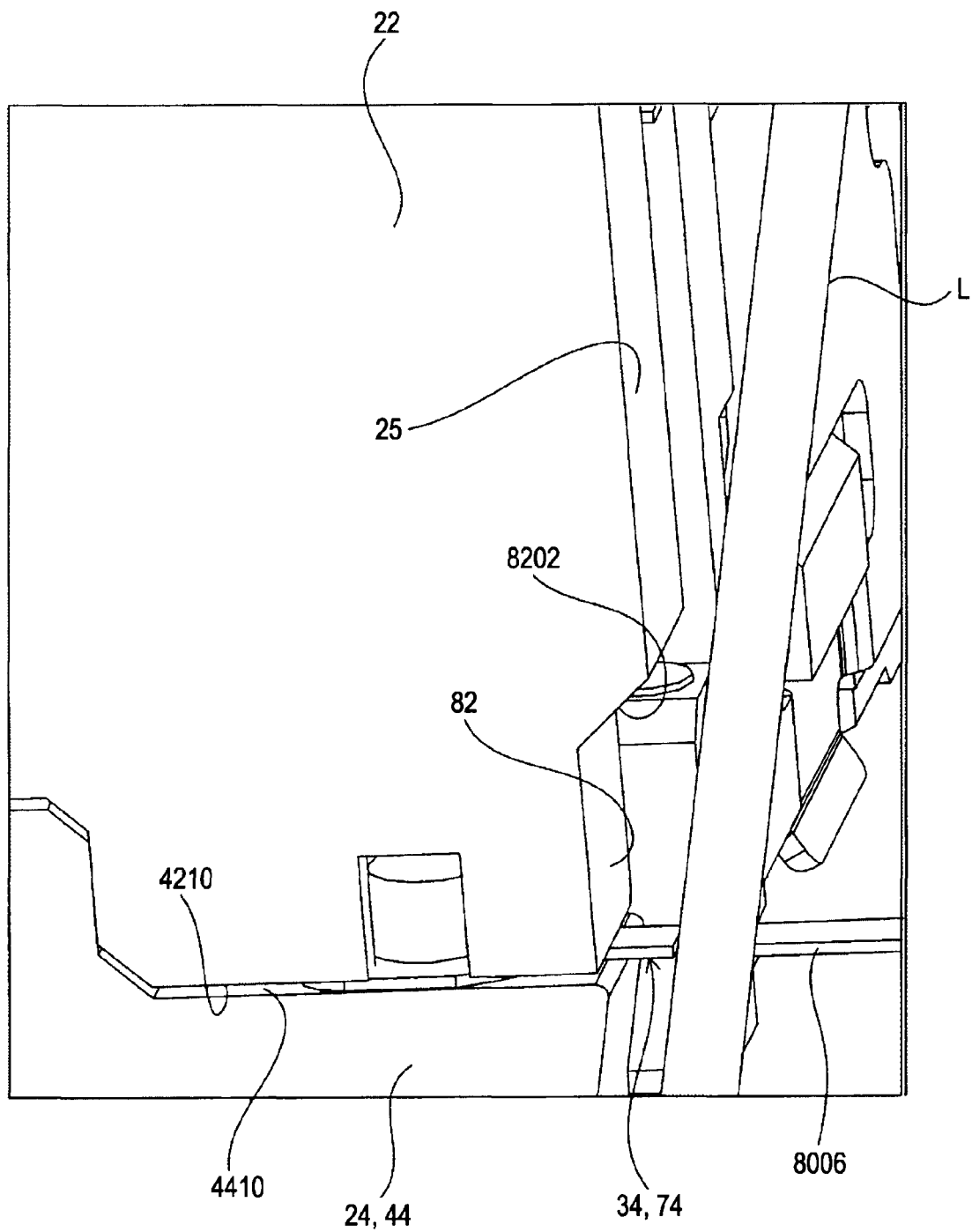
Figure 40:
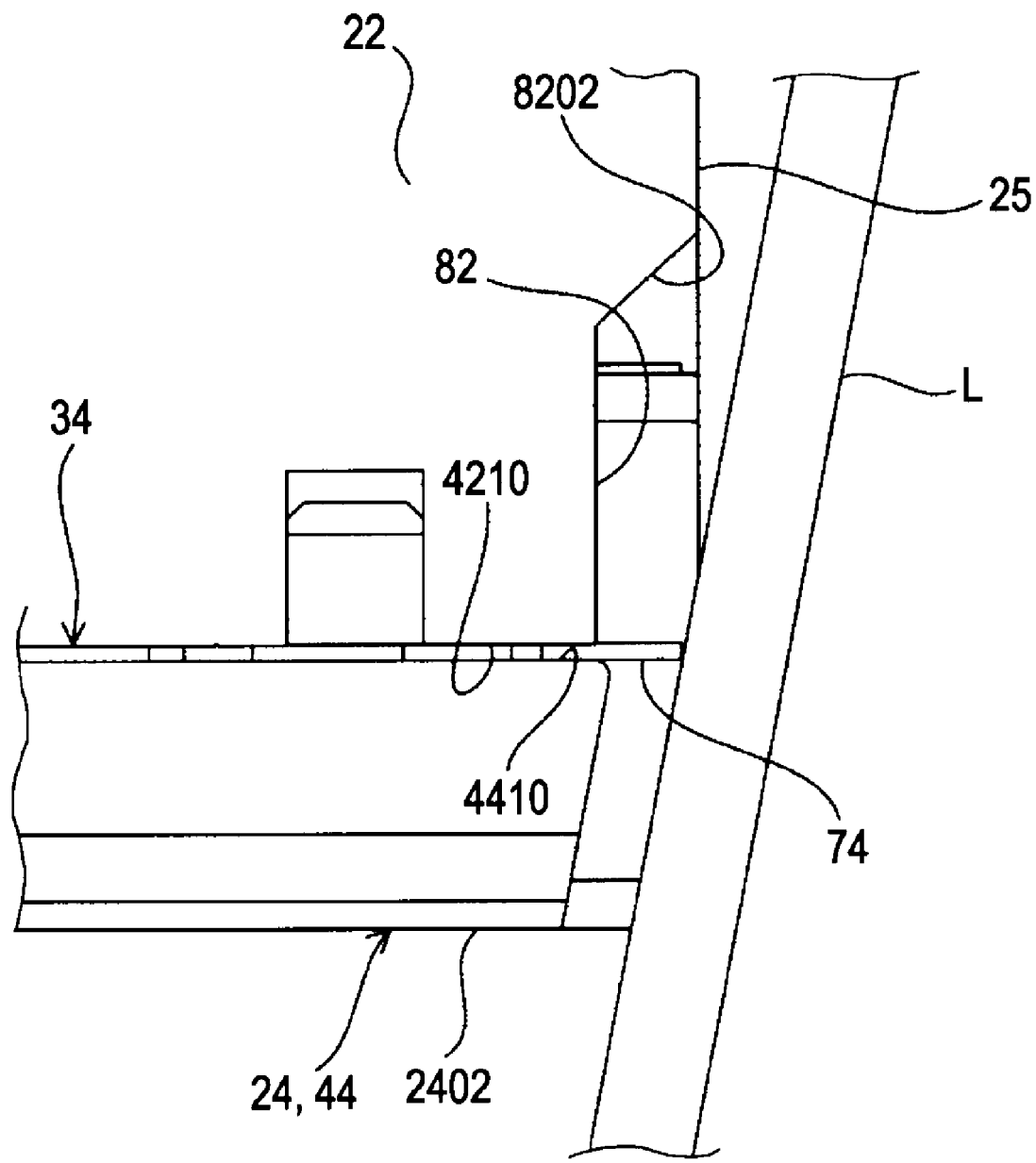

As shown in FIGS. 8, 39, and 40, longitudinal ends of the rear springs 34 are disposed at positions that are displaced inward from imaginary extension surfaces of the outer surfaces 25 of the adjacent portions.

The rear lens barrel 24 has a rear end surface 2402 (the rear surface of the bottom wall 44 in the present embodiment) on the opposite side of the front lens barrel 22. The recesses 82 are formed in the rear end surface 2402 in an open manner.

Bottom surfaces 8202 of the recesses 82 of the rear lens barrel 24 are formed as inclined surfaces in such a manner that the depths of the recesses 82 increase toward the rear end surface 2402.

Assembly

Referring to FIG. 2, a method for assembling the camera module 20 is described below.

First, the coil 52 attached to the coil holder 56 is joined to the lens holder 30.

The rear end of the barrel portion 3002 of the lens holder 30 is inserted into the inner circumference of the coil 52 from the front side of the coil 52. As shown in FIG. 33, the attachment portions 5610 of the coil holder 56 are made to contact the rear end surface 3020 of the barrel portion 3002 so that the coil 52 is mounted on the barrel portion 3002 of the lens holder 30.

After the coil 52 has been mounted on the barrel portion 3002, the positions of the lens holder 30 and the coil 52 are adjusted along the optical axis of the imaging optical system 28 and in a plane perpendicular to the optical axis using an adjustment jig.

Next, adhesive is filled into a space between the barrel portion 3002 and the coil 52 so that the lens holder 30 and the coil 52 are bonded together.

When the adhesive is cured, the coil 52 is fixed to the lens holder 30.

Then, the rear springs 24 of the spring member 80 are attached to the lens holder 30, whereby a subassembly U (see FIG. 2), which includes the lens holder 30, the spring member 80, the coil 52, and the coil holder 56, is formed.

The subassembly U is attached to the rear lens barrel 24.

That is, pins 48 of the rear lens barrel 24 are inserted into the holes 76 of the rear springs 34 so that the subassembly U is mounted on the rear lens barrel 24.

Thus, the position of the subassembly U in a direction perpendicular to the optical axis of the imaging optical system 28 is adjusted with respect to the rear lens barrel 24.

Figure 34:
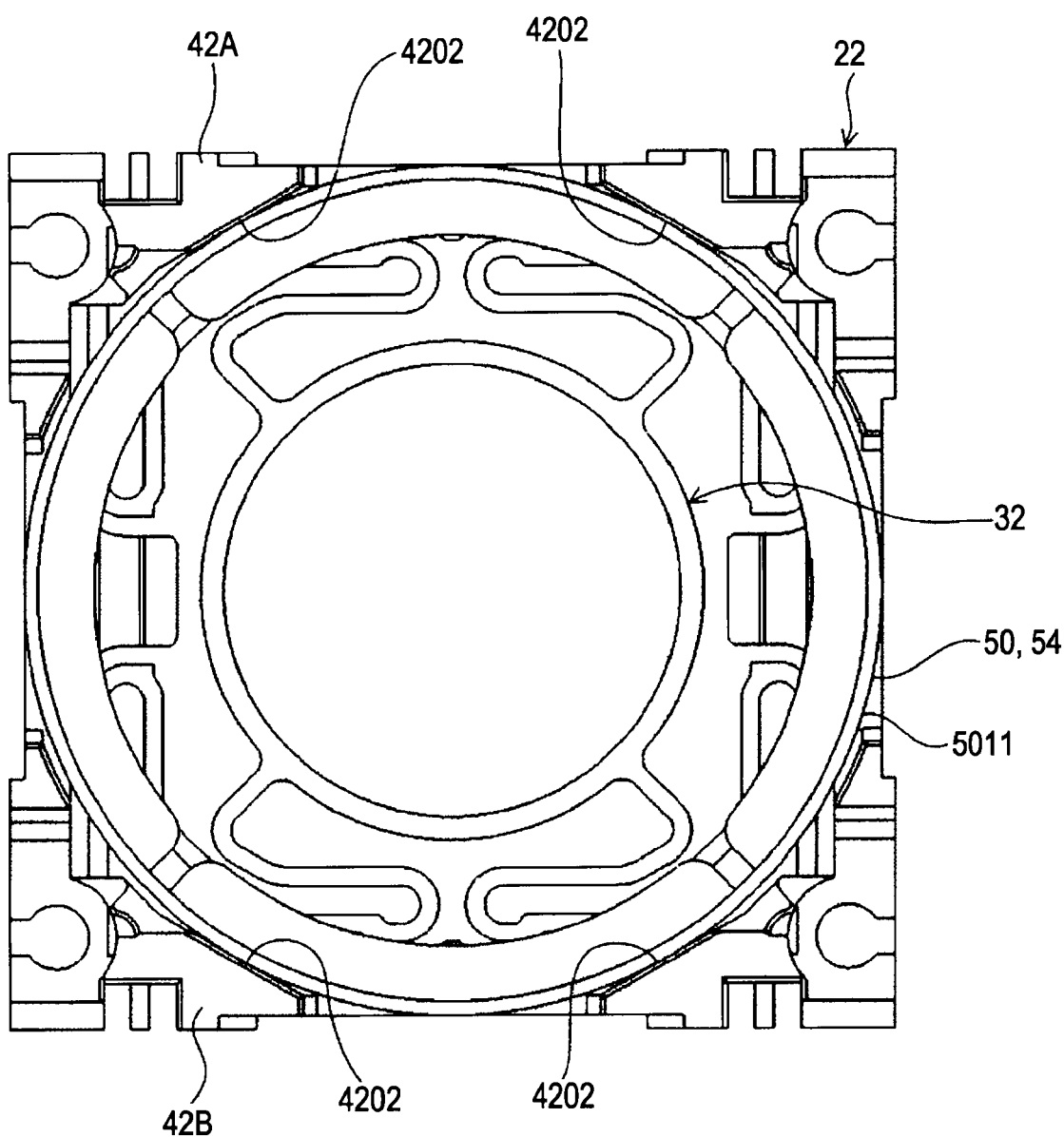
FIG. 34 is a rear view of the front lens barrel showing a positional relationship between the magnet and magnet positioning surfaces.
Figure 35:
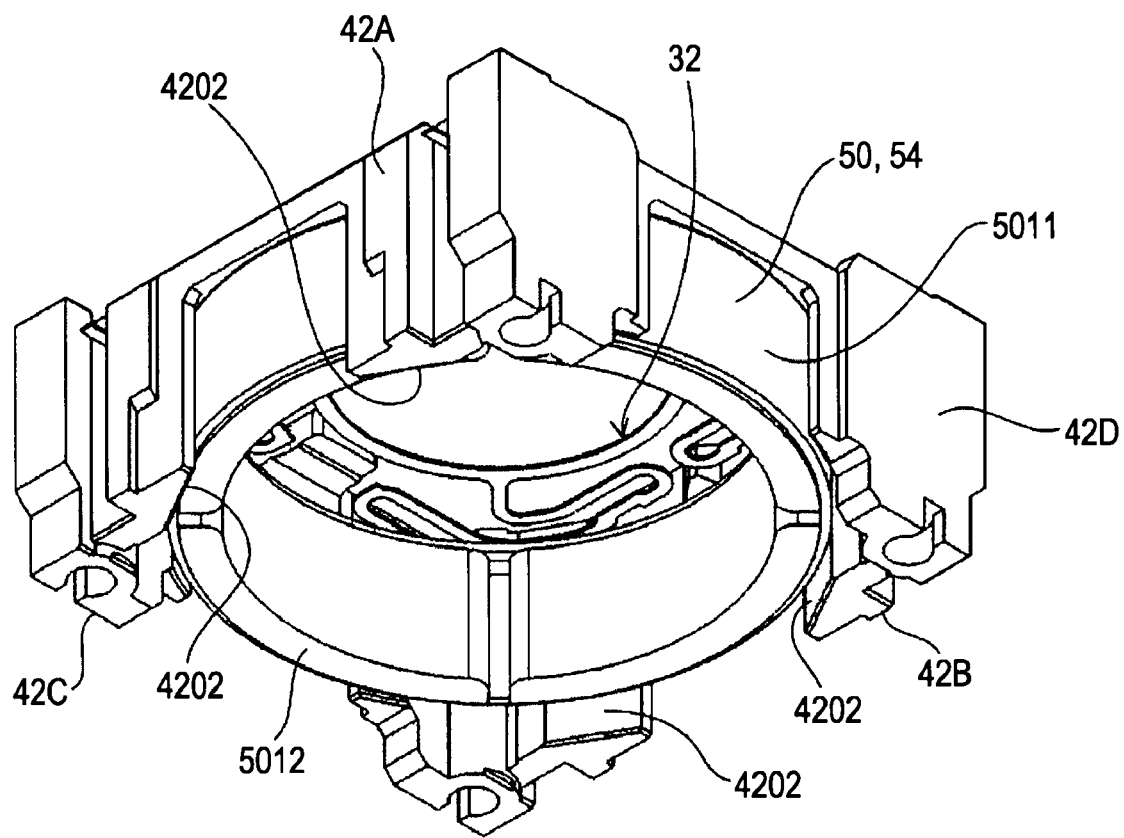
FIG. 35 is a perspective view showing a positional relationship between the magnet and the magnet positioning surfaces.
Figure 36:
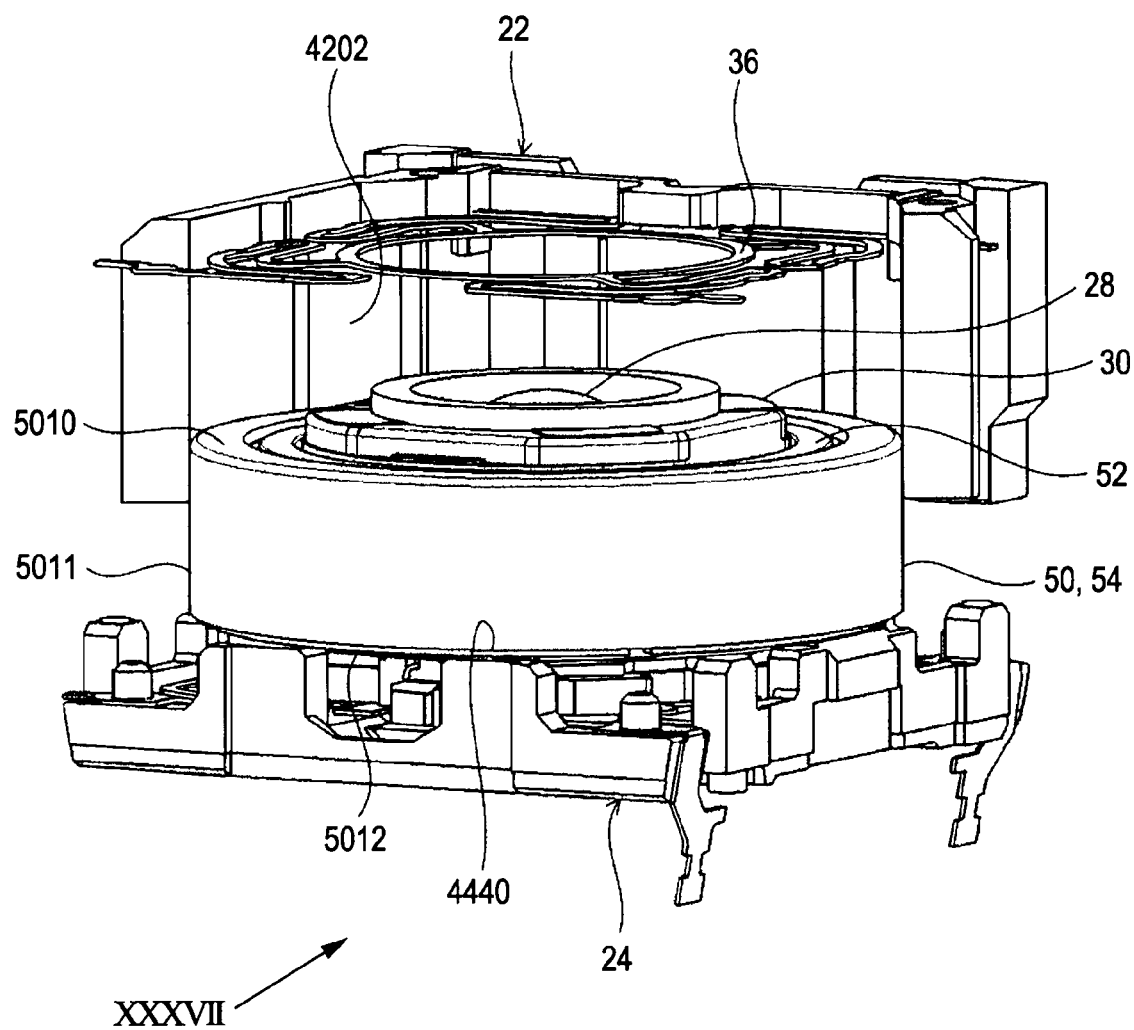
FIG. 36 is a perspective view showing a state in which the front lens barrel, the magnet, and a rear lens barrel are being assembled together, from which a part of the front lens barrel is cut away.
Figure 37:
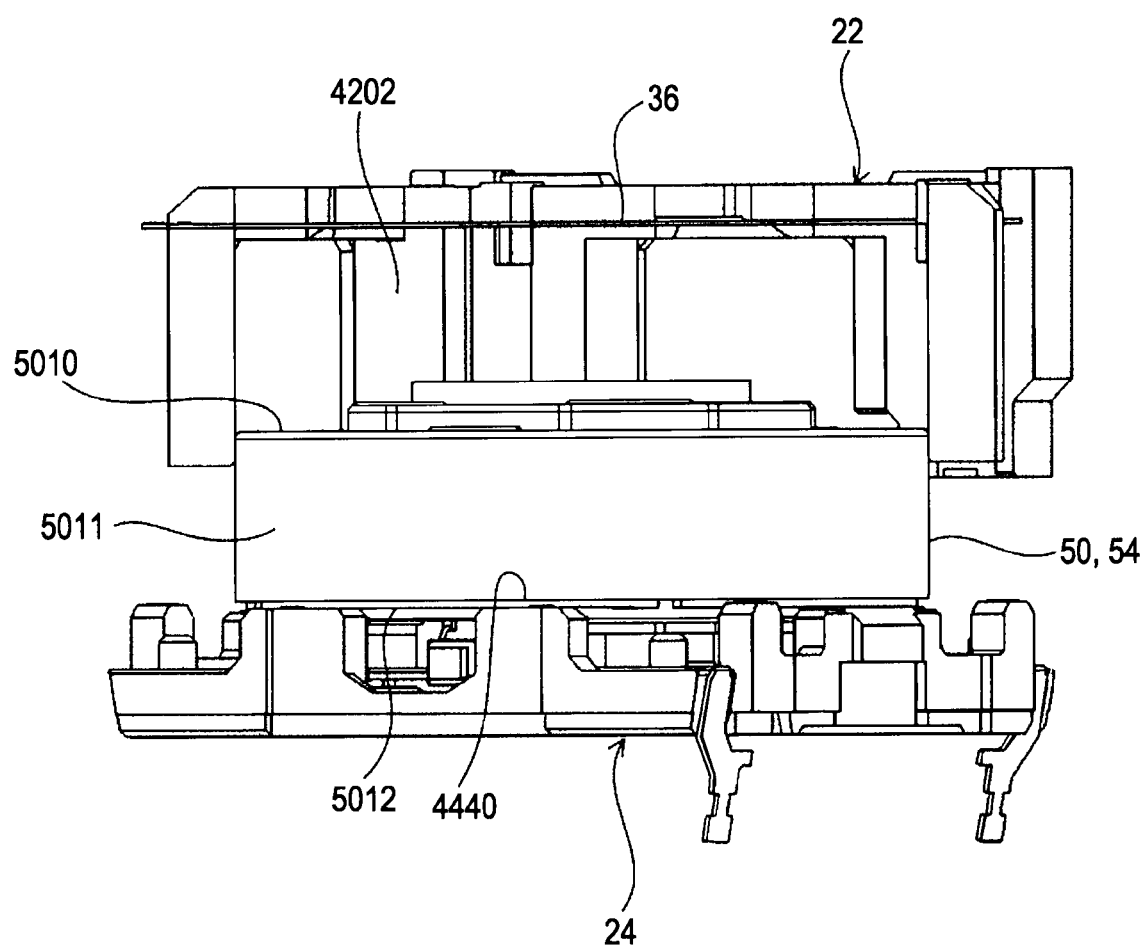
FIG. 37 shows the state of FIG. 36 when viewed in the direction of arrow XXXVII.

FIG. 34 is a rear view of the front lens barrel 22 showing a positional relationship of the magnet 50 and the magnet positioning surfaces 4202; FIG. 35 is a perspective view showing a positional relationship between the magnet and the magnet positioning surfaces 4202; FIG. 36 is a perspective view showing a state in which the front lens barrel 22, the magnet 50, and the rear lens barrel 24 are being assembled together, from which a part of the front lens barrel is cut away; and FIG. 37 shows the state of FIG. 36 when viewed in the direction of arrow XXXVII.

As shown in FIG. 11, the magnet 50 attached to the yoke 54 is disposed so as to cover the outer periphery of the coil 52 in the subassembly U. As shown in FIGS. 36 and 37, the rear end surface 5012 of the magnet 50 is set on the mounting surfaces 4440 of the rear lens barrel 24.

Next, as shown in FIG. 11 and FIGS. 34 to 37, the front lens barrel 22 is disposed so as to cover the outer peripheral surface 5011 of the magnet 50 in such a manner that the contact surfaces 4002 of the front lens barrel 22 are in contact with the front end surface 5010 of the magnet 50.

Thus, the outer peripheral surface 5011 of the magnet 50 is made to contact the magnet positioning surfaces 4202 of the front lens barrel 22.

As shown in FIGS. 18 and 31, the first positioning portions 4220 of the front lens barrel 22 are made to engage with the third positioning portions 4420 of the rear lens barrel 24, and the second positioning portions 4230 of the front lens barrel 22 are made to engage with the fourth positioning portions 4430 of the rear lens barrel 24.

Thus, the position of the magnet 50 is adjusted in the optical axis direction of the imaging optical system 28 and in the direction perpendicular to the optical axis.

At this time, the above-described adjacent portions of the holes 76 of the supporting pieces 72 and 74 of the rear springs 34 are sandwiched between the mating surfaces 4210 of the front lens barrel 22 and the mating surfaces 4410 of the rear lens barrel 24.

Therefore, the rectangular frame 8002 of the spring member 80, the first connecting portion 8004, the external connection terminals 78, and the second connecting portion 8006 are exposed outside the peripheries of the front lens barrel 22 and the rear lens barrel 24.

Next, as shown in FIG. 5, the cover 26 is disposed on the front lens barrel 22 so that the engagement grooves 2608 of the cover 26 engage with the engagement projections 60 of the rear lens barrel 24. To be specific, the cover 26 is disposed on the front lens barrel 22 so that the front lens barrel 22 is sandwiched between the front surface portion 2602 of the cover 26 and the bottom wall 44 of the rear lens barrel 24.

Thus, the front lens barrel 22, the subassembly U, the yoke 54 to which the magnet 50 is attached, and the rear lens barrel 24 are joined to each other.

Next, the rectangular frame 8002 is removed from the rear springs 34.

FIGS. 38 to 41 are views for explaining how a laser beam L cuts the second connecting portion 8006 of the spring member 80.

The first connecting portion 8004 is cut as follows.

A portion of the first connecting portion 8004 protruding from the outer surfaces 25 of the front lens barrel 22 and the rear lens barrel 24 is irradiated with the laser beam L from a laser beam source 2.

The laser beam L fuses the portion of the first connecting portion 8004, so that the rectangular frame 8002 is cut away from the supporting piece 72.

The second connecting portion 8006 is cut as follows.

As shown in FIGS. 38, 39 and 40, the laser beam source 2 is placed diagonally in front of the outer surfaces 25 of the front lens barrel 22 and the rear lens barrel 24, and the second connecting portion 8006 positioned in the recess 82 is diagonally irradiated with the laser beam L emitted from the laser beam source 2.

To be specific, the laser beam L is emitted toward the rear end surface 2402 of the rear lens barrel 24 at which the recess 82 opens.

Thus, the laser beam L is emitted toward the second connecting portion 8006 positioned in the recess 82 in such a manner that a part of the laser beam L passes through the inside of the recess 82.

Figure 41:
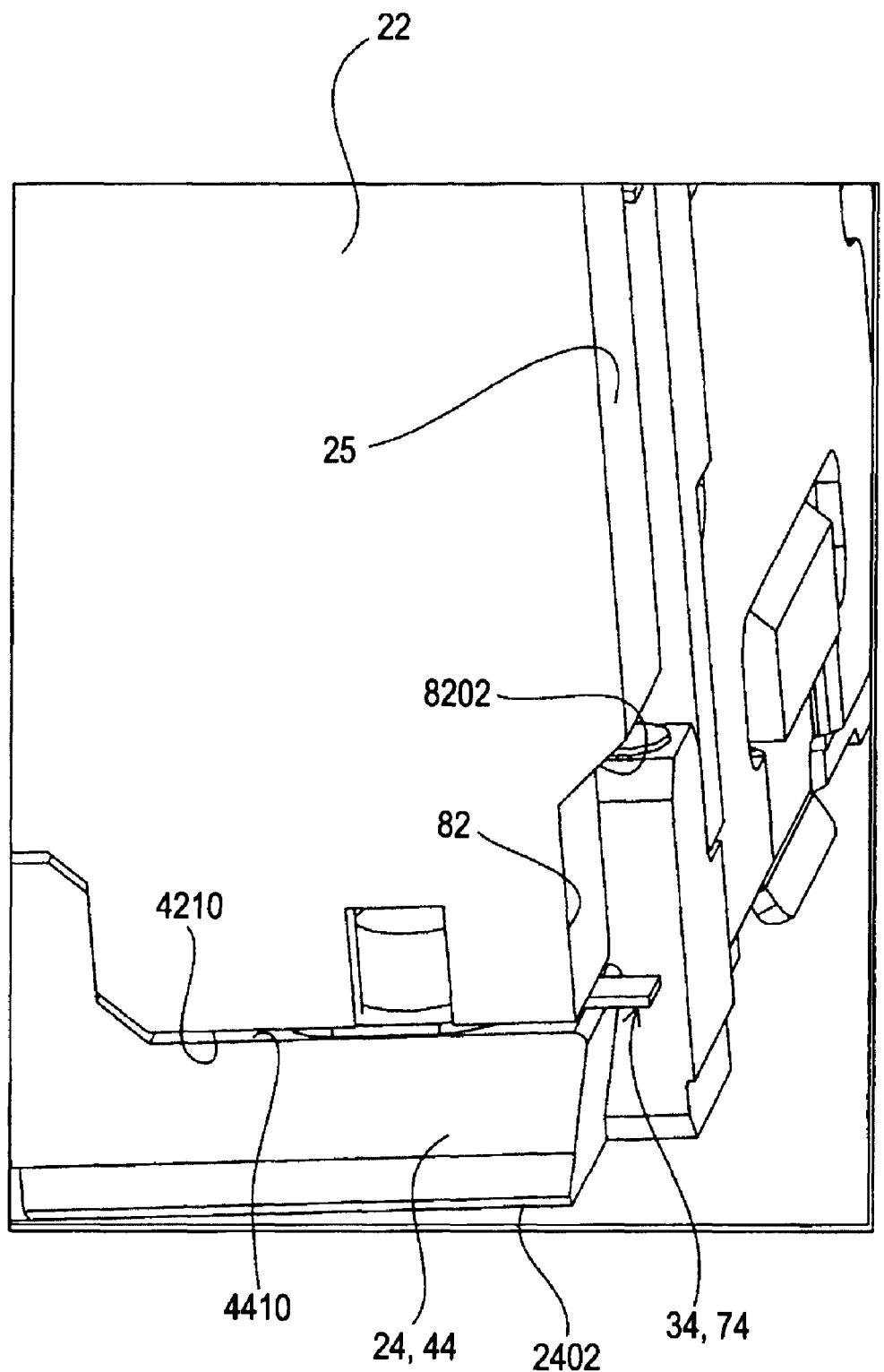

As a result, as shown in FIGS. 40 and 41, the laser beam L fuses a part of the second connecting portion 8006 positioned inside the recess 82, so that the rectangular frame 8002 is cut away from the supporting piece 74.

As shown in FIG. 8, when the second connecting portions 8006 are cut in this way, longitudinal ends of the rear springs 34, i.e., ends of the supporting pieces 74 are disposed in the recesses 82 in such a manner that the ends are displaced inward from imaginary extension surfaces of the outer surfaces 25 of the front lens barrel 22 and the rear lens barrel 24.

As describe above, the rear springs 34 are cut away from the spring member 80.

As shown in FIG. 3, after the rear springs 34 have been cut away from the spring member 80, the external connection terminals 78, which are sandwiched between the mating surfaces 4210 of the front lens barrel 22 and the mating surfaces 4410 of the rear lens barrel 24 and protrude from between the front lens barrel 22 and the rear lens barrel 24, are bent rearward.

Next, the image pickup device 36 is attached to the bottom wall 44 of the rear lens barrel 24 and the external connection terminals 78 are soldered to the substrate 58, so that the camera module 20 is completed.

With this structure, the outer surfaces 25 of the sandwiching portions of the rear lens barrel 24 and the front lens barrel 22 sandwiching the longitudinal ends of the rear springs 34 form the recesses 82 in the outer surfaces 25 of adjacent portions near to the sandwiching portions. The longitudinal ends of the rear springs 34 are displaced inward from imaginary extension surfaces of the outer surfaces 25 of the adjacent portions.

In other words, a camera module according to an embodiment of the present invention includes a rear lens barrel, a front lens barrel joined to the rear lens barrel so as to provide an accommodation space therebetween, a lens holder accommodated in the accommodation space and holding an imaging optical system, an image pickup device supported by the rear lens barrel and picking up an object image that has been guided by the imaging optical system, a guide mechanism supporting the lens holder in such a manner that the lens holder is movable along an optical axis of the imaging optical system, and a driving section for moving the lens holder along the optical axis of the imaging optical system, wherein the guide mechanism includes rear springs urging the lens holder from the image pickup device side to the imaging optical system side and front springs urging the lens holder from the imaging optical system side to the image pickup device side, wherein the rear springs and the front springs are made of spring strips, wherein longitudinal ends of at least either of the rear springs and the front springs are sandwiched between the front lens barrel and the rear lens barrel, wherein outer surfaces of sandwiching portions of the rear lens barrel and the front lens barrel sandwiching the longitudinal ends of the rear springs form recesses in outer surfaces of adjacent portions near to the sandwiching portions, and wherein the longitudinal ends of the rear springs are displaced inward from imaginary extension surfaces of the outer surfaces of the adjacent portions.

In a method for manufacturing a camera module according to an embodiment of the present invention, the camera module including a rear lens barrel, a front lens barrel joined to the rear lens barrel so as to provide an accommodation space therebetween, a lens holder accommodated in the accommodation space and holding an imaging optical system, and a guide mechanism supporting the lens holder in such a manner that the lens holder is movable along the optical axis of the imaging optical system, wherein the guide mechanism includes rear springs urging the lens holder from the image pickup device side to the imaging optical system side and front springs urging the lens holder from the imaging optical system side to the image pickup device side, and wherein the rear lens barrel has a rear end surface on the opposite side of the front lens barrel and the front lens barrel has a front end surface on the opposite side of the rear lens barrel, the method includes the steps of making either of the rear springs and the front springs by pressworking a spring plate so that a rectangular frame and spring strips inside the rectangular frame are integrally formed, sandwiching longitudinal ends of the springs near to the rectangular frame between sandwiching portions of the front lens barrel and the rear lens barrel, forming recesses in outer surfaces of the sandwiching portions of the rear lens barrel and the front lens barrel so that the outer surfaces are recessed from outer surfaces of adjacent portions near to the sandwiching portions, and emitting a laser beam through the inside of the recess so that the spring and the rectangular frame are cut off.

Thus, the longitudinal ends of the rear springs 34 are positioned inside the peripheries of the front lens barrel 22 and the rear lens barrel 24, which is advantageous in reducing the outside dimension of the camera module 20 and for miniaturizing an electronic apparatus including the camera module 20.

Moreover, because the recesses 82 are formed in the rear end surfaces 2402 of the rear lens barrel 24 in an open manner, the laser beam L can be diagonally emitted toward the side surface of the rear lens barrel 24, whereby the longitudinal ends of the rear springs 34 sandwiched between the rear lens barrel 24 and the front lens barrel 22 can be positioned near to the bottom surfaces of the recesses 82.

Moreover, because the bottom surfaces of the recesses 82 are formed as inclined surfaces 8202 inclined in such a manner that the depths of the recesses 82 increase toward open ends of the recesses 82, the laser beam L can be emitted more diagonally, whereby the longitudinal ends of the rear springs 34 sandwiched between the rear lens barrel 24 and the front lens barrel 22 can be positioned nearer to the bottom surfaces of the recesses 82.

Moreover, because the recesses 82 in the rear lens barrel 24 may be formed in a minimal size as long as the recesses 82 allow the laser beam L to be diagonally emitted as described above, which is advantageous in miniaturizing the camera module 20 while securing spaces for accommodating components and members of the camera module 20.

Although the laser beam L is emitted to the rear springs 34 in the foregoing description, the laser beam L may be emitted to the front springs 32.

First Embodiment

The rear springs 34 according to a first embodiment of the present invention is described below.

Figure 42:
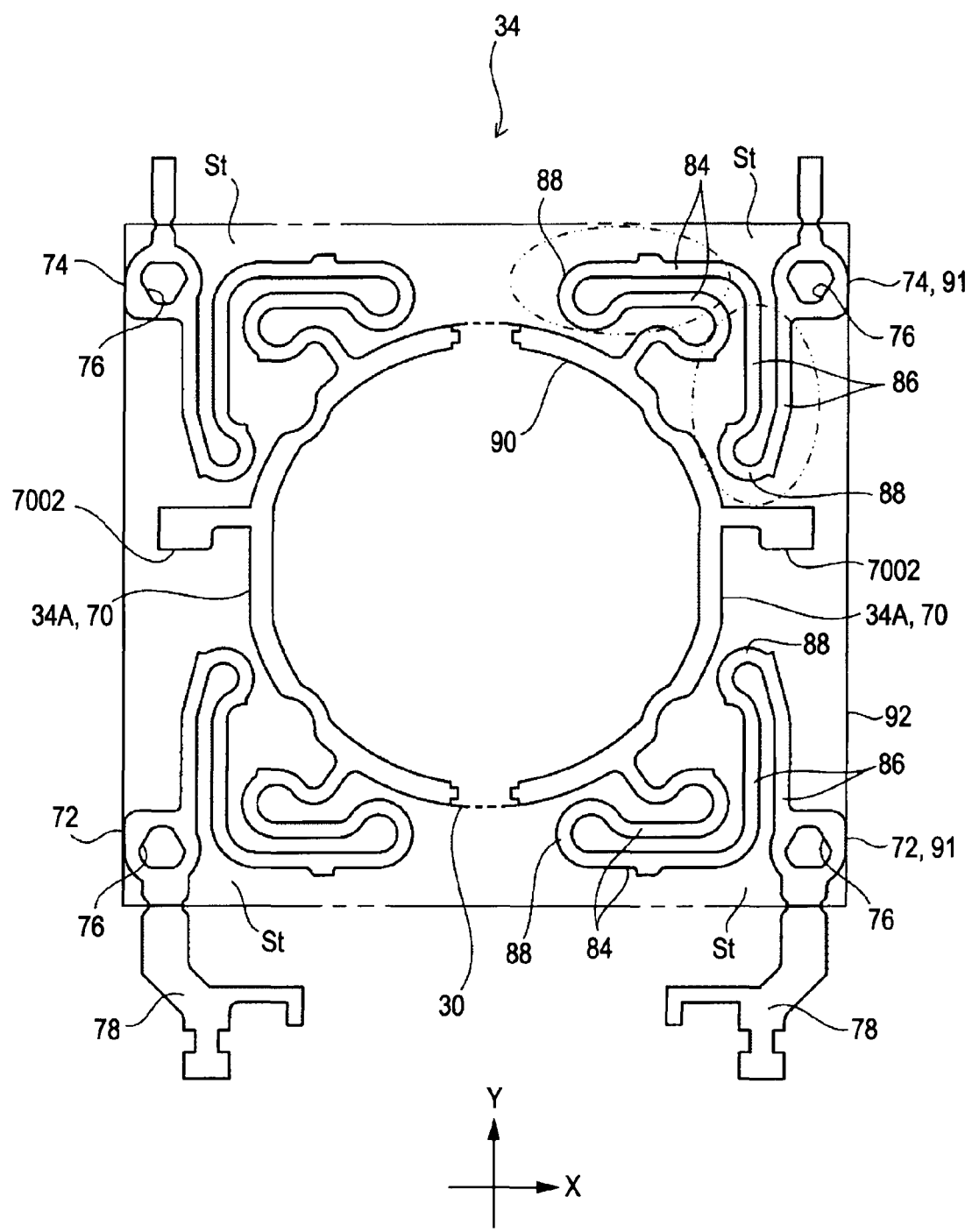
FIG. 42 is a plan view of the rear springs.
Figure 43:
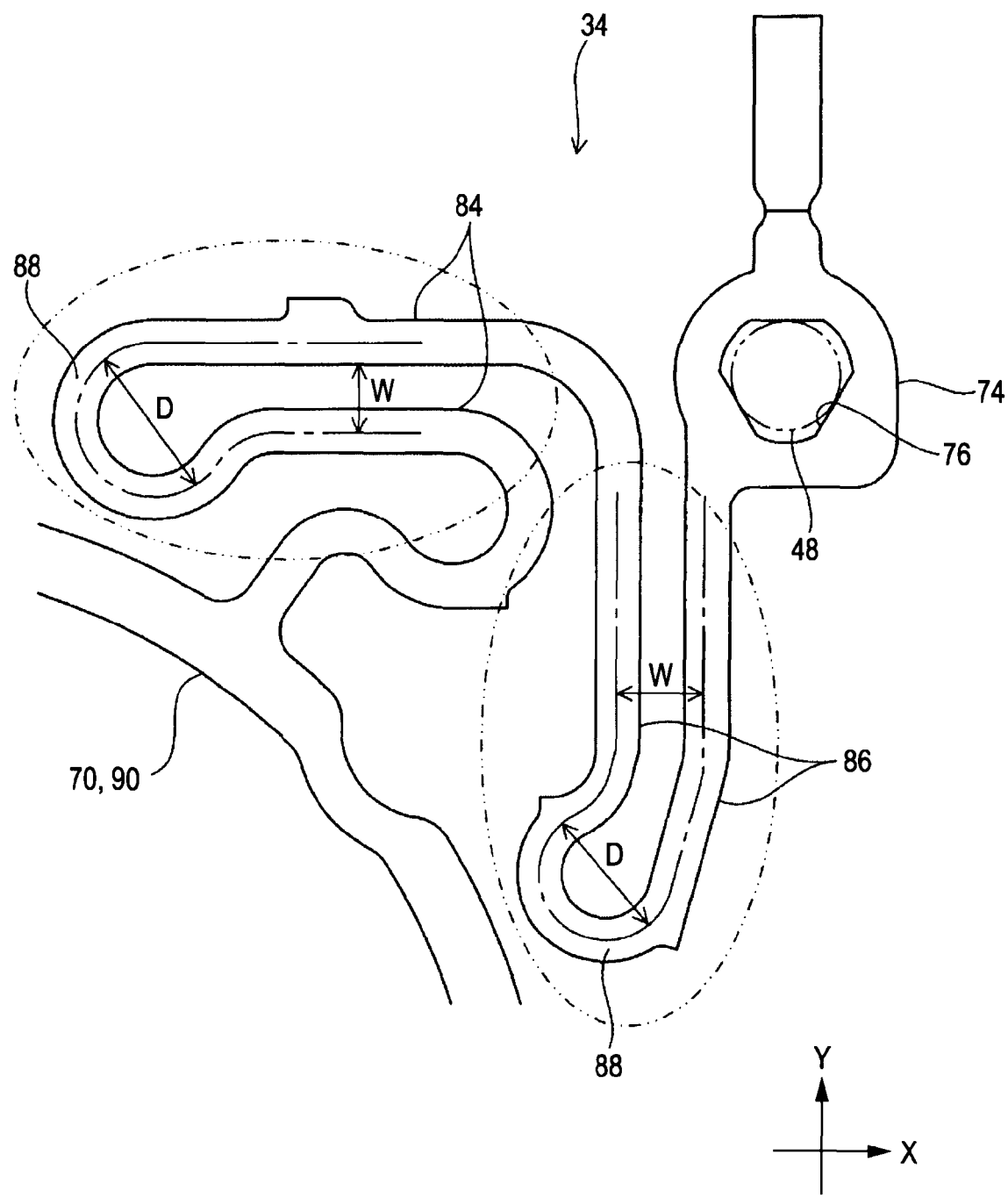
FIG. 43 is a partial enlarged view of the rear spring.
Figure 44:
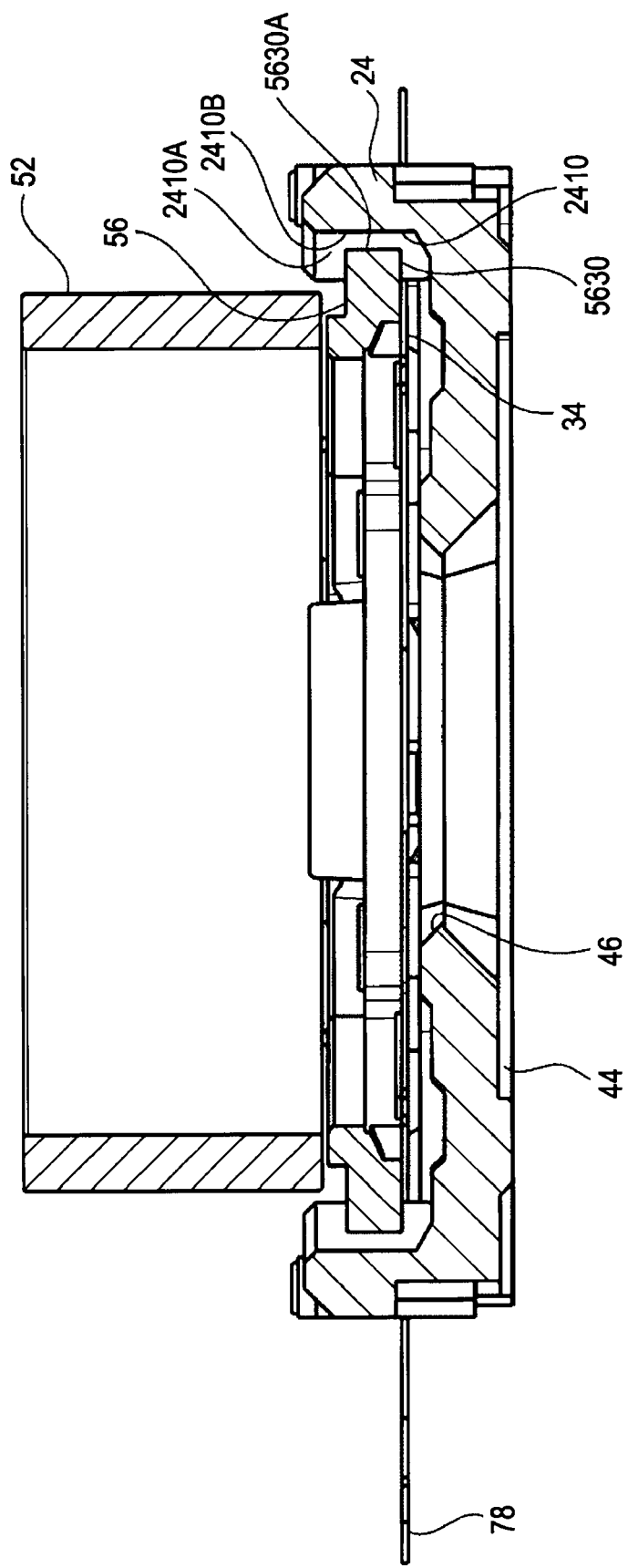
FIG. 44 is a sectional view of the structure of FIG. 25 taken along line XLIV-XLIV.

FIG. 42 is a plan view of the rear springs 34, FIG. 43 is a partial enlarged view of the rear springs 34, and FIG. 44 is a sectional view of the structure of FIG. 25 taken along line XLIV-XLIV. For convenience of description, drawings of the imaging optical system 28 and the lens holder 30 are omitted from FIG. 44.

Next, configurations of the rear springs 34 are described in detail.

Four rear springs 34 are disposed along the circumference of the lens holder 30 with distances therebetween. The rear springs 34 support the lens holder 30 in such a manner that the lens holder 30 is movable along the optical axis of the imaging optical system 28.

As shown in FIGS. 42 and 43, each of the rear springs 34 includes a first arm portion 84 and a second arm portion 86 extending perpendicularly to each other in a plane perpendicular to the optical axis of the imaging optical system 28.

Each of the first and second arm portions 84 and 86 includes two thin spring strips extending parallel to each other with their thickness directions being parallel to the optical axis.

In each of the first and second arm portions 84 and 86, the two spring strips are connected to each other by an arc portion 88 at longitudinal ends of the two spring strips remote from a region in which the first and second arm portions 84 and 86 perpendicularly intersect, the arc portion 88 having a diameter D larger than a distance W between the two spring strips.

In the region in which the first and second arm portions 84 and 86 perpendicularly intersect, one of the two spring strips of the first arm portion 84 is connected to one of the two spring strips of the second arm portion 86.

In the region in which the first and second arm portions 84 and 86 perpendicularly intersect, a longitudinal end of the other one of the two spring strips of the first arm portion 84 is formed as a holding piece 90. The holding piece 90 is attached to the lens holder 30 and constitutes the above-described arc portion 70.

As shown in FIG. 42, in the region in which the first and second arm portions 84 and 86 perpendicularly intersect, a longitudinal end 91 of the other one of the spring strips of the second arm portion 86 is attached to a lens barrel 92. In the present embodiment, the longitudinal ends 91 are formed as the supporting pieces 72 and 74 having an annular shape in which the holes 76 are formed. As shown in FIG. 2, the lens barrel 92 includes the front lens barrel 22 and the rear lens barrel 24, which are splittable in the optical axis direction.

Longitudinal ends of the holding pieces 90 of two adjacent rear springs 34 are connected to each other, so that the two adjacent rear springs 34 constitute the spring segment 34A.

When an X-axis direction and a Y-axis direction that are perpendicular to each other are taken on a plane perpendicular to the optical axis of the imaging optical system 28, the first arm portions 84 of the rear springs 34 extend in the X-axis direction and the second arm portions 86 of the rear springs 34 extend in the Y-axis direction.

As shown in FIG. 42, the lens barrel 92 has a rectangular parallelepiped shape and the lens holder 30 has a cylindrical shape. Four spaces St having a triangular prism shape extending in the front-rear direction are disposed between the outer peripheral surface of the lens holder 30 and the corners of the lens barrel 92.

The four rear springs 34 are disposed in the spaces St.

Each of the rear springs 34 is disposed in such a manner that the first and second arm portions 84 and 86 extend parallel to respective walls of the corners of the lens barrel 92.

How the rear springs 34 are joined to the lens barrel 92 is described below.

The holding pieces 90 (arc portions 70) of the rear springs 34 are bonded with an adhesive to the rear surface 5620 (see FIG. 33) of the coil holder 56 attached to the lens holder 30, whereby the holding pieces 90 of the rear springs 34 are attached to the lens holder 30 via the coil holder 56.

The pins 48 of the rear lens barrel 24 are inserted into the holes 76 in the ends 91 (supporting pieces 72 and 74) of the rear springs 34 so that the ends 91 are sandwiched between the mating surfaces 4210 of the front lens barrel 22 and the mating surfaces 4410 of the rear lens barrel 24 as shown in FIG. 10, whereby the other ends 91 of the rear springs 34 are attached to the lens barrel 92.

Structure of Stoppers of Lens Holder 30

Referring to FIGS. 25 and 44, the structure of the stoppers of the lens holder 30 is described below.

As shown in FIG. 25, in the present embodiment, the X-axis extends parallel to a pair of sides 4402 of the rear lens barrel 24 that are parallel to each other, and the Y-axis extends parallel to the other pair of sides 4404 of the rear lens barrel 24 that are parallel to each other.

As shown in FIGS. 25 and 44, stopper protrusions 5630 protrude in radial directions of the coil holder 56 from two positions separated by 90° from the shaft portions 5602 on the circumference of the coil holder 56. Thus, the stopper protrusions 5630 are disposed at two positions on the circumference of the coil holder 56 that are separated by 180°.

In the present embodiment, the two stopper protrusions 5630 are disposed on both sides of the coil holder 56 in the Y-axis direction.

Each of the stopper protrusions 5630 includes two first contact surfaces 5630A and a second contact surface 5630B. The first contact surfaces 5630A are disposed opposite each other in the X-axis direction and parallel to the a plane including the Y-axis and the optical axis of the imaging optical system 28. The second contact surface 5630B is parallel to the optical axis of the imaging optical system 28 and parallel to a plane including the X-axis.

In portions of the rear lens barrel 24 that face the stopper protrusions 5630, stopper recesses 2410 corresponding to the stopper protrusions 5630 are formed.

Each of the stopper recesses 2410 includes two third contact surfaces 2410A facing the first contact surfaces 5630A with distances in the X-axis direction therebetween, and a fourth contact surface 2410B facing the second contact surface 5630B with a distance in the Y-axis direction therebetween.

The first contact surfaces 5630A of the stopper protrusions 5630 are configured to contact the third contact surfaces 2410A of the stopper recesses 2410 so as to set a movement limit position of the coil holder 56 (lens holder 30) in the X-axis direction. The second contact surfaces 5630B of the stopper protrusions 5630 are configured to contact the fourth contact surfaces 2410B of the stopper recesses 2410 so as to set a movement limit position of the coil holder 56 (lens holder 30) in the Y-axis direction.

The movement limit positions of the lens holder 30 in the X- and Y-axis directions are set in a range such that the rear springs 34 are not permanently deformed when the lens holder 30 is moved to the movement limit positions.

Advantage

Operational advantages are described below.

If a shock is applied to the camera module 20 in the direction perpendicular to the optical axis of the imaging optical system 28 when, for example, the electronic apparatus 10 including the camera module 20 falls on a floor, the lens holder 30 is moved in the direction opposite the direction in which the shock is applied.

When the lens holder 30 is moved, the first and second arm portions 84 and 86 of the rear springs 34 elastically deform so as to absorb and reduce the force applied to the lens holder 30.

The first arm portion 84 is disposed parallel to the X-axis direction and the second arm portion 86 is disposed parallel to the Y-axis direction. In other words, the first and second arm portions 84 and 86 extend perpendicular to each other. When the force is applied to the lens holder 30 in a direction perpendicular to the optical axis, both the first and second arm portions 84 and 86 elastically deform so as to absorb and reduce the force.

Thus, the force is prevented from being applied to only one of the first and second arm portions 84 and 86, which is advantageous in improving the durability of the rear springs 34 and for miniaturizing the rear springs 34 and the camera module 20.

If the first and second arm portions 84 and 86 extend in directions that are not perpendicular to each other, the force may be applied to one of the first and second arm portions 84 and 86 when a shock is applied in the direction perpendicular to the optical axis, which is disadvantageous in improving the durability of the rear springs 34.

In the present embodiment, the rear springs 34 are disposed in the four spaces St having a triangular prism shape and extending in the front-rear direction between the outer peripheral surface of the lens holder 30 and the corners of the lens barrel 92, so that the spaces St, which are dead spaces, can be effectively used, which is more advantageous in miniaturizing the camera module 20.

Second Embodiment

A second embodiment is described below.

Figure 45:
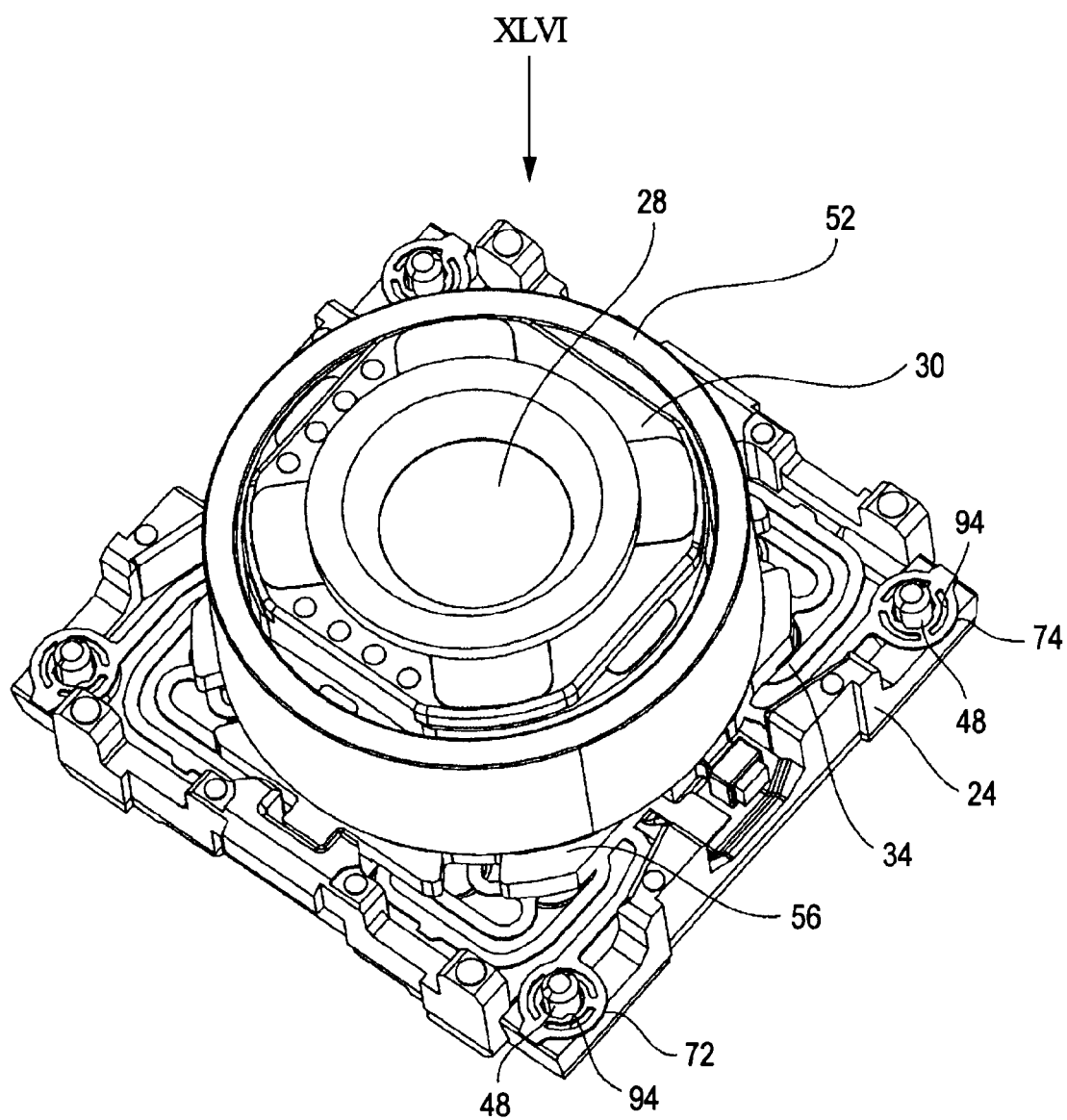
FIG. 45 is a perspective view of a structure in which the rear springs are attached to the rear lens barrel.
Figure 46:
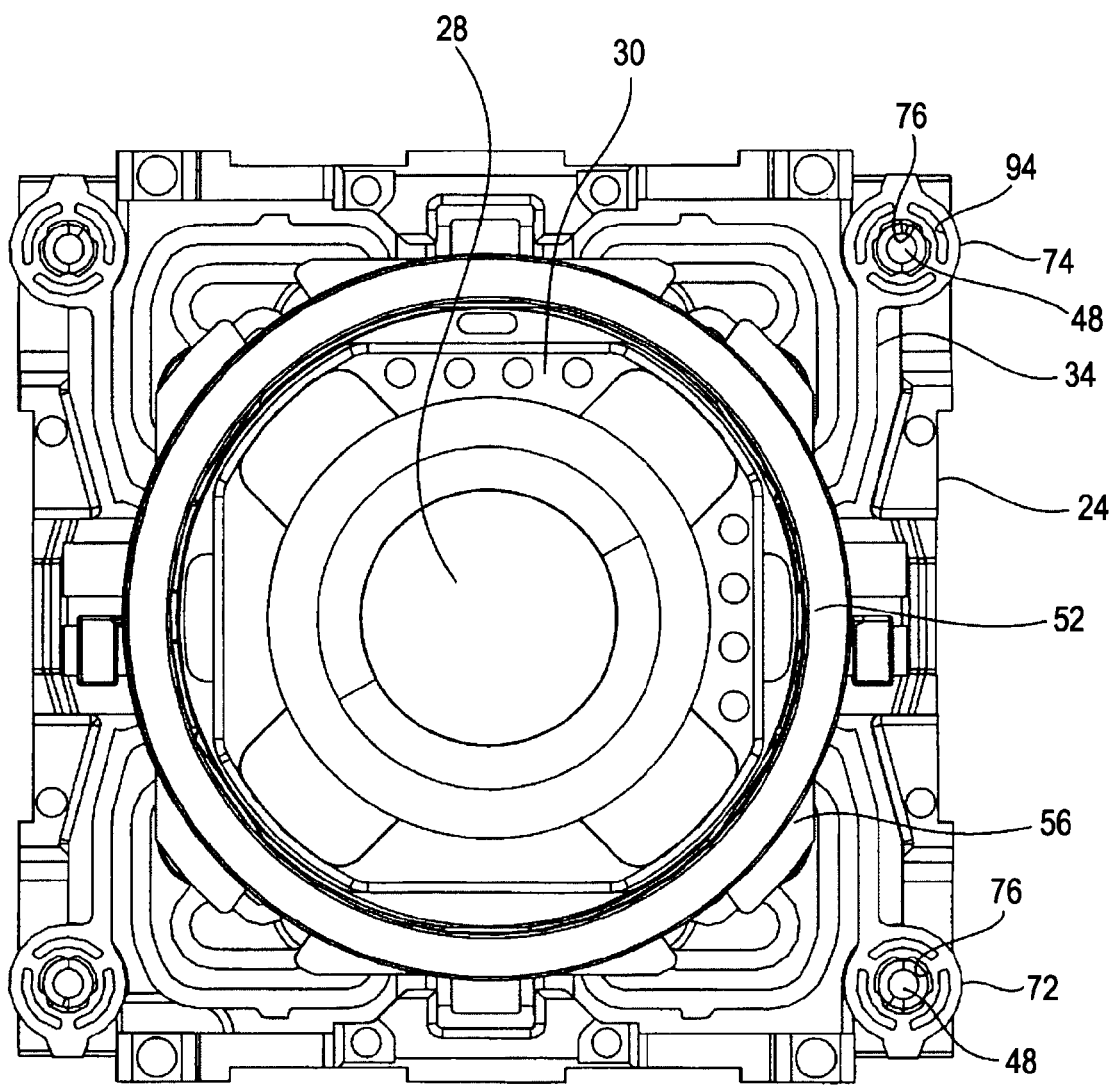
FIG. 46 shows the structure of FIG. 45 when viewed in the direction of arrow XLVI.
Figure 47:
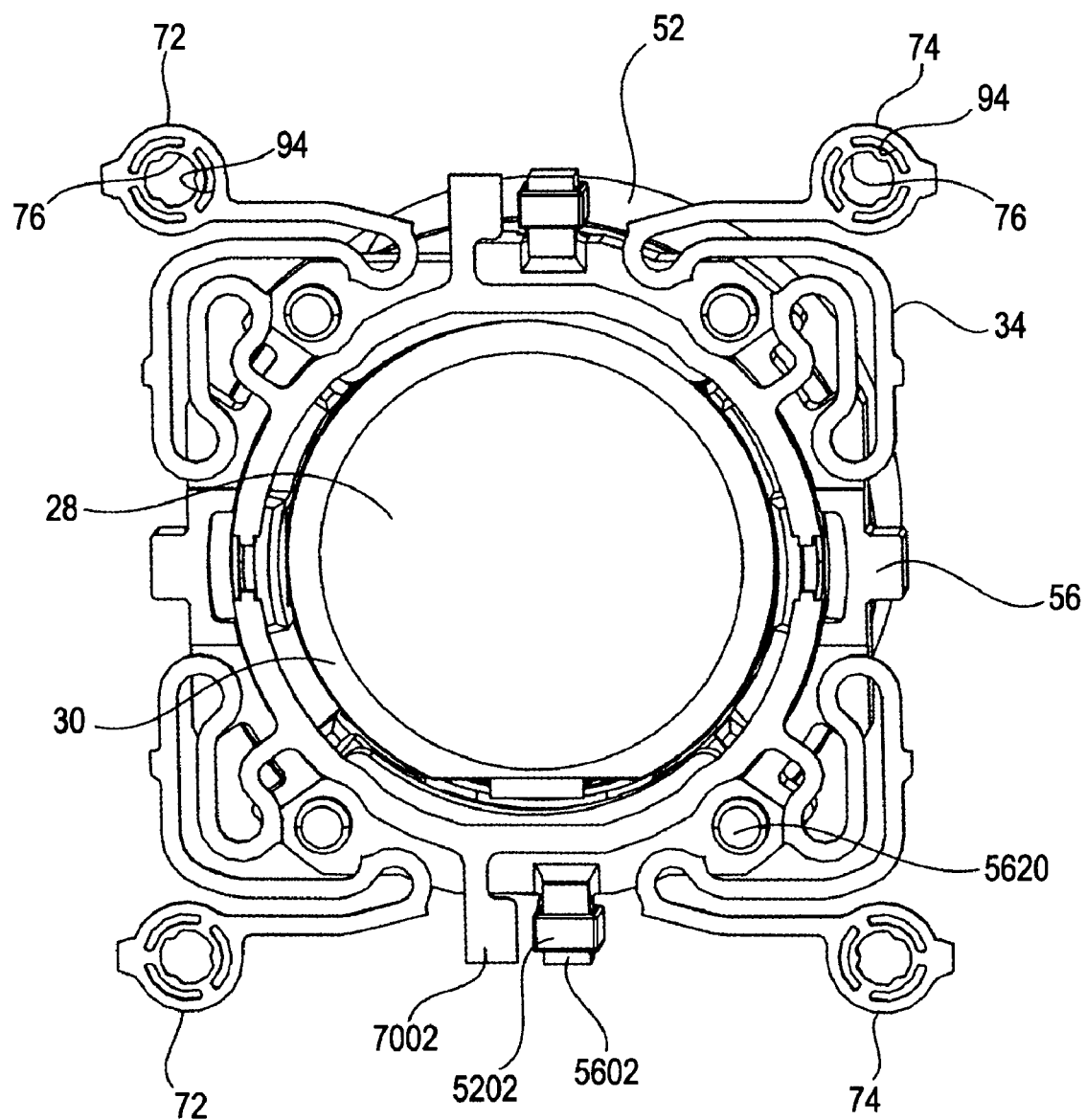
FIG. 47 is a perspective view of a structure in which the rear springs are attached to the lens holder.
Figure 48:
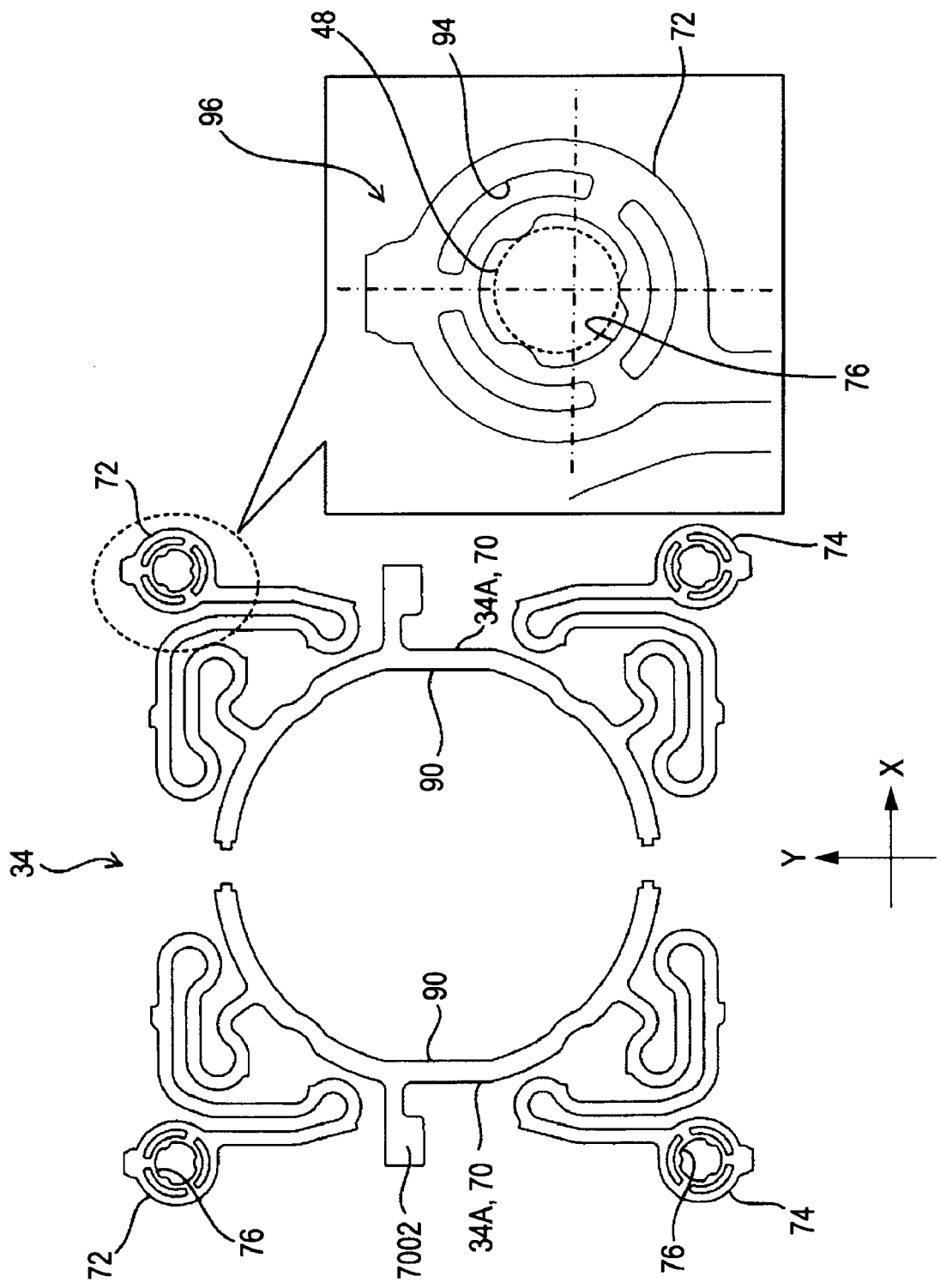
FIG. 48 is a plan view of the rear springs.
Figure 49:
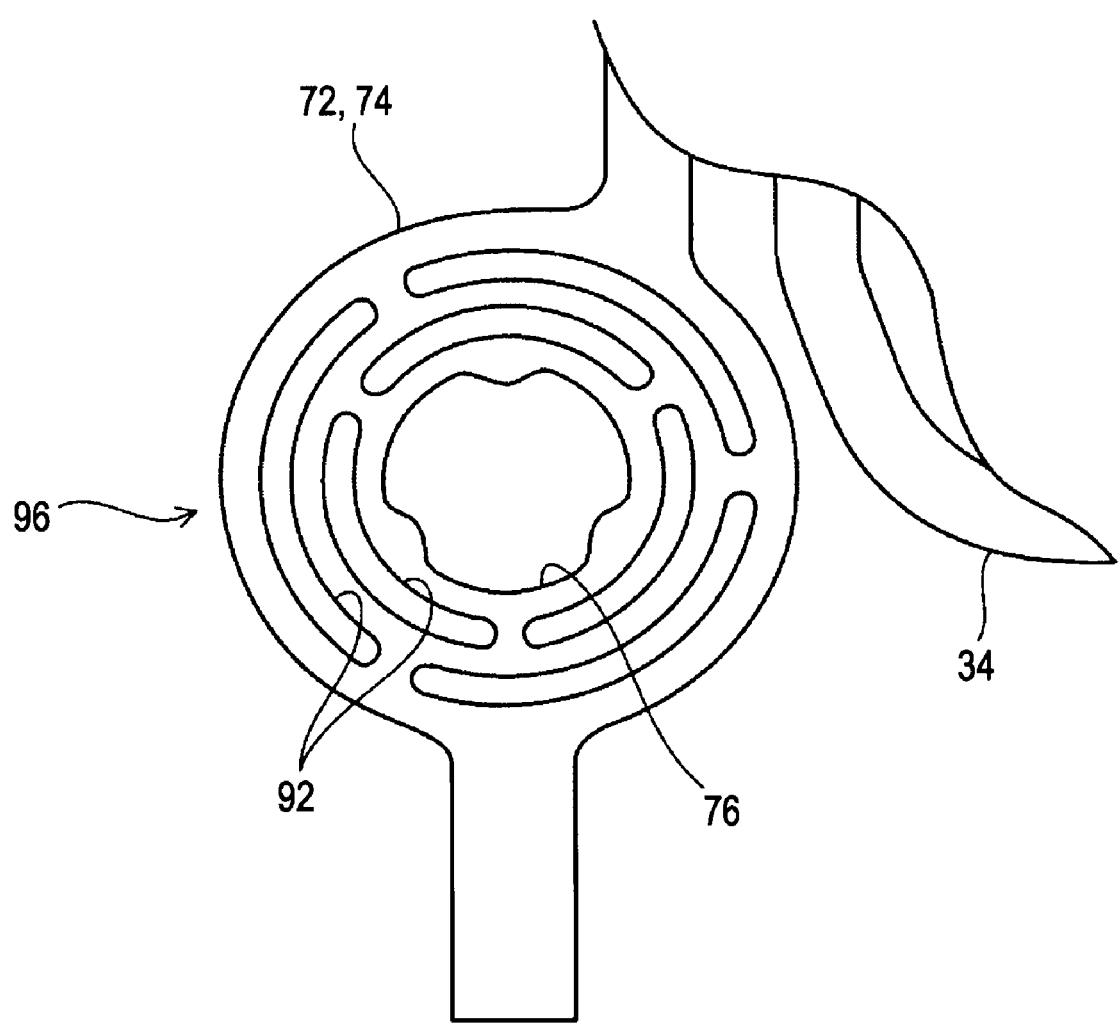
FIG. 49 is an enlarged plan view of a supporting piece of the rear spring.

FIG. 45 is a perspective view of a structure in which rear springs 34 according to the second embodiment are attached to the rear lens barrel 24, FIG. 46 shows the structure of FIG. 45 when viewed in the direction of arrow XLVI, FIG. 47 is a perspective view of a structure in which the rear springs 34 according to the second embodiment are attached to the lens holder 30, FIG. 48 is a plan view of the rear springs 34 according to the second embodiment, and FIG. 49 is an enlarged plan view of a modification of the supporting piece of the rear spring 34 according to the second embodiment.

As shown in FIGS. 45 to 48, in the second embodiment, grooves 94 having an arc shape are formed in the supporting pieces 72 and 74 of the rear springs 34 with distances therebetween. The grooves 94 extend coaxially with the holes 76 in the circumferential directions of the holes 76.

In this case, the annular portions of the supporting pieces 72 and 74 extending around the periphery of the holes 76 and excluding the grooves 94 are sandwiched between the mating surfaces 4210 of the front lens barrel 22 and the mating surfaces 4410 of the rear lens barrel 24, whereby the rear springs 34 are attached to the lens barrel 92.

The grooves 94 may be formed along a single circumference as shown in FIG. 48, along two circumferences having different radii as shown in FIG. 49, or along more than two circumferences.

As shown in FIGS. 48 and 49, by forming the grooves 94 in the supporting pieces 72 and 74, spring portions 96, which are elastically deformable in the direction perpendicular to the optical axis of the imaging optical system 28, are provided in the supporting pieces 72 and 74.

Therefore, with the second embodiment, a force perpendicular to the optical axis of the imaging optical system 28 can be absorbed and reduced also by the spring portions 96, which is more advantageous in improving the durability of the rear springs 34 and miniaturizing the rear springs 34.

Descriptions of the embodiment have been given for the case in which the present invention is applied to the rear springs 34. However, it is needless to say that the present invention is also applicable to the front springs 32.

Descriptions have been given for the case in which the present invention is applied to a so-called moving-coil system including a driving section in which a coil is attached to a lens holder and a magnet is attached to a lens barrel.

However, it is needless to say that the present invention is applicable to a so-called moving-magnet system including a driving section in which a magnet is attached to a lens holder and a coil is attached to a lens barrel.

Attachment Structure of Cover 26

An attachment structure of the cover 26 is described below.

Figure 50:
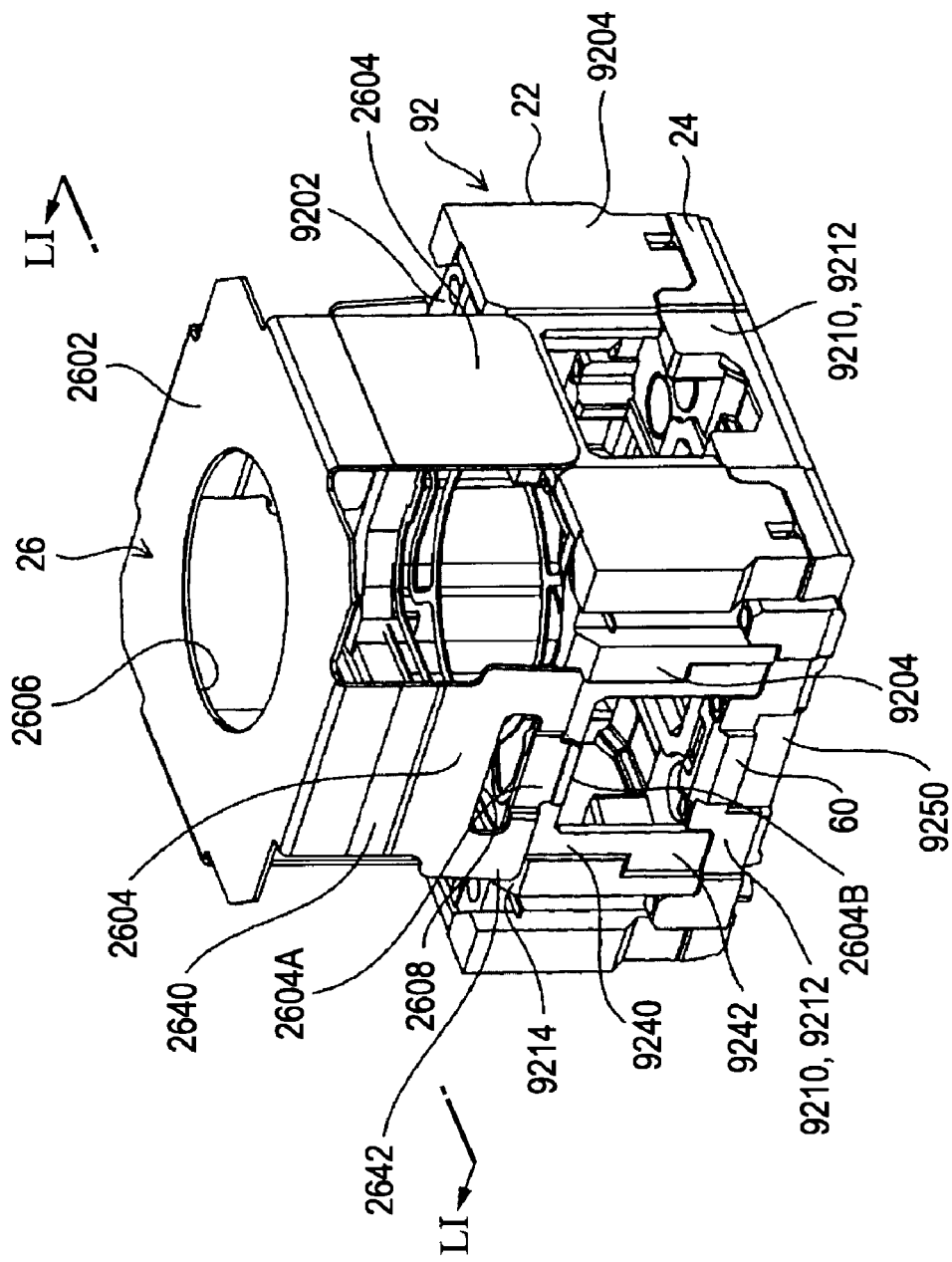
FIG. 50 is a perspective view of a structure for explaining how the cover is attached to the lens barrel.
Figure 51:
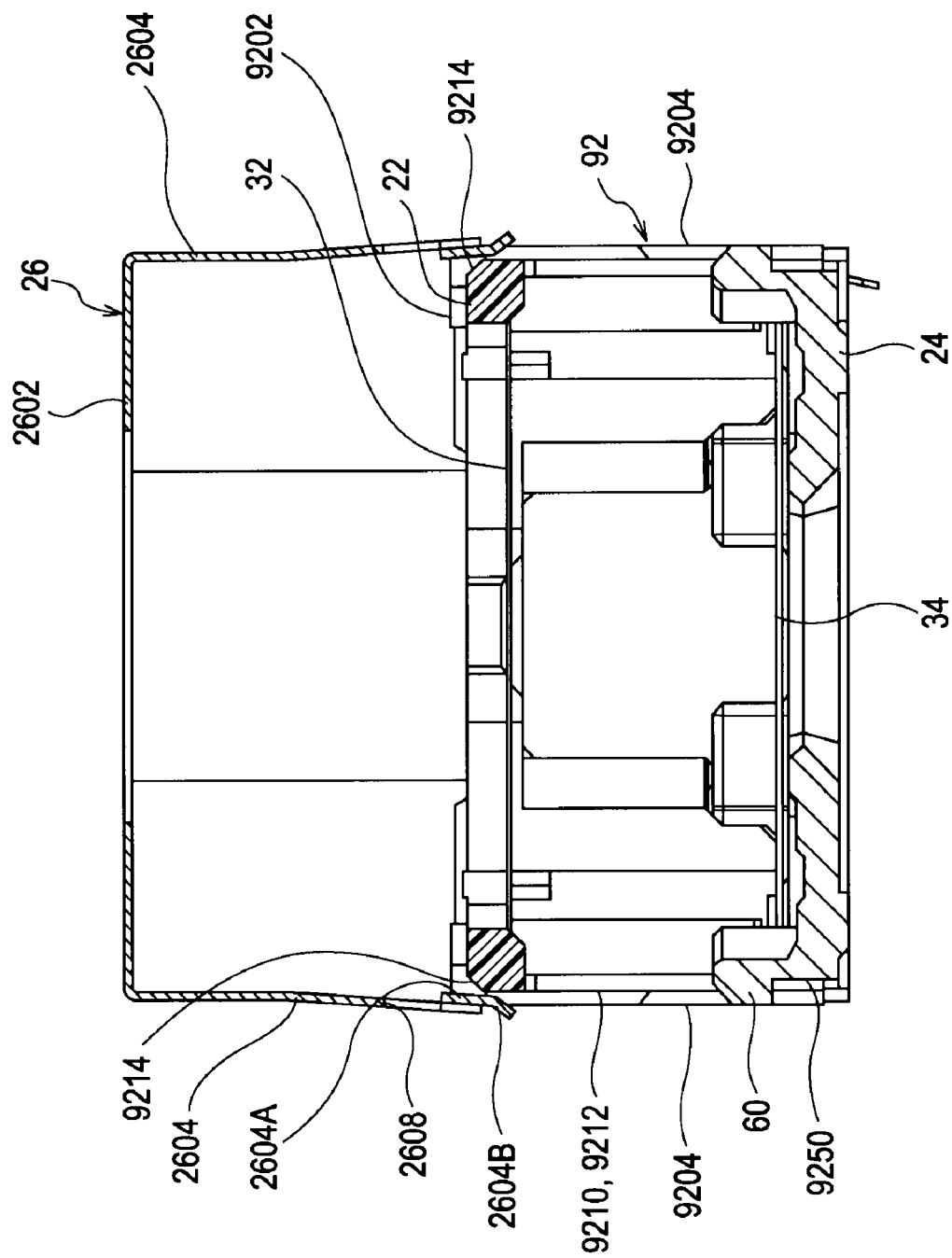
FIG. 51 is a sectional view of the structure of FIG. 50 taken along line LI-LI.
Figure 52:
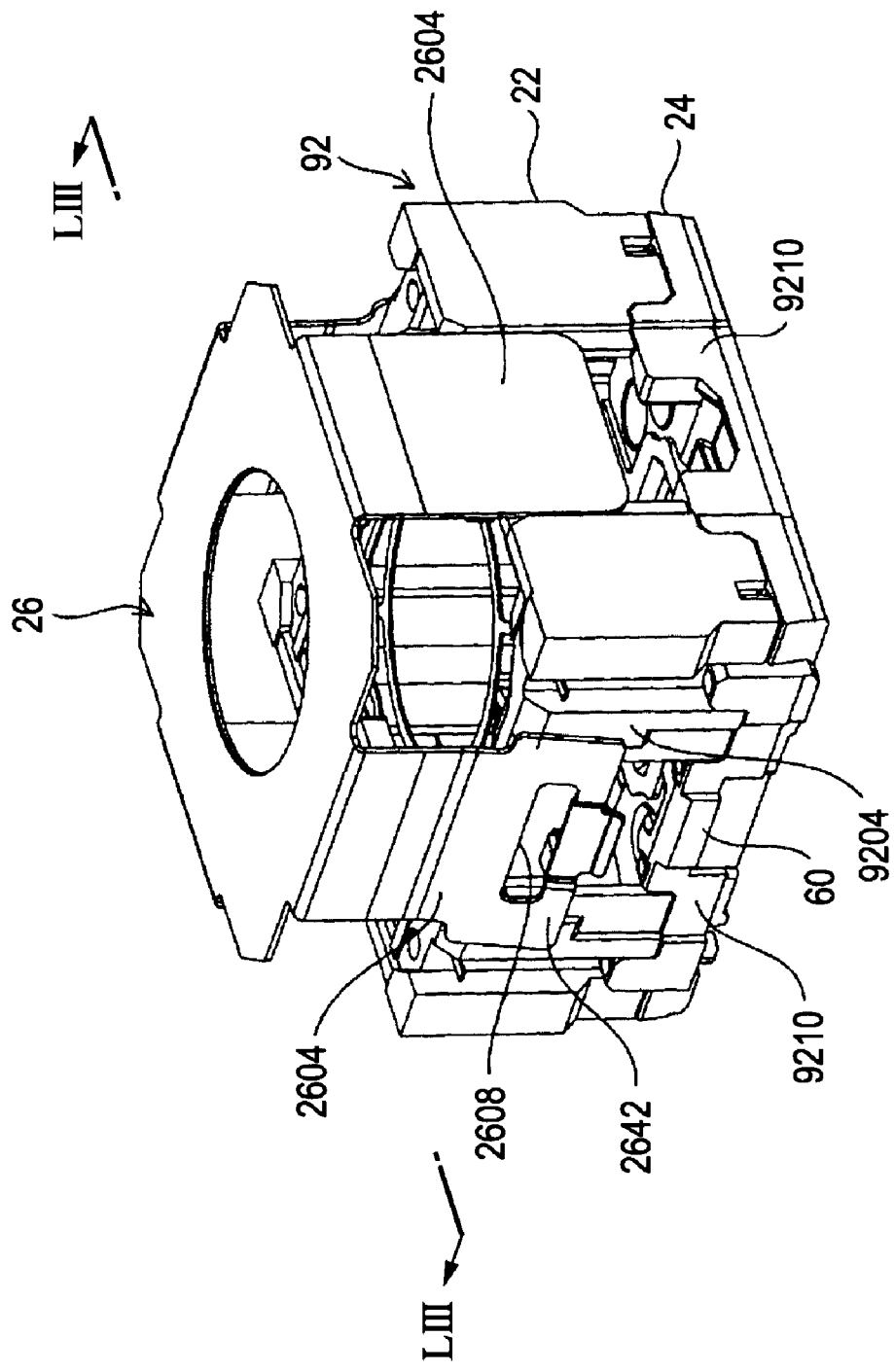
FIG. 52 is a perspective view of the structure for explaining how the cover is attached to the lens barrel.
Figure 53:
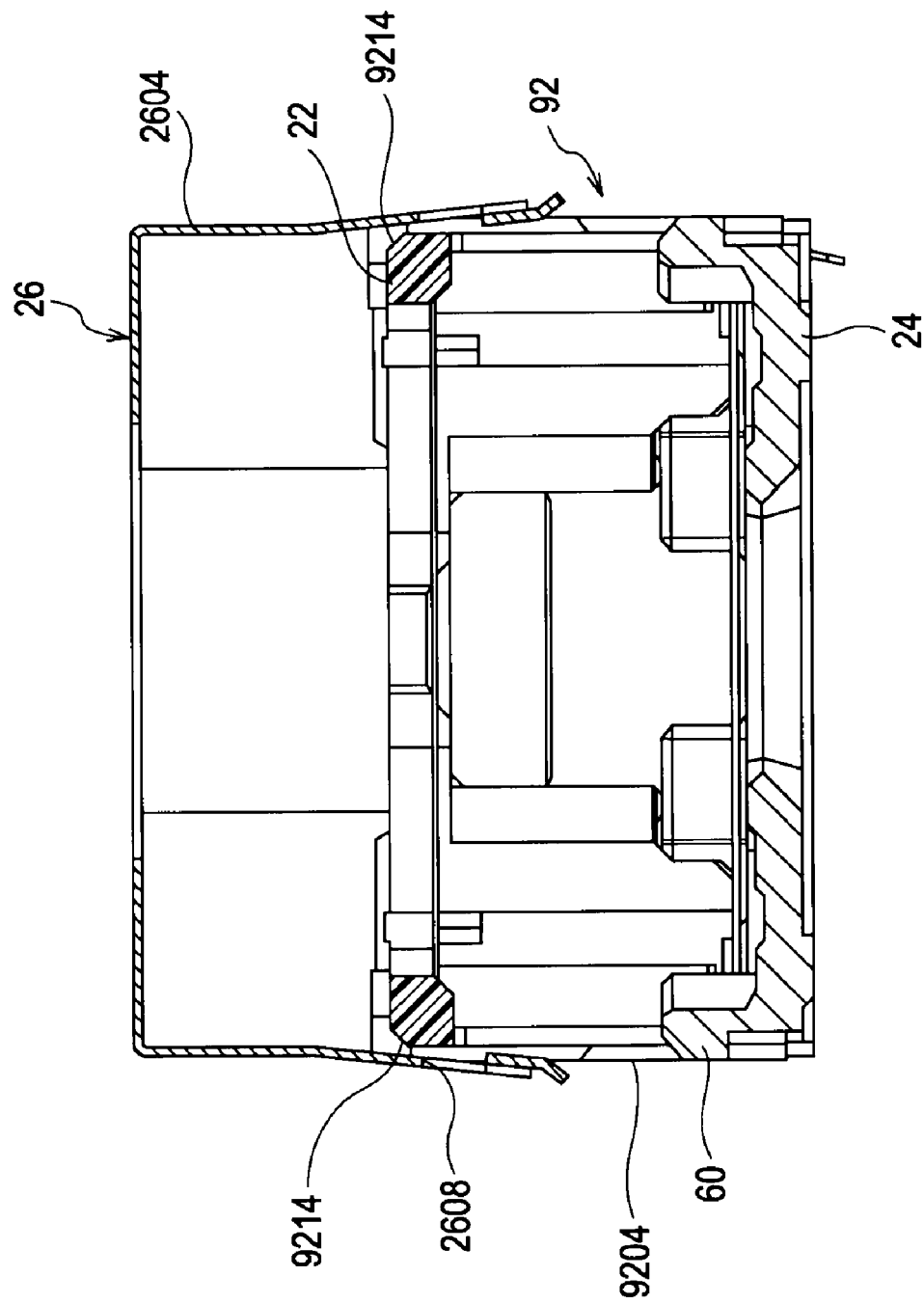
FIG. 53 is a sectional view of the structure of FIG. 52 taken along line LIII-LIII.
Figure 54:
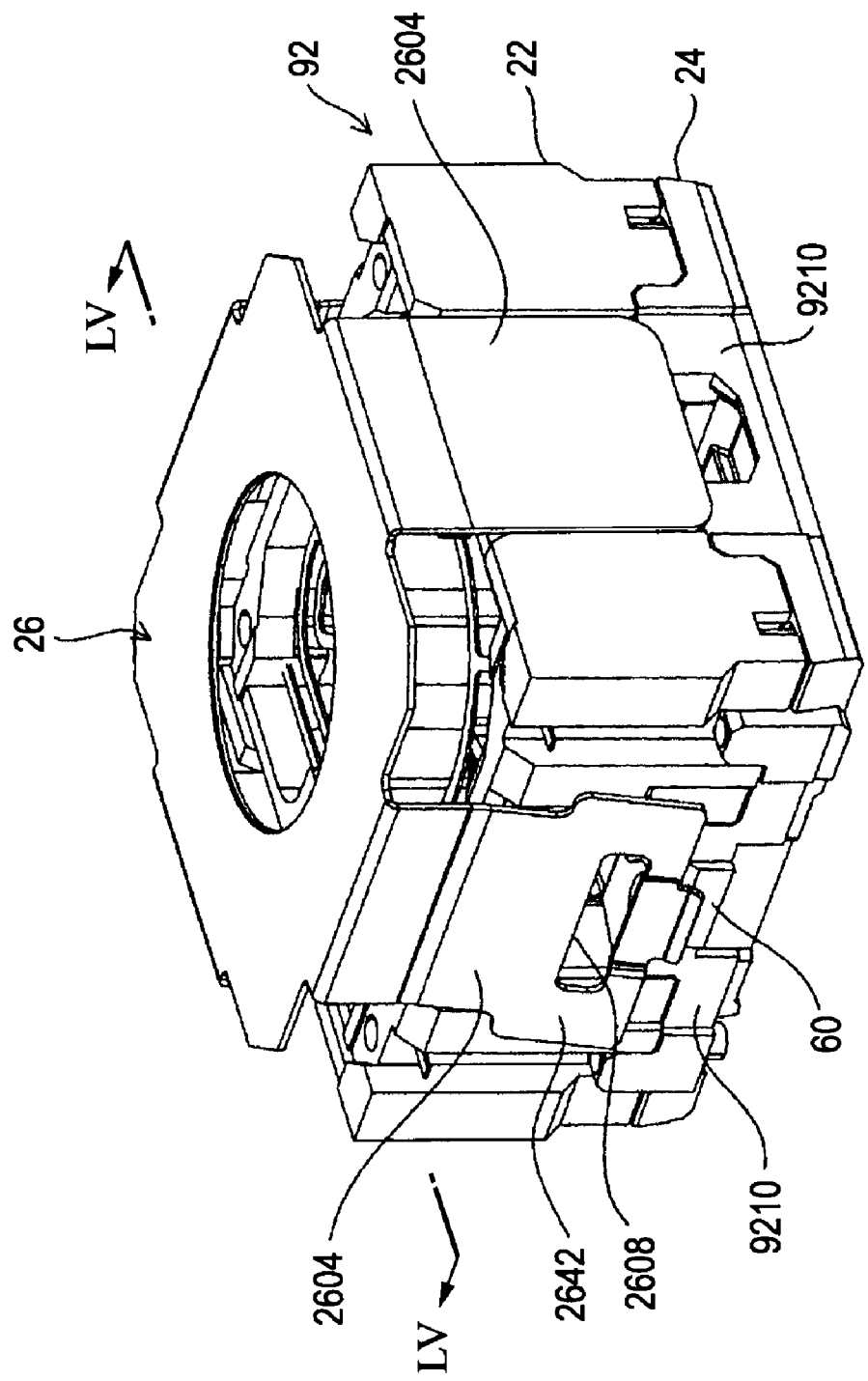
FIG. 54 is a perspective view of the structure for explaining how the cover is attached to the lens barrel.
Figure 55:
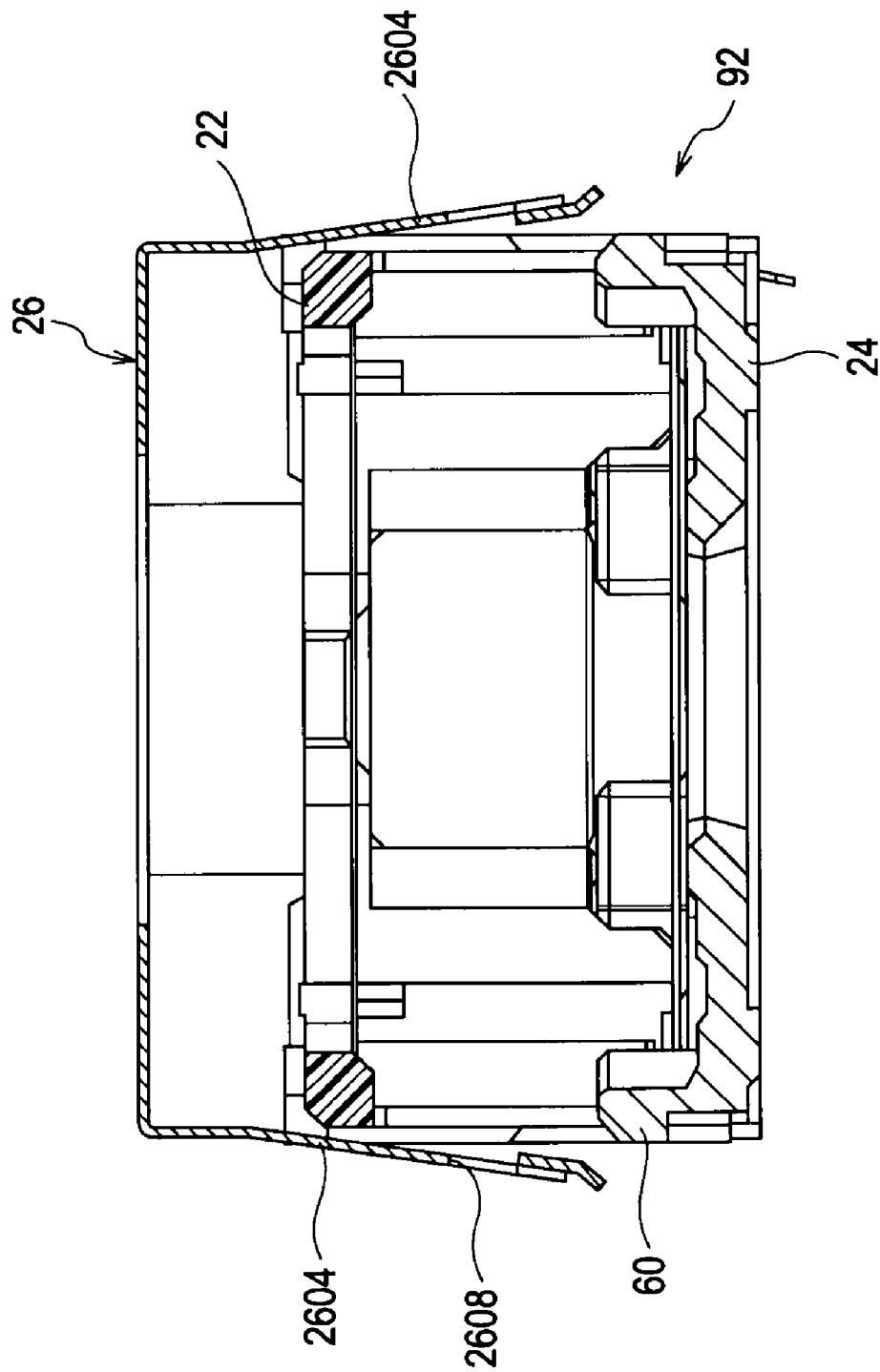
FIG. 55 is a sectional view of the structure of FIG. 54 taken along line LV-LV.
Figure 56:
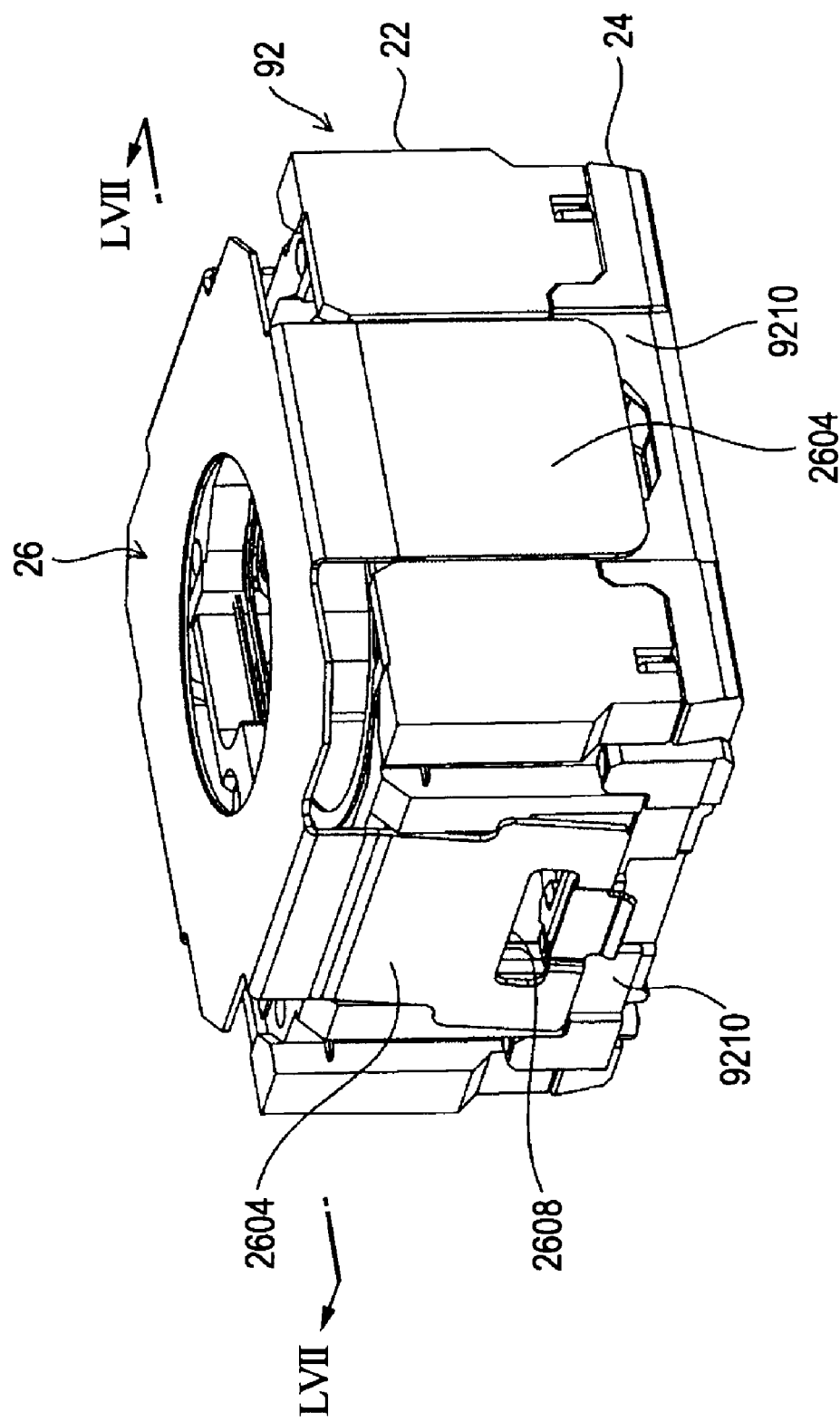
FIG. 56 is a perspective view of the structure for explaining how the cover is attached to the lens barrel.
Figure 57:
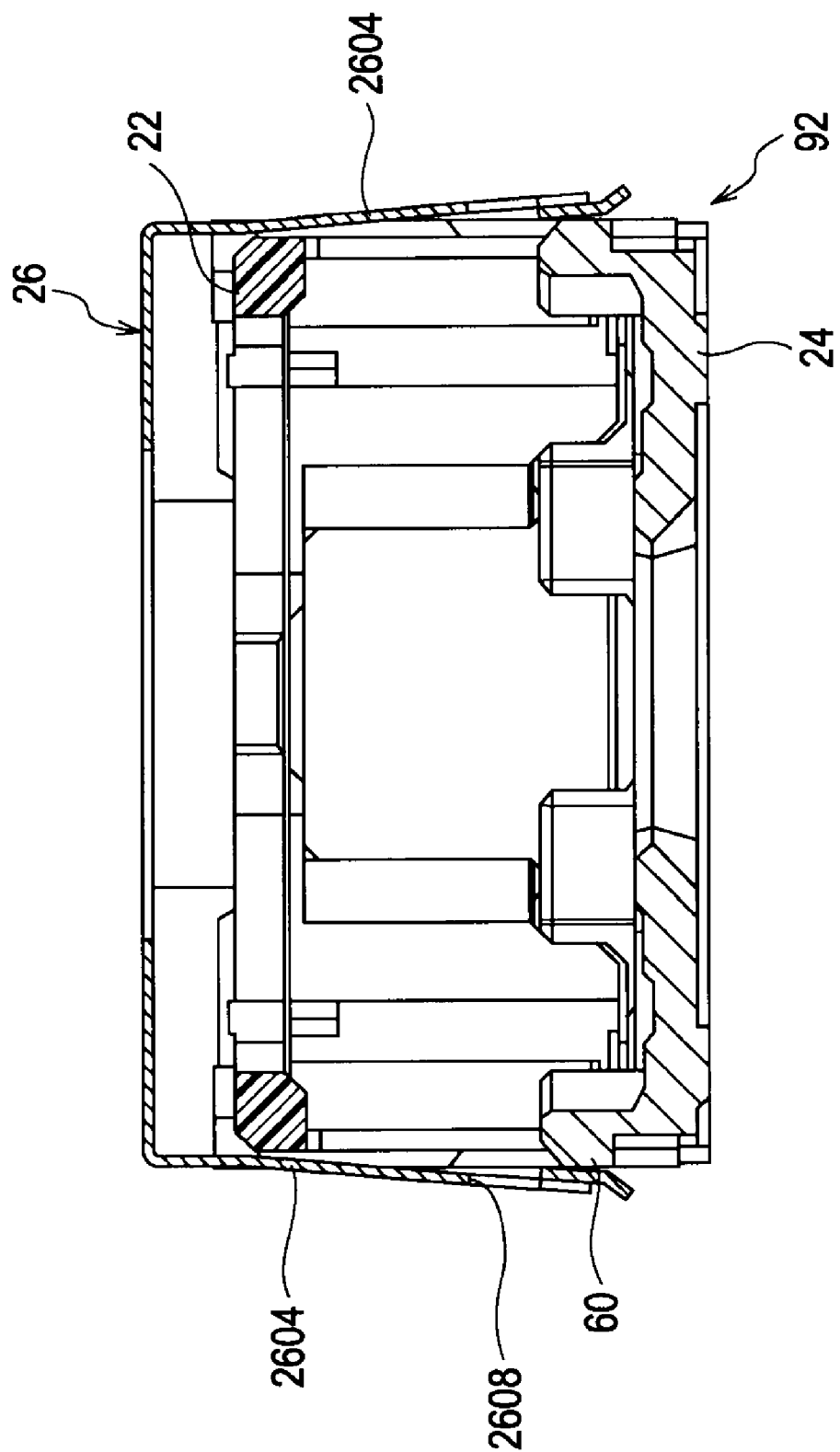
FIG. 57 is a sectional view of the structure of FIG. 56 taken along line LVII-LVII.
Figure 58:
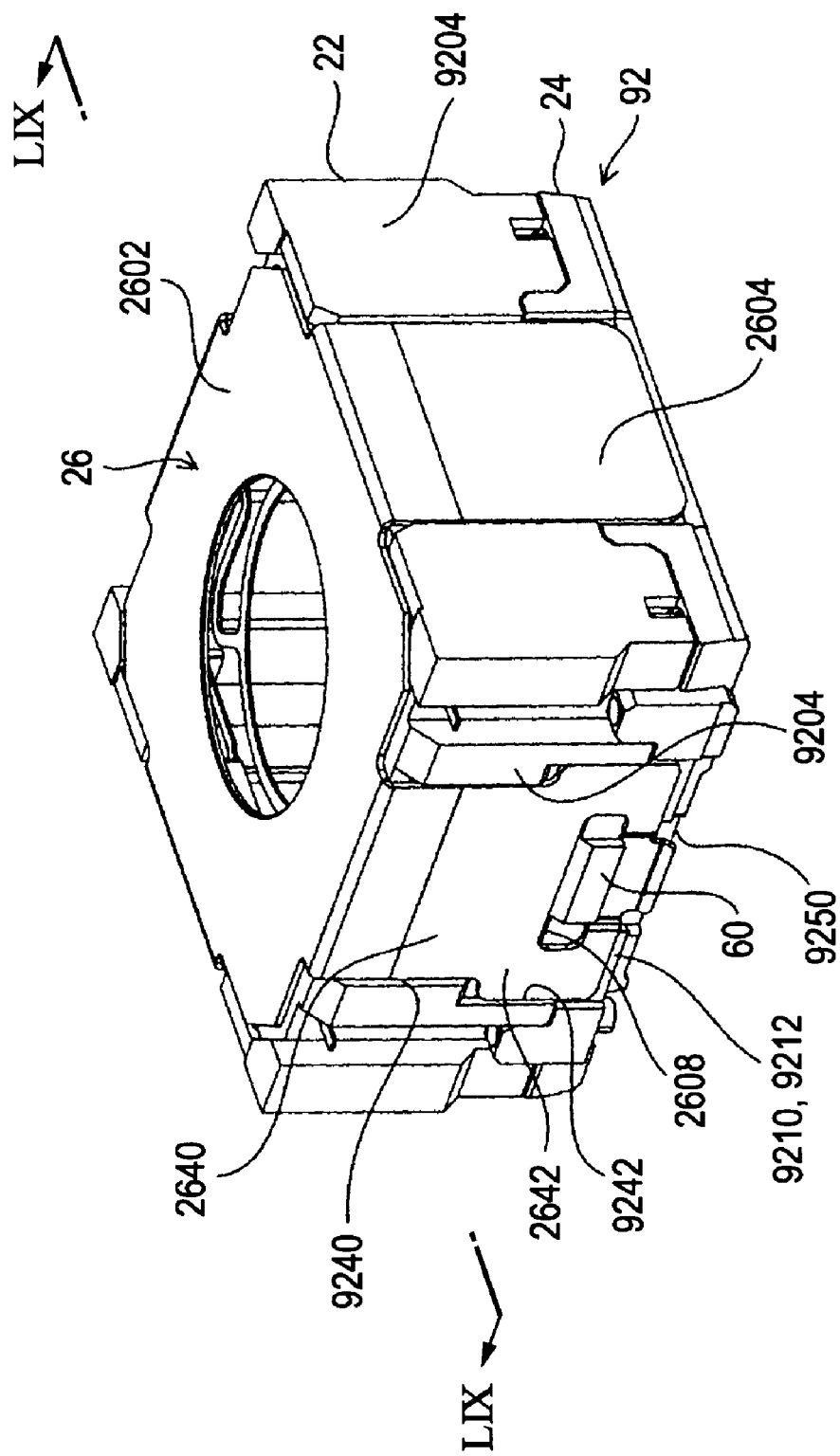
FIG. 58 is a perspective view of the structure for explaining how the cover is attached to the lens barrel.
Figure 59:
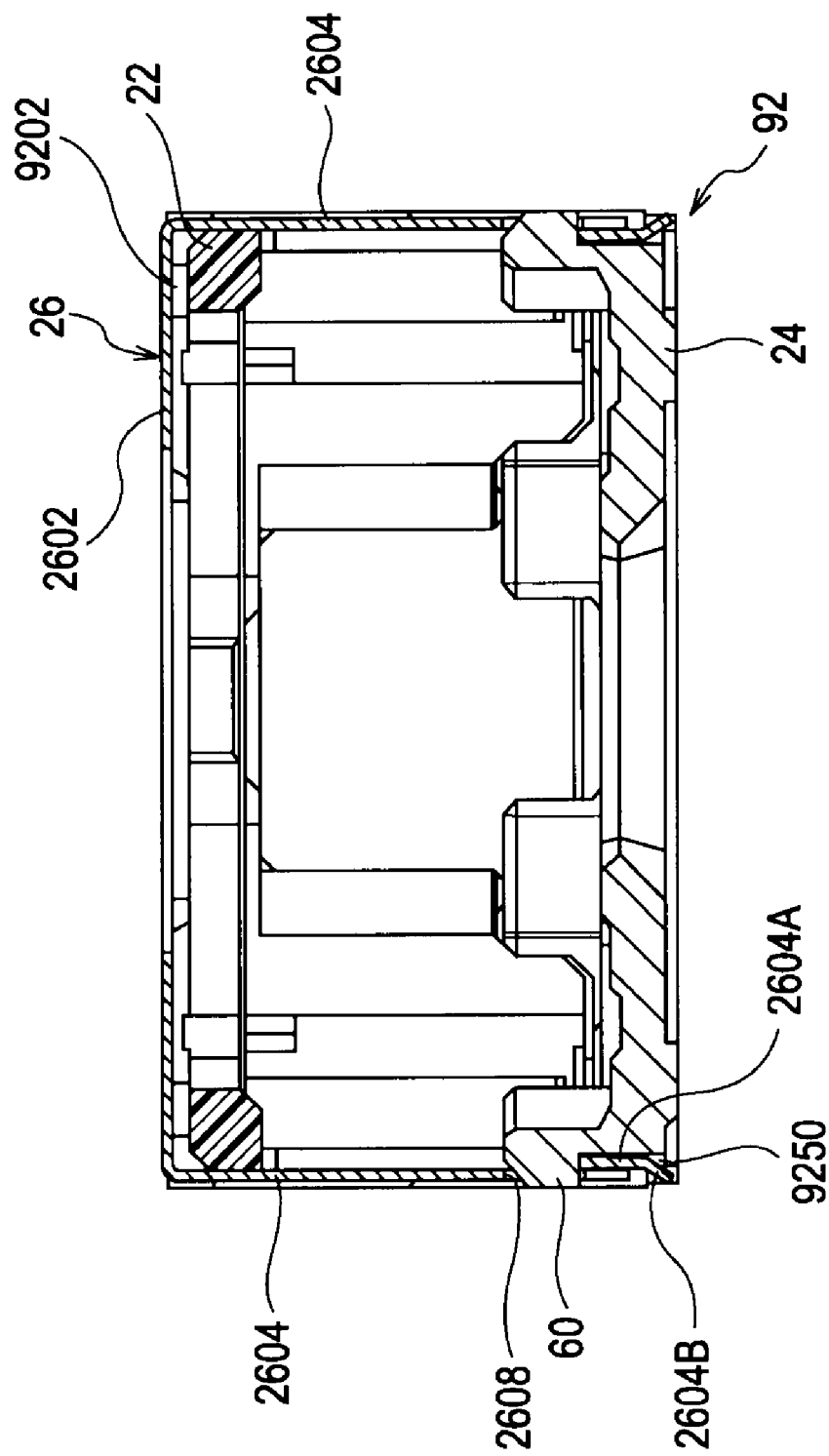
FIG. 59 is a sectional view of the structure of FIG. 58 taken along line LIX-LIX.
Figure 60A:
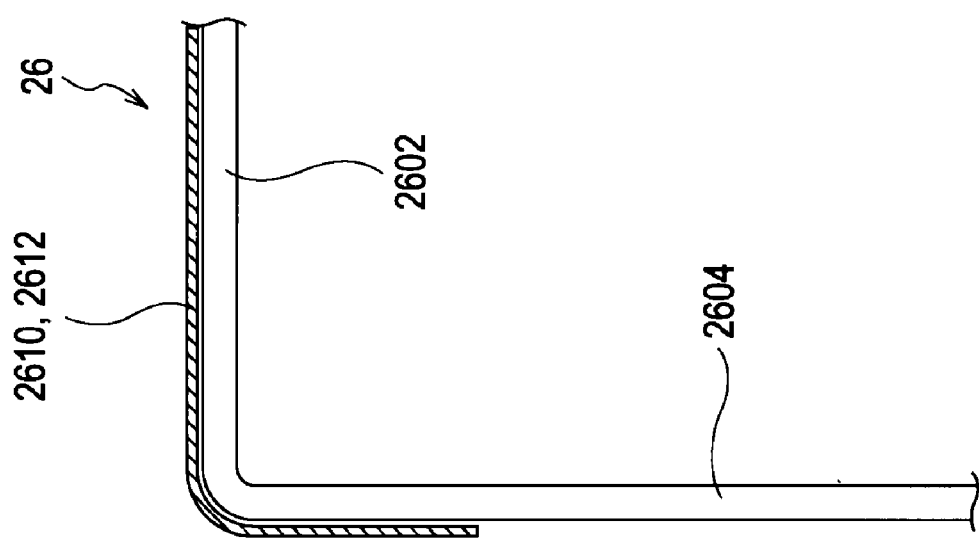
FIG. 60A is a sectional view of the cover in the embodiment.
Figure 60B:
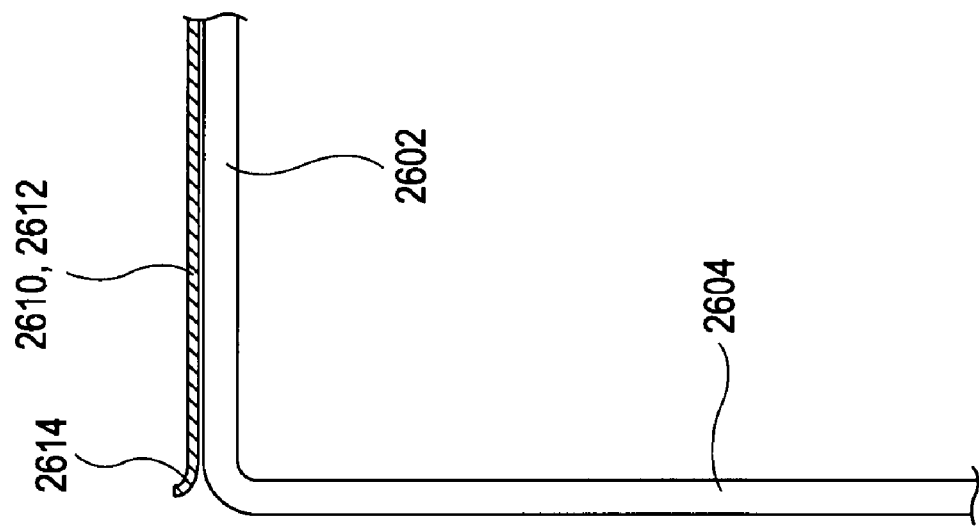
FIG. 60B is a sectional view of a cover in a comparative example.

FIG. 50 is a perspective view of a structure for explaining how the cover 26 is attached to the lens barrel 92, FIG. 51 is a sectional view of the structure of FIG. 50 taken along line LI-LI of FIG. 50, FIG. 52 is a perspective view of the structure for explaining how the cover 26 is attached to the lens barrel 92, FIG. 53 is a sectional view of the structure of FIG. 52 taken along line LIII-LIII, FIG. 54 is a perspective view of the structure for explaining how the cover 26 is attached to the lens barrel 92, FIG. 55 is a sectional view of the structure of FIG. 54 taken along line LIV-LIV, FIG. 56 is a perspective view of the structure for explaining how the cover 26 is attached to the lens barrel 92, FIG. 57 is a sectional view of the structure of FIG. 56 taken along line LVII-LVII, FIG. 58 is a perspective view of the structure for explaining how the cover 26 is attached to the lens barrel 92, FIG. 59 is a sectional view of the structure of FIG. 58 taken along line LIX-LIX, FIG. 60A is a partial sectional view of the cover 26 in an embodiment, and FIG. 60B is a partial sectional view of the cover 26 in a comparative example.

As described above, the accommodation space S (see FIG. 11) for accommodating the imaging optical system 28 extends in the lens barrel 92 in the front-rear direction. As shown in FIGS. 12, 50, and 51, the lens barrel 92 includes a front surface 9202 having a rectangular shape and four side surfaces 9204 extending rearward from the four sides of the front surface 9202. The term "rear" refers to a side near to the image pickup device 36 and the term "front" refers to a side remote from the image pickup device 36 and near to an object.

As described above, the lens barrel 92 includes the front lens barrel 22 and the rear lens barrel 24 disposed at the rear of the front lens barrel 22. The front surface 9202 is provided on the front lens barrel 22, and the side surfaces 9204 are provided on the front lens barrel 22 and the rear lens barrel 24.

Recesses 9210, which extend in the front-rear direction, are formed in the side surfaces 9204.

At positions at which the front surface 9202 meets the side surface 9204 and the bottom surface 9212 of the recess 9210, an inclined surface 9214 is formed in such a manner that the inclined surface 9214 is displaced inward as the inclined surface 9214 approaches the front surface 9202 of the lens barrel 92.

The cover 26, which is made of a metal plate or an elastic metal plate, is provided so as to join the front lens barrel 22 to the rear lens barrel 24.

As shown in FIGS. 28 to 30 and FIGS. 50 to 51, the cover 26 includes the front surface portion 2602, leg pieces 2604, and engagement holes 2608. The front surface portion 2602 is rectangular and in contact with the front surface 9202. The leg pieces 2604, which are elastically deformable, extend rearward from the four edges of the front surface portion 2602 so as to be accommodated in the recesses 9210 and contact the bottom surfaces 9212 of the recess 9210. The engagement holes 2608 are formed in at least one of opposing pairs the leg pieces 2604.

In the present embodiment, the leg pieces 2604 correspond to the above-described side surface portions 2604, and the engagement holes 2608 correspond to the above-described engagement grooves 2608.

The above-described opening 2606 is formed in the front surface portion 2602 so that the opening 2606 serves as an optical path for the imaging optical system 28 (see FIG. 11).

As shown in FIGS. 29 and 50, each of the leg pieces 2604 with the engagement holes 2608 includes a front portion 2640 adjacent to the front surface portion 2602 and a rear portion 2642 adjacent to the rear end of the rear lens barrel 24.

The engagement hole 2608 is formed in the rear portion 2642. The width of the rear portion 2642 is larger than that of the front portion 2640.

As shown in FIGS. 12 and 50, recesses 9210 for accommodating the leg pieces 2604 are formed so as to fit the shape of the leg pieces 2604 with the engagement holes 2608. Each of the recesses 9210 is constituted by a front portion 9240 having a width large enough to accommodate the front portion 2640 of the leg piece 2604 and a rear portion 9242 having a width larger than that of the front portion 9240 and capable of accommodating the rear portion 2642 of the leg piece 2604.

As shown in FIGS. 50 and 51, engagement protrusions 60 are formed on the bottom surfaces 9212 of the recesses 9210 in the rear lens barrel 24. The engagement protrusions have heights larger than those of the side surfaces 9204 so as to be engageable with the engagement holes 2608. In the present embodiment, the engagement protrusions 60 correspond to the above-described engagement projections 60.

Portions of the bottom surfaces 9212 between the engagement protrusions 60 and the rear end of the rear lens barrel 24 are formed as accommodating recesses 9250.

End portions of the leg pieces 2604 adjacent to the engagement holes 2608 are formed as recessed pieces 2604A in the leg pieces 2604 so that the recessed pieces 2604A can be accommodated in the accommodating recesses 9250.

The ends of the recessed pieces 2604A are formed as upright pieces 2604B that are bent to the same height as the leg pieces 2604.

As shown in FIGS. 58 and 59, the front lens barrel 22 and the rear lens barrel 24 are joined to each other in a state in which the front surface portion 2602 of the cover 26 is in contact with the front surface 9202 of the lens barrel 92, the leg pieces 2604 is in contact with the surface 9212 of the recess 9210, and the engagement protrusions 60 are engaged with the engagement holes 2608.

In this state, as shown in FIGS. 7 and 8, the leg pieces 2604 of the cover 26 protrude to a height that is the same as that of the side surfaces 9204 or to a height between the side surface 9204 and the bottom surface 9212.

How the cover 26 is attached to the lens barrel 92 is described below.

As shown in FIGS. 50 and 51, the leg pieces 2604 of the cover 26 are inserted into the recesses 9210 in the side surfaces 9204 of the lens barrel 92 from the front of the lens barrel 92.

At this time, rear ends of the rear portions 2642 of the leg pieces 2604 with the engagement holes 2608 and rear ends of the leg pieces 2604 without the engagement holes 2608 are displaced outward from the lens barrel 92, guided by the inclined surfaces 9214.

Thus, the rear portions 2642 of the leg pieces 2604 with the engagement holes 2608 are smoothly guided toward the side surfaces 9204, and the rear ends of the leg pieces 2604 without the engagement holes 2608 are smoothly guided toward the recesses 9210 of the bottom surface 9212.

As shown in FIGS. 52 to 55, when the front surface portion 2602 of the cover 26 is moved toward the lens barrel 92, sides of the rear portions 2642 of the leg pieces 2604 with the engagement holes 2608 are guided along the side surfaces 9204 on both sides of the recesses 9210 toward the rear portions 9242 of the recesses 9210. The rear ends of the leg pieces 2604 without the engagement holes 2608 are guided on the bottom surfaces 9212 of the recesses 9210.

As shown in FIGS. 56 and 57, as the cover 26 is moved, the sides of the rear portions 2642 of the leg pieces 2604 with the engagement holes 2608 are guided along the side surfaces 9204 on both sides of the recesses 9210, so that the recessed pieces 2604A of the leg pieces 2604 with the engagement holes 2608 are moved rearward while being displaced outside the engagement protrusions 60.

As shown in FIGS. 58 and 59, when the cover 26 is moved further, the front surface portion 2602 of the cover 26 contacts the front surface 9202 of the lens barrel 92.

Then, the rear portions 2642 of the leg pieces 2604 with the engagement holes 2608 are accommodated in the rear portions 9242 of the recesses 9210, the recessed pieces 2604A are accommodated in the accommodating recesses 9250, the engagement holes 2608 are engaged with the engagement protrusions 60, the front portions 2640 of the leg pieces 2604 are accommodated in the front portions 9240 of the recesses 9210, so that the leg pieces 2604 with the engagement holes 2608 contact with the bottom surfaces 9212 of the recesses 9210.

The leg pieces 2604 without the engagement holes 2608 contact the bottom surfaces 9212 of the recesses 9210, and the rear ends of the leg pieces 2604 are positioned adjacent to the rear end of the lens barrel 92.

Thus, the engagement protrusions 60 of the lens barrel 92 engage with the engagement holes 2608 of the cover 26, so that the front lens barrel 22 and the rear lens barrel 24 are joined to each other.

In the above-described structure, the engagement protrusions 60 engageable with the engagement holes 2608 of the cover 26 and having a height smaller than that of the side surfaces 9204 are formed on the bottom surface 9212 of the recesses 9210 of the lens barrel 92; the front lens barrel 22 and the rear lens barrel 24 are attached to each other in a state in which the engagement holes 2608 are engaged with the engagement protrusions 60; and, in this state, the leg pieces 2604 are positioned at the same height as that of the side surfaces 9204 or at a height between those of the side surfaces 9204 and the bottom surfaces 9210.

In other words, the camera module according to an embodiment of the present invention includes a lens barrel having an accommodation space accommodating an imaging optical system and extending in the front-rear direction and a cover made of a metal plate, wherein the lens barrel includes a front surface having a rectangular shape and four side surfaces extending rearward from four edges of the front surface, wherein the lens barrel includes a front lens barrel having the front surface and a rear lens barrel disposed at the rear of the front lens barrel, wherein recesses extending in the front-rear direction are formed in the side surfaces, wherein the cover includes a front surface portion, leg pieces, and engagement holes, the front surface having a rectangular shape and being in contact with the front surface, the leg pieces extending rearward from four edges of the front surface portion and being elastically deformable, the leg pieces being accommodated in the recesses and in contact with the bottom surfaces of the recesses, the engagement holes being formed in at least one opposing pair of the leg pieces, wherein engagement protrusions are formed in the bottom surfaces of the recesses, the engagement protrusions having a height smaller than that of the side surfaces and being engageable with the engagement holes, wherein the front surface portion of the cover is in contact with the front surface of the lens barrel, wherein the leg pieces are accommodated in the recesses and in contact with the bottom surfaces of the recesses, wherein the front lens barrel and the rear lens barrel are held in an assembled state in a state in which the engagement protrusions are engaged with the engagement holes, and wherein, in the assembled state, the leg pieces of the cover are positioned at the same height as the side surfaces or at a height between those of the side surfaces and the bottom surfaces.

Therefore, as shown in FIGS. 7 and 8, no portions protrude outside the peripheries of the side surfaces 9204 of the lens barrel 92. That is, no portions protrude outside the rectangular peripheries, which is advantageous in reducing the space for the camera module 20 and reducing the outside dimension so as to miniaturize the electronic apparatus 10.

The width of the rear portions 2642 of the leg pieces 2604 of the cover 26 with the engagement holes 2608 are larger than that of the front portions 2640. The recesses 9210 for accommodating the leg pieces 2604 with the engagement holes 2608 include front portions 9240 having a width for accommodating the front portions 2640 of the leg pieces 2604 and rear portions 9242 having a width larger than that of the front portions 9240 for accommodating the rear portions 2642 of the leg pieces 2604.

When the cover 26 is attached to the lens barrel 92, the rear portions 2642 of the leg pieces 2604 with the engagement holes 2608 are guided on the side surfaces 9204 of the lens barrel 92. That is, the sides of the rear portions 2642 are guided rearward while being raised by the side surfaces 9204 of the front portions 9240 of the recesses 9210. Thus, the leg pieces 2604 can be smoothly accommodated in the recesses 9410, which is not only advantageous in facilitating assembly, but also in reducing friction generated between the cover 26 and the lens barrel 92, whereby the friction is prevented from scraping the lens barrel 92 and generating contaminants that may be deposited on the imaging optical system 28 or the image pickup device 36 and may affect an image quality.

Moreover, at positions where the side surfaces 9204 and the bottom surfaces 9212 of the recesses 9210 meet the front surface 9204, the inclined surfaces 9214 are provided in such a manner that the inclined surfaces 9214 are displaced inward of the lens barrel 92 as the inclined surfaces 9214 approach the front surface 9204. Therefore, when the cover 26 is attached to the lens barrel 92, the rear ends of the leg pieces 2604 are smoothly guided by the inclined surfaces 9214, which is advantageous in improving an image quality by reducing friction generated between the cover 26 and the lens barrel 92 during assembly as well as for facilitating assembly.

As shown in FIG. 11, FIGS. 28 to 30, FIGS. 50 and 51, and FIG. 60A, in a state in which the rear lens barrel 24 and the front lens barrel 22 are attached to each other with the cover 26, the entire area of a surface of the front surface portion 2602 on an opposite side of the surface in contact with the front surface 9202 and portions of surfaces of the leg pieces 2604 on an opposite side of the surfaces in contact with the bottom surface 9212 and adjacent to the front surface portion 2602 are treated with a coating 2612 that does not reflect light.

The coating 2612 serves as a reflection preventing portion 2610 for preventing reflection of light.

If the coating 2612 is not provided and the camera module 20 is built in the first housing of the electronic apparatus 10 as shown in FIG. 1, the front surface portion 2602 of the cover 26 does not have a good appearance when the front surface portion 2602 is seen through the opening 1410 of the first housing 14.

Moreover, external light entering through the opening 1410 may be reflected between the front surface portion 2602 and an inner surface of the housing (or between the front surface portion 2602 and a transparent panel disposed in the opening 1410) and enter the imaging optical system 28, which may affect the quality of an image picked up by the image pickup device 36.

Therefore, the cover 26 is treated with the coating 2612 so as to form the reflection preventing portion 2610, whereby a good appearance can be secured and the quality of an image can be improved.

As shown in FIG. 60B, for securing the good appearance and the quality of an image, the coating 2612 may be applied only to the front surface of the front surface portion 2602 so as to form the reflection preventing portion 2610 on the front surface and not to the leg piece 2604 so as not to form the reflection prevention portion 2610 on the leg piece 2604.

In most cases, however, a protective sheet having weak adhesion is attached to the front surface portion 2602 so as to cover the entire surface of the cover 26 when the camera module 20 is to be handled.

Portions of the coating 2612 on an edge portion 2614 along the boundary of the front surface portion 2602 and the leg pieces 2604 (bent portions at which the front surface portion 2602 and the leg pieces 2604 are connected to each other) more easily peel off than the other portions. Therefore, when the protective sheet is removed, the coating 2612 may partially peel off from the edge portion 2614.

As shown in FIG. 60A, in the present embodiment, the entire area of the surface of the front surface portion 2602 opposite the surface at which the front surface portion 2602 contacts the front surface 9202 and portions of the surfaces of the leg pieces 2604 opposite the surfaces at which the leg pieces 2604 contact the bottom surface 9212 and adjacent to the front surface portion 2602 are treated with the coating 2612, which is advantageous in preventing the coating 2612 from peeling off when the protective sheet is removed from the front surface portion 2602.

As shown in FIGS. 3 and 4, the leg pieces 2604 without the engagement holes 2608 may extend beyond the rear end of the rear lens barrel 24 and may be soldered to the substrate 58. The substrate 58 is disposed at the rear end of the rear lens barrel 24 as described above. The image pickup device 36 for picking up an object image guided by the imaging optical system 28 is mounted on the substrate 58.

As shown in FIG. 4, the leg pieces 2604 without the engagement holes 2608 may be disposed so as to be in contact with the magnet 50. As described above, the magnet 50 is included in the driving section for moving the lens holder 30 as described above.

With this structure, heat generated at the substrate 58 and the image pickup device 36 is transferred from the leg pieces 2604 to the cover 26, and heat transferred from the coil 52 to the magnet 50 is transferred through the leg pieces 2604 to the cover 26, so that the heat is radiated from the cover 26.

Thus, the image pickup device 36, the substrate 58, the magnet 50, and the coil 52 are effectively cooled with the cover 26, which is advantageous in stabilizing an operation of the image pickup device 36, the substrate 58, and the driving section 38.

Heretofore, a case in which a driving section is a so-called moving-coil system having a coil attached to the lens holder and a magnet attached to a lens barrel has been described.

However, it is needless to say that the present invention is applicable to a case in which the driving section is a so-called moving magnet system having a magnet attached to a lens holder and a coil attached to a lens barrel.

The present application contains subject matter related to that disclosed in Japanese Priority Patent Application JP 2008-161780 filed in the Japan Patent Office on Jun. 20, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A camera module comprising:
   a lens barrel providing an accommodation space;
   a lens holder accommodated in the accommodation space, the lens holder holding an imaging optical system;
   an image pickup device supported by the lens barrel, the image pickup device picking up an object image that has been guided by the imaging optical system; and
   a plurality of springs supporting the lens holder in such a manner that the lens holder is movable along an optical axis of the imaging optical system,
   wherein each of the plurality of springs includes a first arm portion and a second arm portion extending perpendicularly to each other in a plane perpendicular to the optical axis of the imaging optical system,
   wherein each of the first and second arm portions includes two spring strips extending parallel to each other, thickness directions of the spring strips being parallel to the optical axis,
   wherein, in each of the first and second arm portions, the two spring strips are connected to each other by an arc portion at longitudinal ends of the two spring strips remote from a region in which the first and second arm portions perpendicularly intersect, a diameter of an arc along the centerline of the arc portion being larger than a distance between the centerlines of the two spring strips, wherein, in the region in which the first and second arm portions perpendicularly intersect, one of the two spring strips of the first arm portion is connected to one of the two spring strips of the second arm portion, wherein, in the region in which the first and second arm portions perpendicularly intersect, a longitudinal end of the other one of the two spring strips of the first arm portion is attached to the lens holder, and wherein, in the region in which the first and second arm portions perpendicularly intersect, a longitudinal end of the other one of the two spring strips of the second arm portion is attached to the lens barrel.

2. The camera module according to claim 1, wherein the plurality of springs include four springs disposed in a circumferential direction of the lens holder with distances therebetween, wherein the first arm portion of each of the springs extends in an X-axis direction that is perpendicular to a Y-axis direction, the X-axis and the Y-axis being taken in a plane that is perpendicular to the optical axis of the imaging optical system, and wherein the second arm portion of each of the springs extends in the Y-axis direction.

3. The camera module according to claim 1, wherein the lens barrel has a substantially rectangular parallelepiped shape, wherein the lens holder has a substantially cylindrical shape, wherein four spaces each having a substantially triangular prism shape are provided between an outer peripheral surface of the lens holder and corners of the lens barrel, the four spaces extending in a front-rear direction, wherein the plurality of springs include four springs disposed in a circumferential direction of the lens holder with distances therebetween, wherein the first arm portion of each of the springs extends in an X-axis direction that is perpendicular to a Y-axis direction, the X-axis and the Y-axis being taken in a plane that is perpendicular to the optical axis of the imaging optical system, wherein the second arm portion of each of the springs extends in the Y-axis direction, and wherein the first and second arm portions of each of the springs are disposed in one of the spaces each having the substantially triangular prism shape in such a manner that the first and second arm portions extend parallel to respective walls of a corner of the lens barrel.

4. The camera module according to claim 1, wherein the plurality of springs are disposed in a circumferential direction of the lens holder with distances therebetween, wherein the longitudinal end of the spring strip attached to the lens holder is formed as a holding piece, and wherein the other one of the two spring strips of the first arm portion is connected to the holding piece through an arc portion in which the spring strip extends in an arc shape.

5. The camera module according to claim 1, wherein the plurality of springs are disposed in a circumferential direction of the lens holder with distances therebetween, wherein the longitudinal end of the spring strip attached to the lens holder is formed as a holding piece extending in an arc shape along an outer periphery of the lens holder, and wherein longitudinal ends of the holding pieces of two adjacent springs are connected with each other.

6. The camera module according to claim 1, wherein the longitudinal end of the spring strip attached to the lens barrel is formed as an annular supporting piece having a hole, wherein the lens barrel is constituted by a front lens barrel section and a rear lens barrel section that are splittable in the direction of the optical axis, and wherein the supporting piece is attached to the lens barrel in such a manner that the supporting piece is sandwiched between the front lens barrel section and the rear lens barrel section in a state in which a pin on the lens barrel is inserted in the hole.

7. The camera module according to claim 6, wherein the supporting piece includes a plurality of grooves formed therein, the grooves extending coaxially in a form of an arc in a circumferential direction of the hole with distances therebetween.

* * * * *